(12) United States Patent
Yee et al.

(10) Patent No.: US 12,540,760 B2
(45) Date of Patent: Feb. 3, 2026

(54) BRAYTON ELECTROCHEMICAL REFRIGERATOR/AIR CONDITIONER

(71) Applicant: Georgia Tech Research Corporation, Atlanta, GA (US)

(72) Inventors: Shannon Yee, Atlanta, GA (US); Aravindh Rajan, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 223 days.

(21) Appl. No.: 18/552,259

(22) PCT Filed: Apr. 7, 2022

(86) PCT No.: PCT/US2022/023809
§ 371 (c)(1),
(2) Date: Sep. 25, 2023

(87) PCT Pub. No.: WO2022/216917
PCT Pub. Date: Oct. 13, 2022

(65) Prior Publication Data
US 2024/0210074 A1    Jun. 27, 2024

Related U.S. Application Data

(60) Provisional application No. 63/307,397, filed on Feb. 7, 2022, provisional application No. 63/172,925, filed on Apr. 9, 2021.

(51) Int. Cl.
| | | |
|---|---|---|
| *F25B 21/00* | (2006.01) | |
| *F24F 5/00* | (2006.01) | |
| *F25B 29/00* | (2006.01) | |

(52) U.S. Cl.
CPC ............ *F25B 21/00* (2013.01); *F24F 5/0042* (2013.01); *F25B 29/00* (2013.01)

(58) Field of Classification Search
CPC ......... F25B 21/00; F25B 29/00; F24F 5/0042; H01M 8/04014; H01M 8/04276
See application file for complete search history.

(56) References Cited

U.S. PATENT DOCUMENTS

2019/0252697 A1\*  8/2019  Dimitrov .............. H01M 8/188
2020/0325379 A1\* 10/2020  Majumdar .............. F25B 21/00

FOREIGN PATENT DOCUMENTS

| CN | 102753806 A | \* | 10/2012 | ............. F02G 1/057 |
| WO | WO-2019066651 A1 | \* | 4/2019 | ............ H01M 8/182 |

OTHER PUBLICATIONS

International Search Report and Written Opinion, PCT/US2022/023809, mailed Jun. 22, 2022.
(Continued)

*Primary Examiner* — William C Doerrler
(74) *Attorney, Agent, or Firm* — Thomas | Horstemeyer, LLP

(57) ABSTRACT

The disclosure relates to systems and methods for electrochemical cooling and/or refrigeration. The disclosed system includes at least hot and cold electrochemical cells having ion exchange membranes, hot side and cold side heat exchangers, a heat sink, a heat source, and an external power supply that drives current through the electrochemical cells. In the systems, a first solution including a first redox active electrolyte and a second solution including a second redox active electrolyte circulate continuously through the system without physically mixing together. In another aspect, the present disclosure relates to apparatuses incorporating the disclosed systems, and methods for electrochemical cooling using the disclosed systems.

20 Claims, 35 Drawing Sheets

(56) References Cited

OTHER PUBLICATIONS

Qian, et al., "Thermally Regenerative Flow Batteries with pH Neutral Electrolytes for Harvesting Low-Grade Heat," Department of Mechanical Engineering, Massachusetts Institute of Technology (2021).
Li, Baode, et al., "Performance analysis of a thermally regenerative electrochemical refrigerator," Energy, vol. 112 (2016), pp. 43-51.
Technology Org, "Cool Solutions: Science and Engineering Help Address The Impacts of Climate Change," (2019) (www.technology.org/2019/09/30cool-solutions-science-and-engineering-help-address-the-impacts-of-climate-change).
European Search Report, EP Pat. App. 22785432.0, issued Feb. 10, 2025.
Gunawan, Audrey, et al., "New Directions in Thermoelectric and Thermal-Electric Cooling," Proceedings of SPIE, vol. 10121 (2017) (7 pgs.).
Rajan, Aravindh, et al., "Continuous Electrochemical Refrigeration based on the Brayton Cycle," Nature Energy, vol. 7, No. 4 (2022), pp. 320-328.

\* cited by examiner

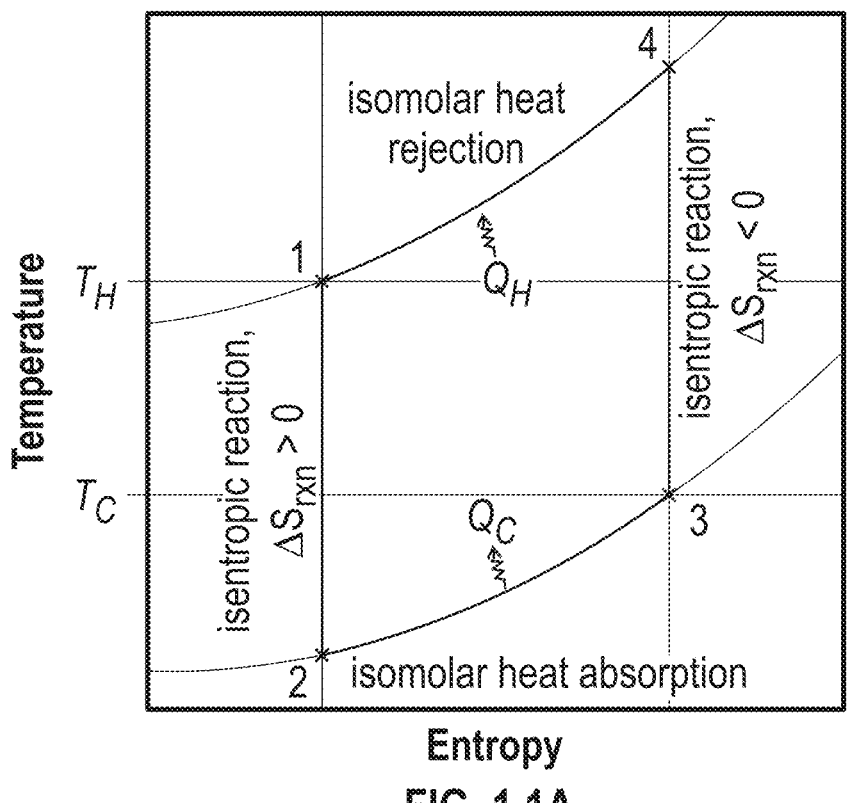
FIG. 1.1A
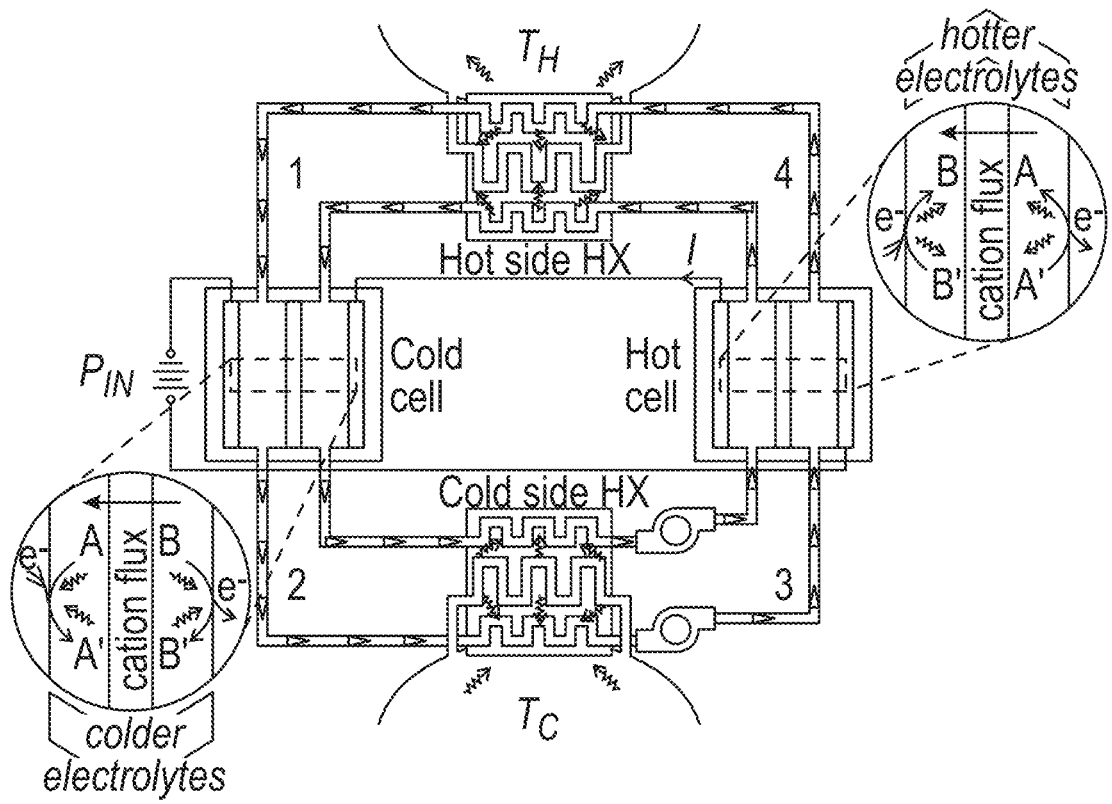
FIG. 1.1B

FIG. 1.1B
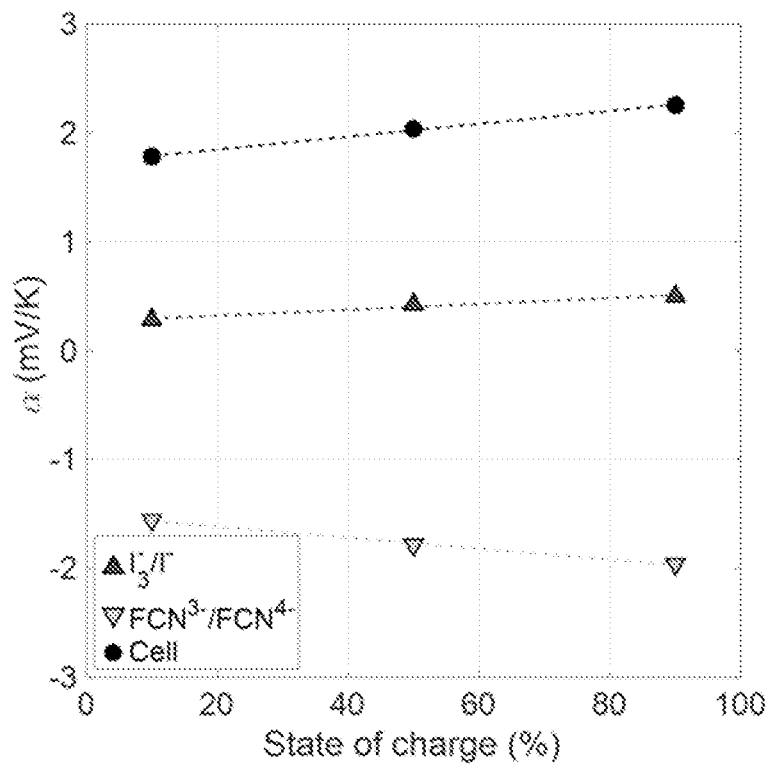
FIG. 1.2A
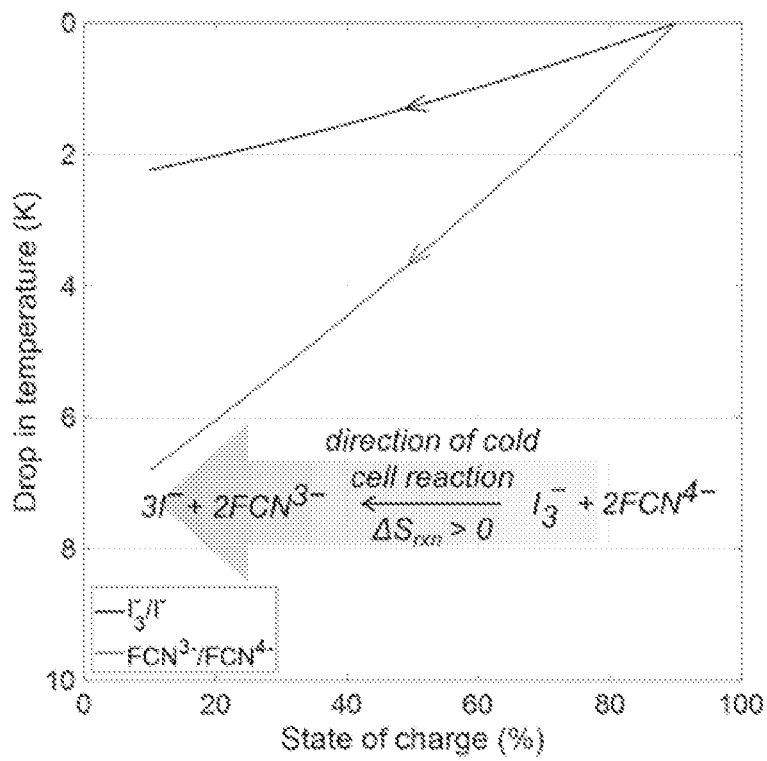

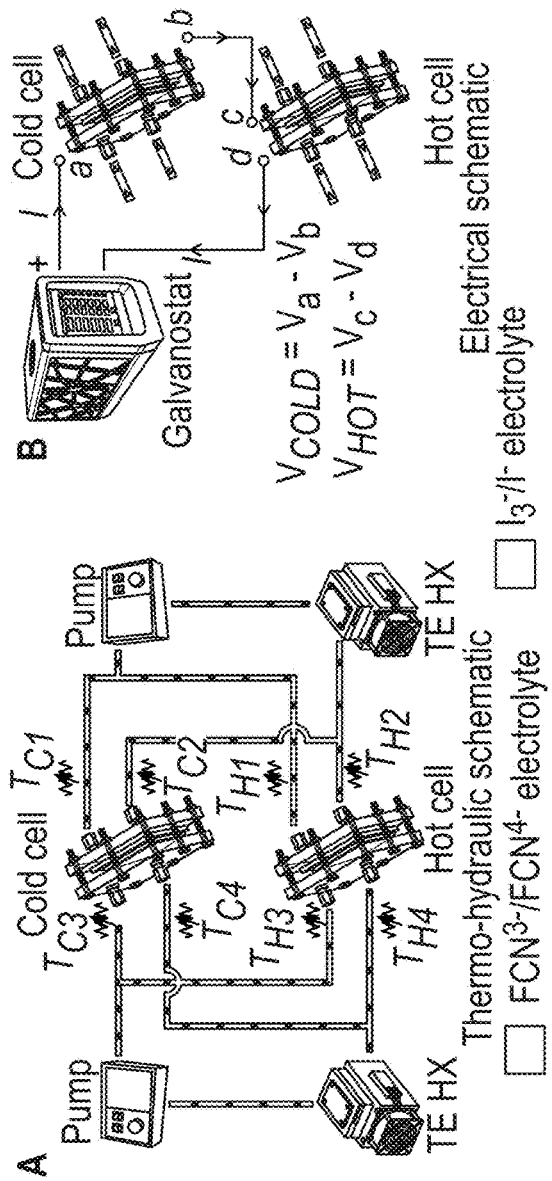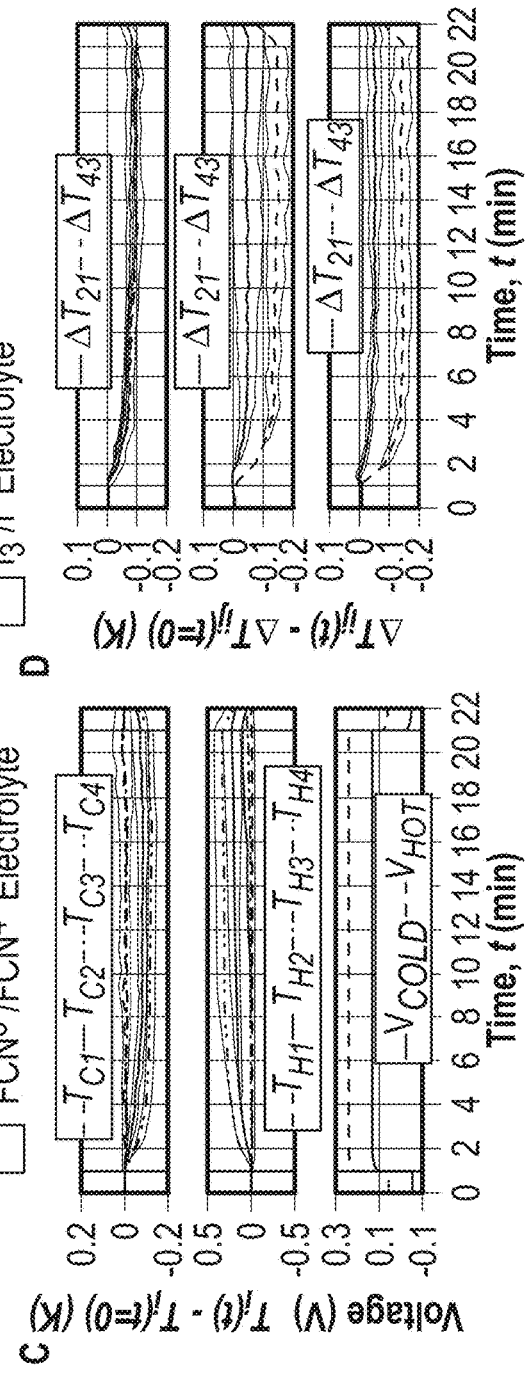
FIGs. 1.3A-1.3B
FIGs. 1.3C-1.3D

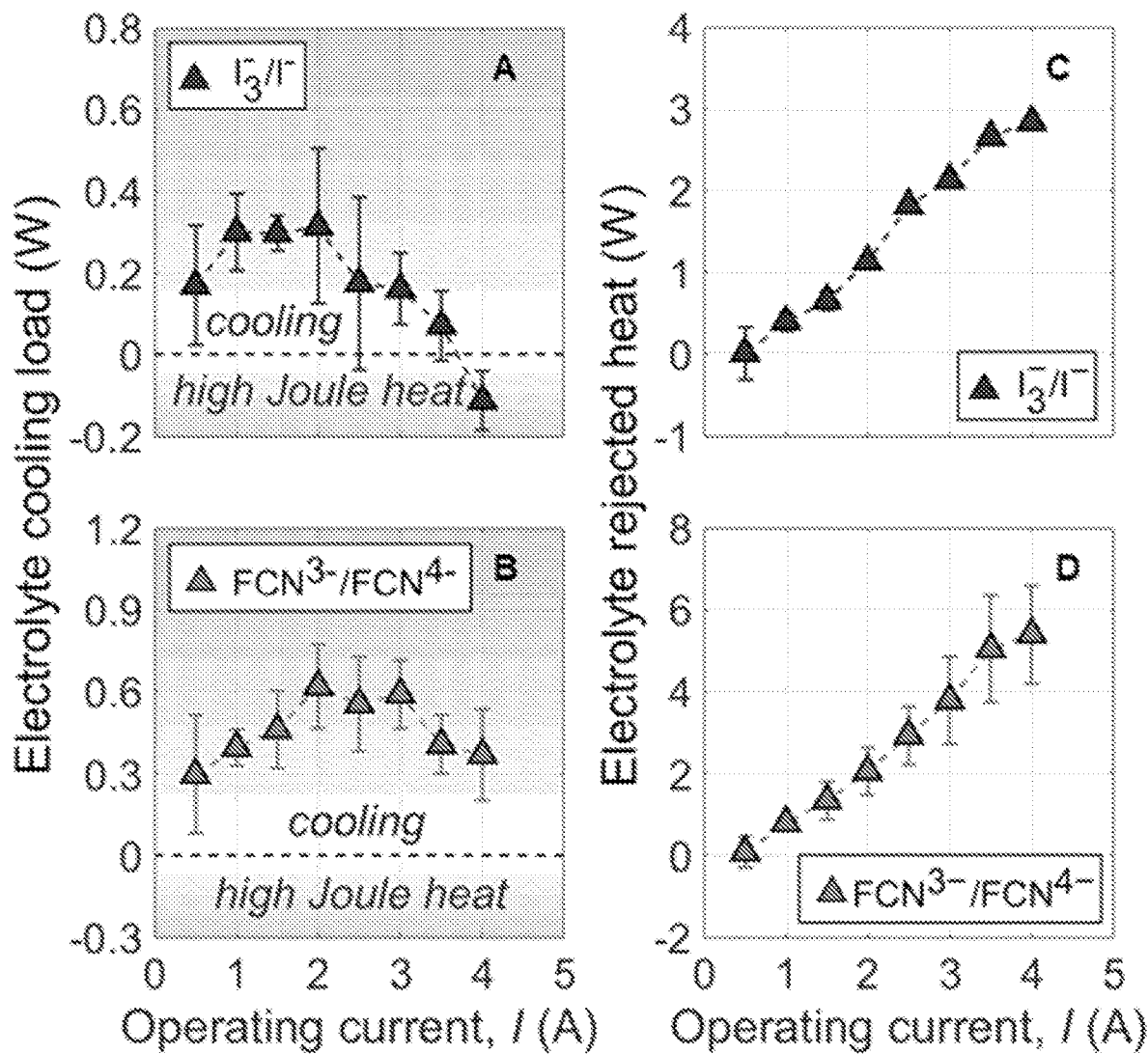
FIGs. 1.4A-1.4D

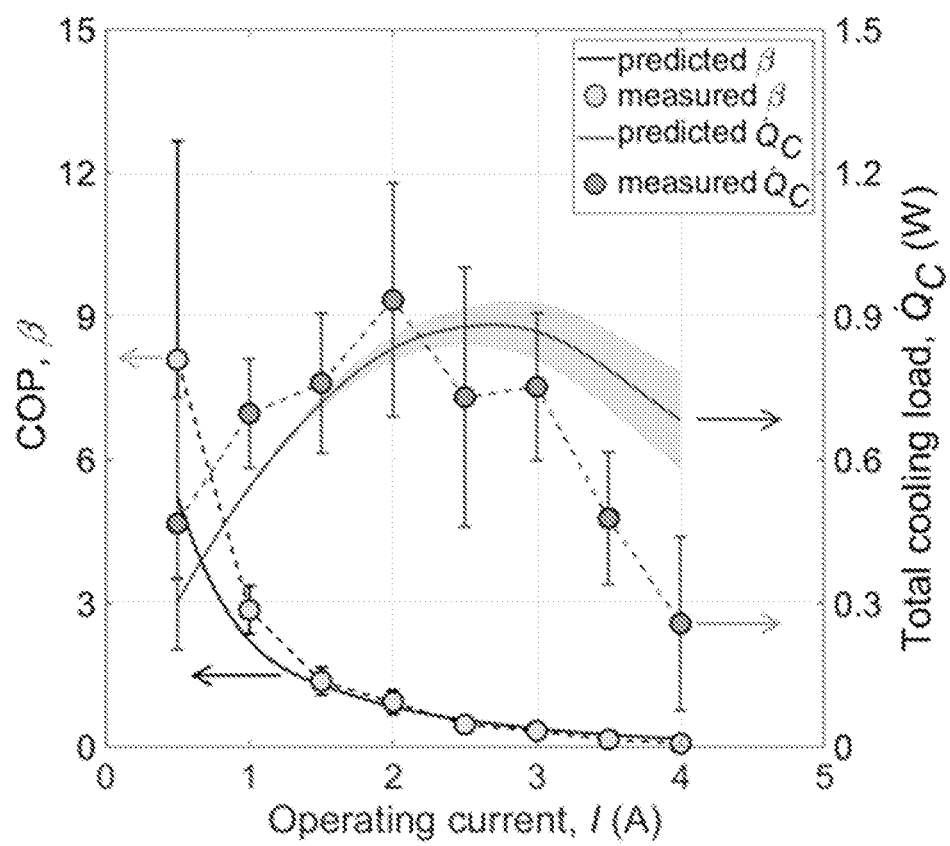
FIG. 1.4E

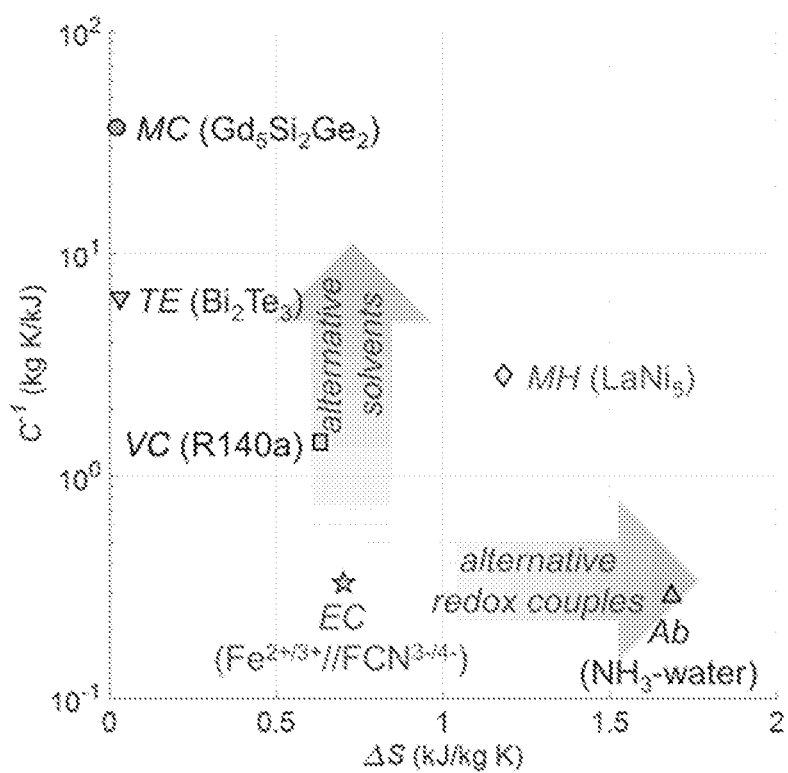
FIG. 1.5A
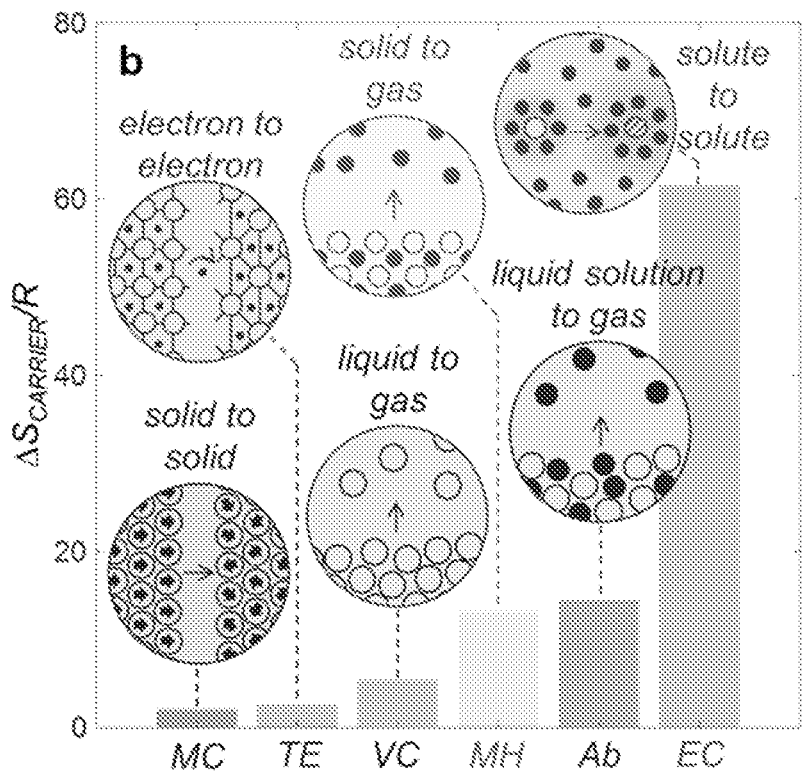
FIG. 1.5B

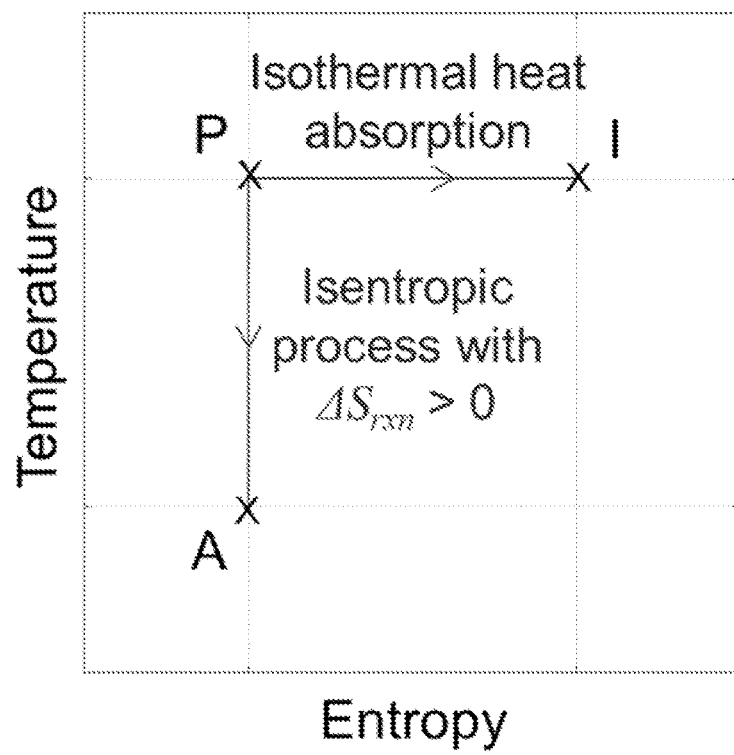
FIG. 1.6
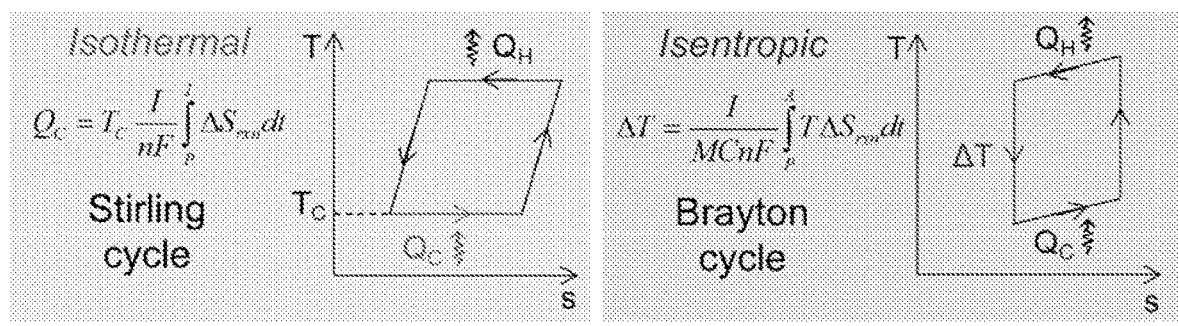
FIG. 1.7

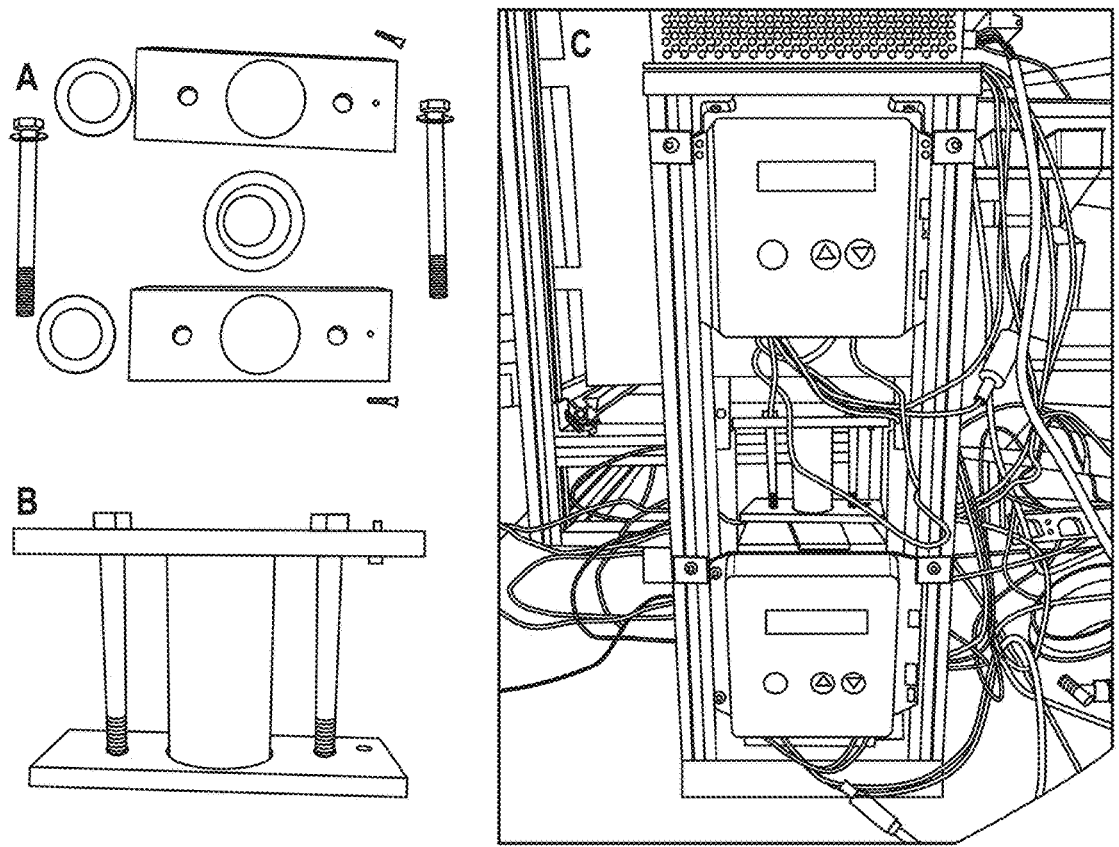
FIGs. 1.8A-1.8C
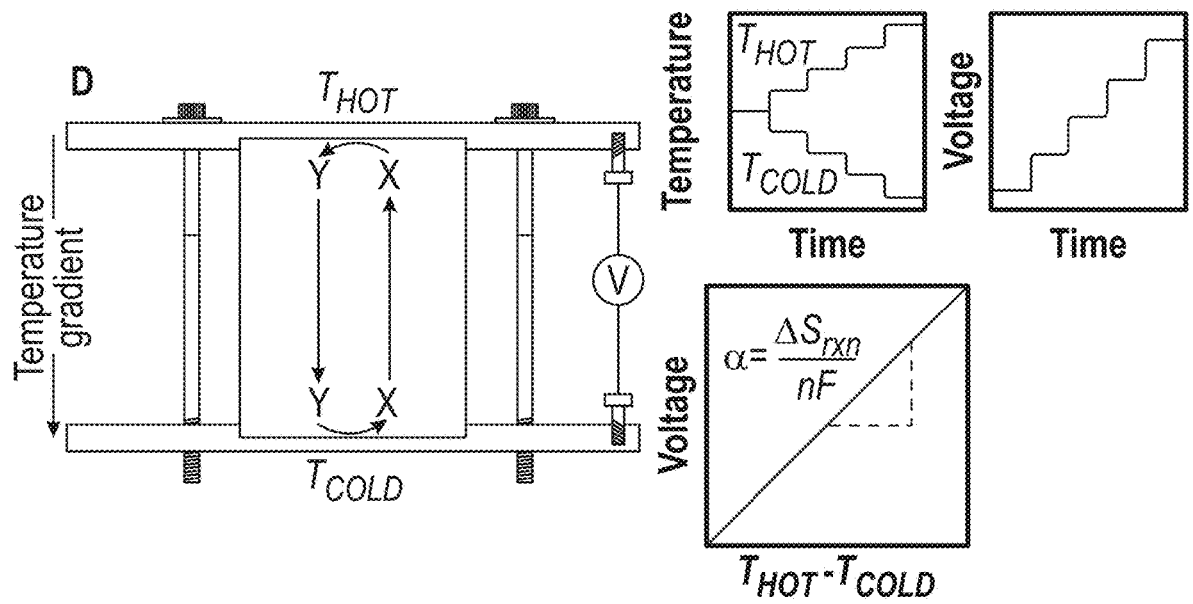
FIG. 1.8D

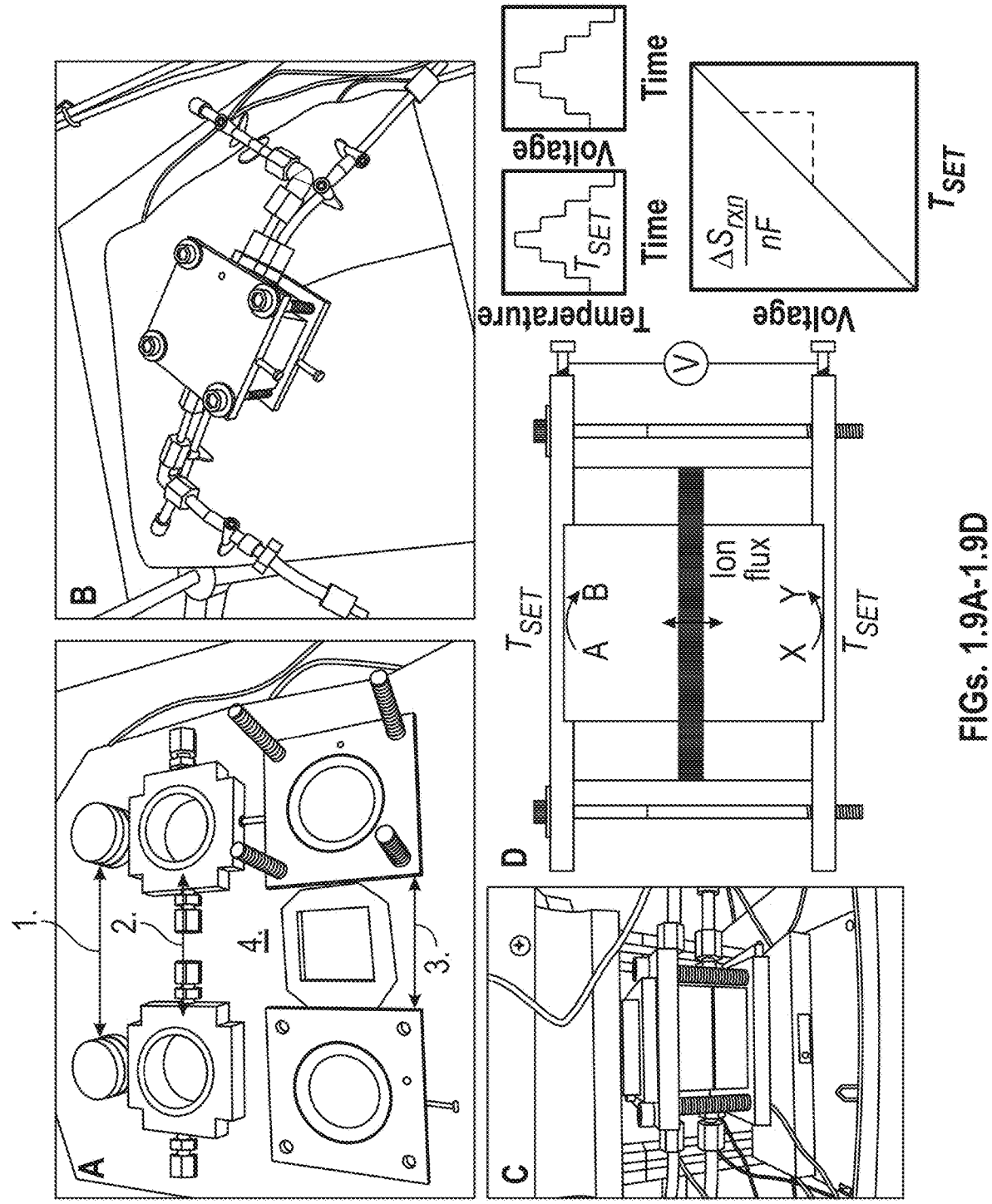
FIGs. 1.9A-1.9D

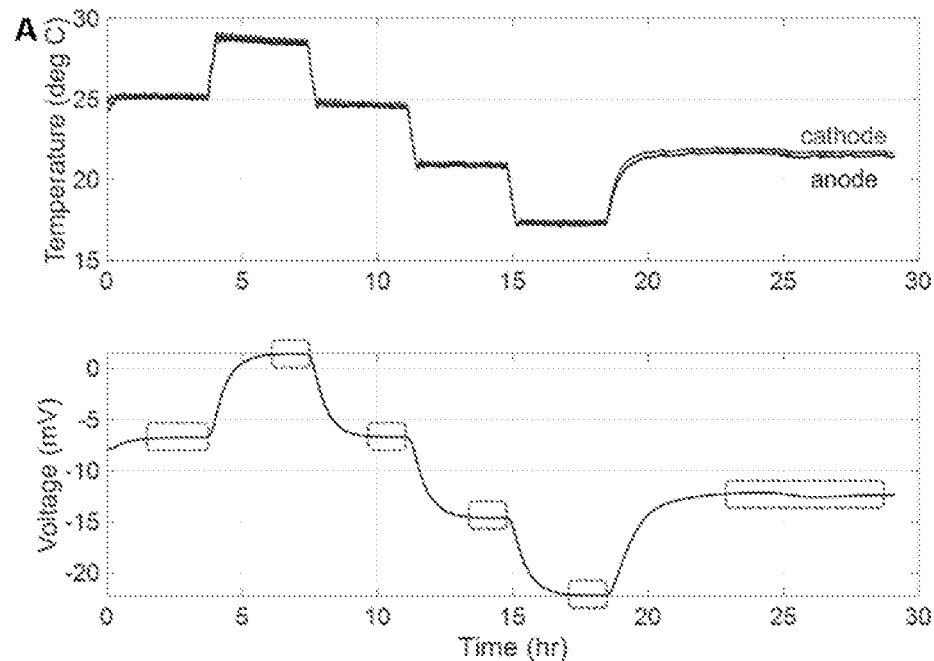
FIG. 1.10A
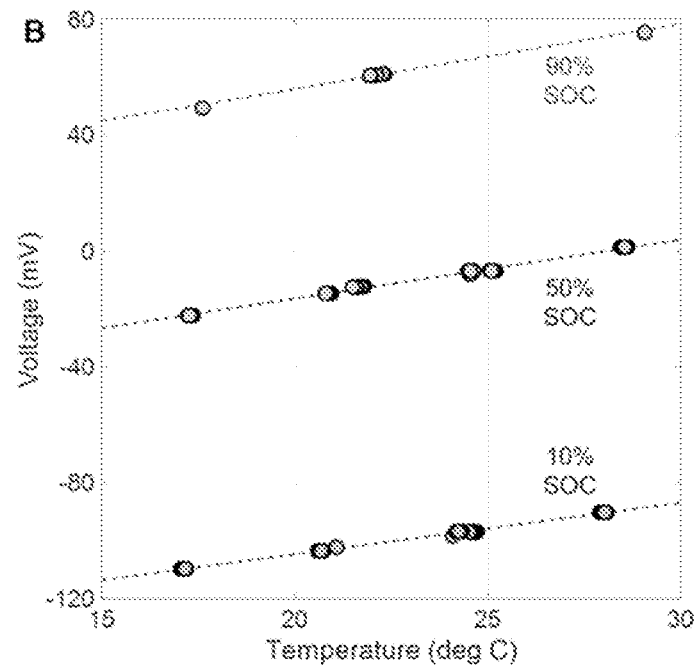
FIG. 1.10B

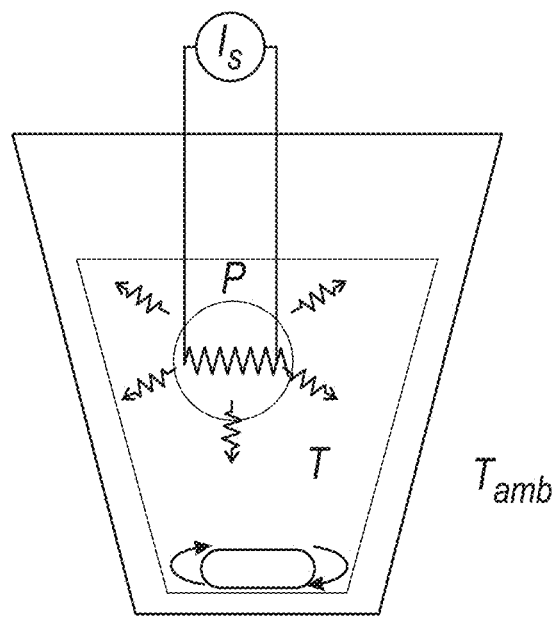
FIG. 1.11
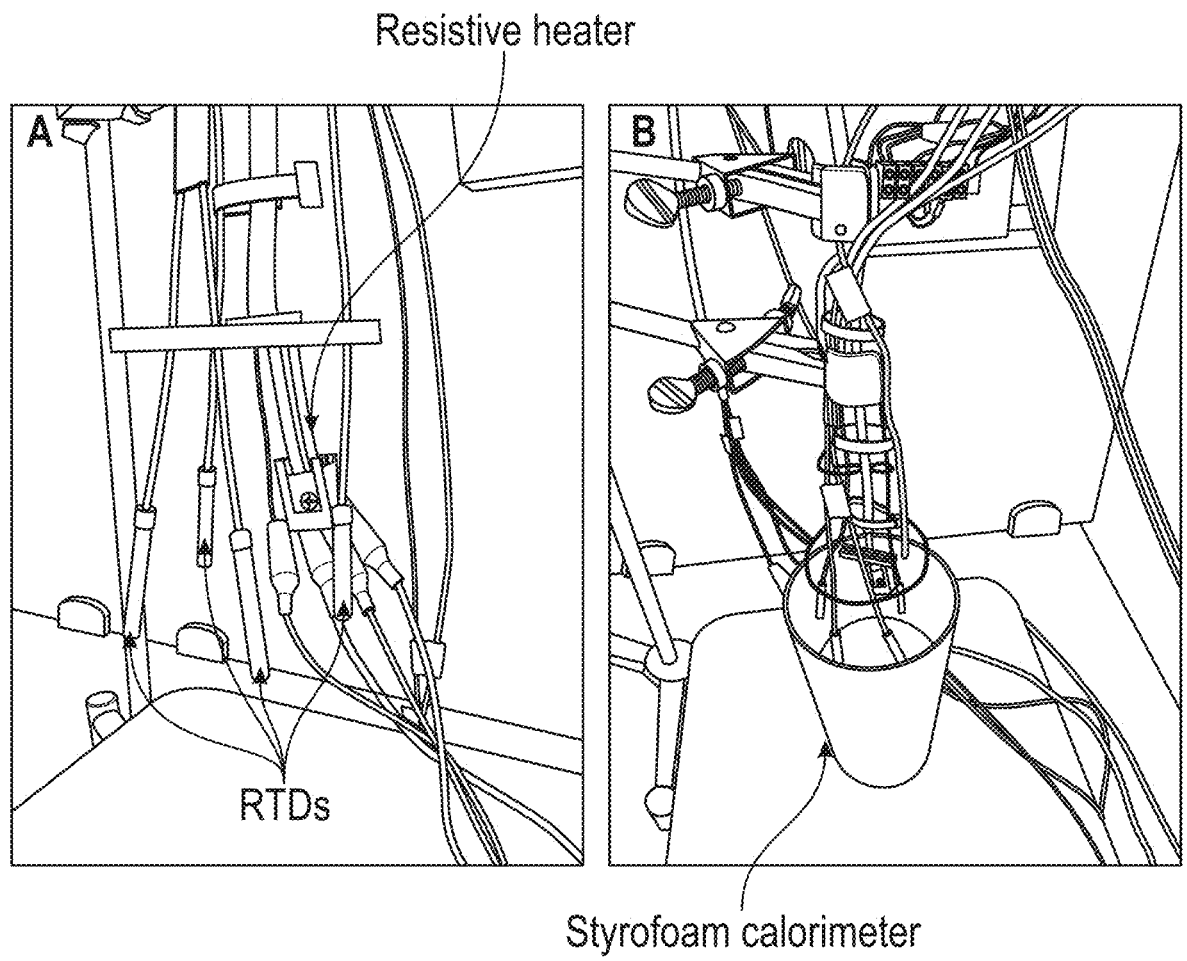
FIGs. 1.12A-1.12B

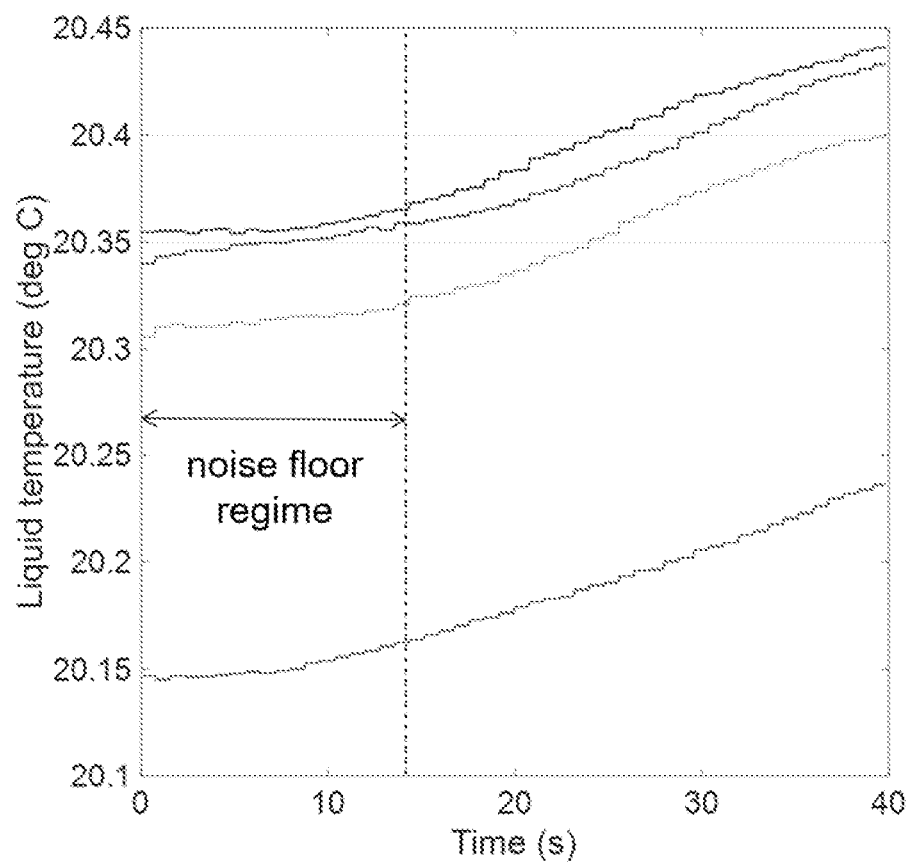
FIG. 1.13

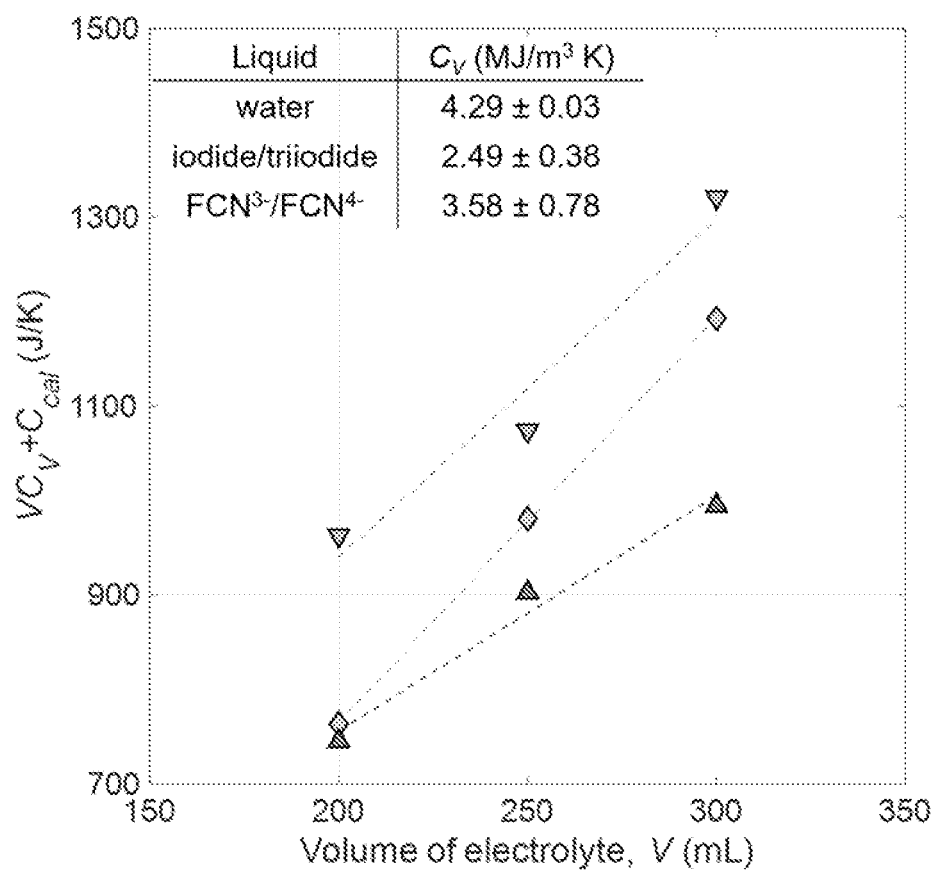
FIG. 1.14
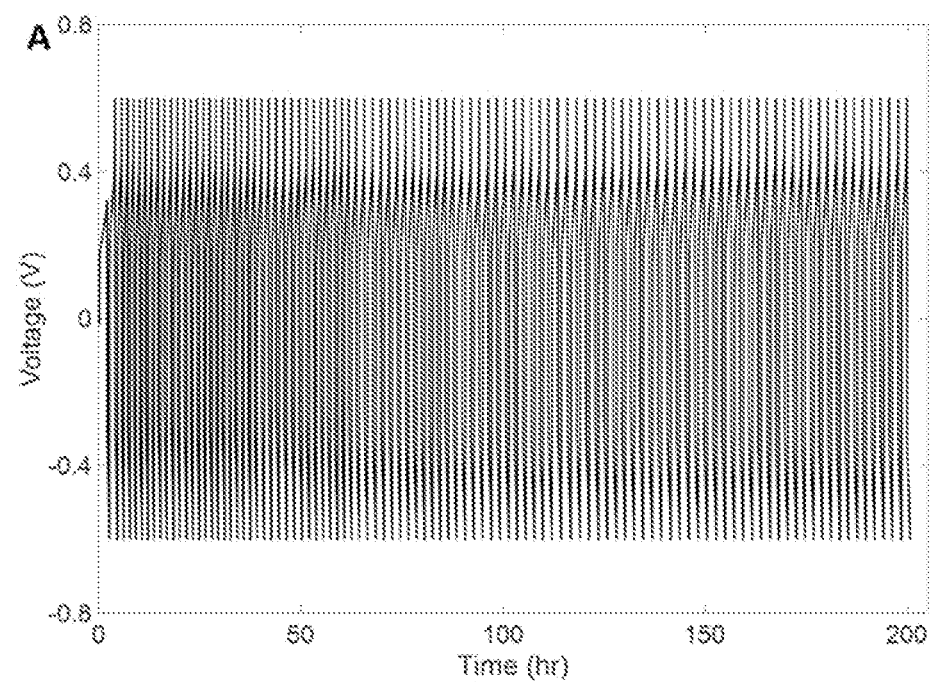
FIG. 1.15A

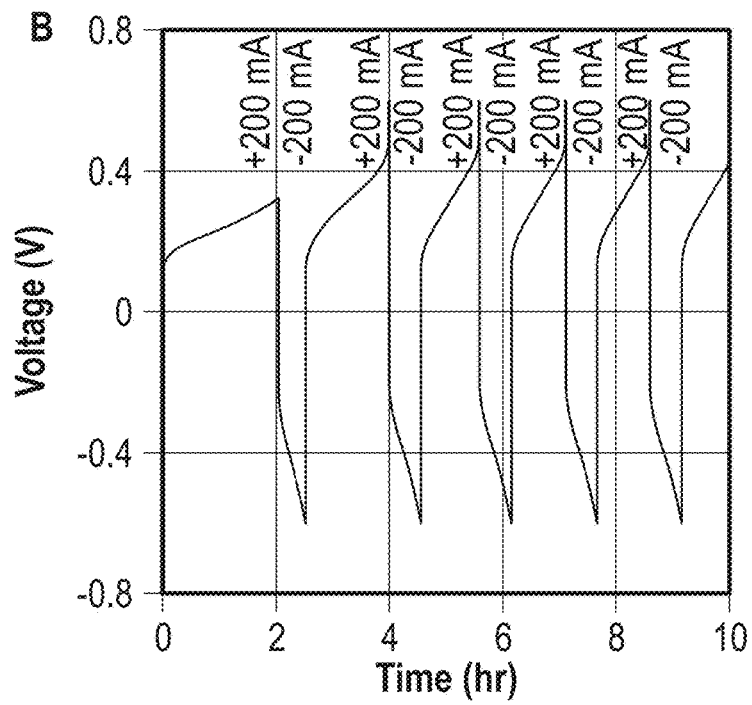
FIG. 1.15B
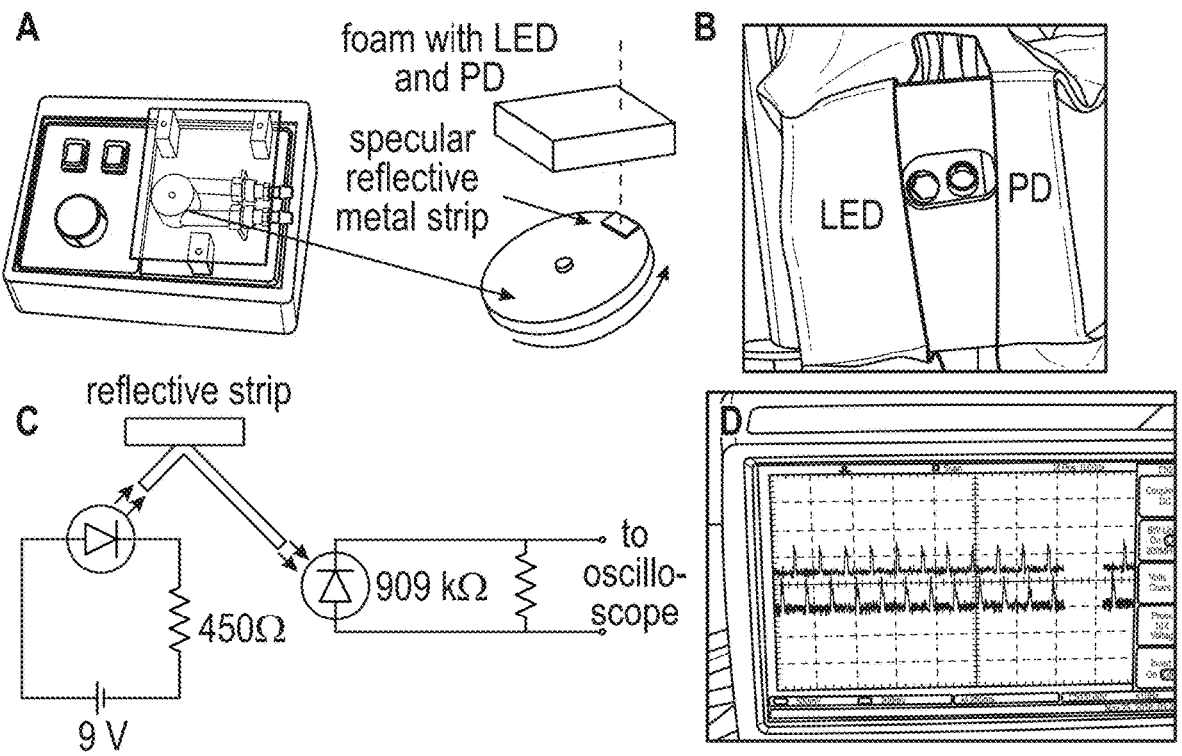
FIGs. 1.16A-1.16D

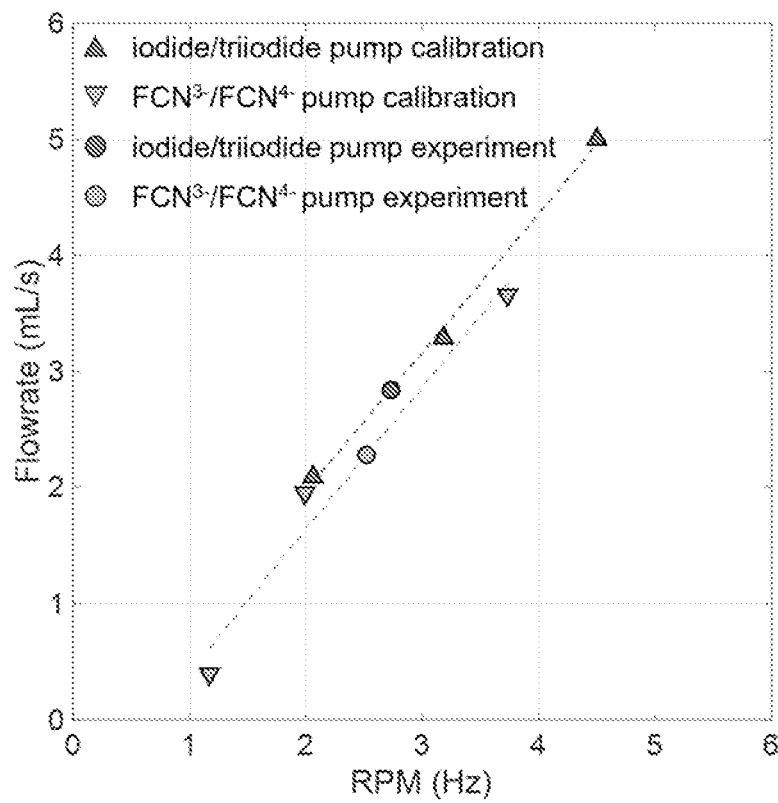
FIG. 1.17
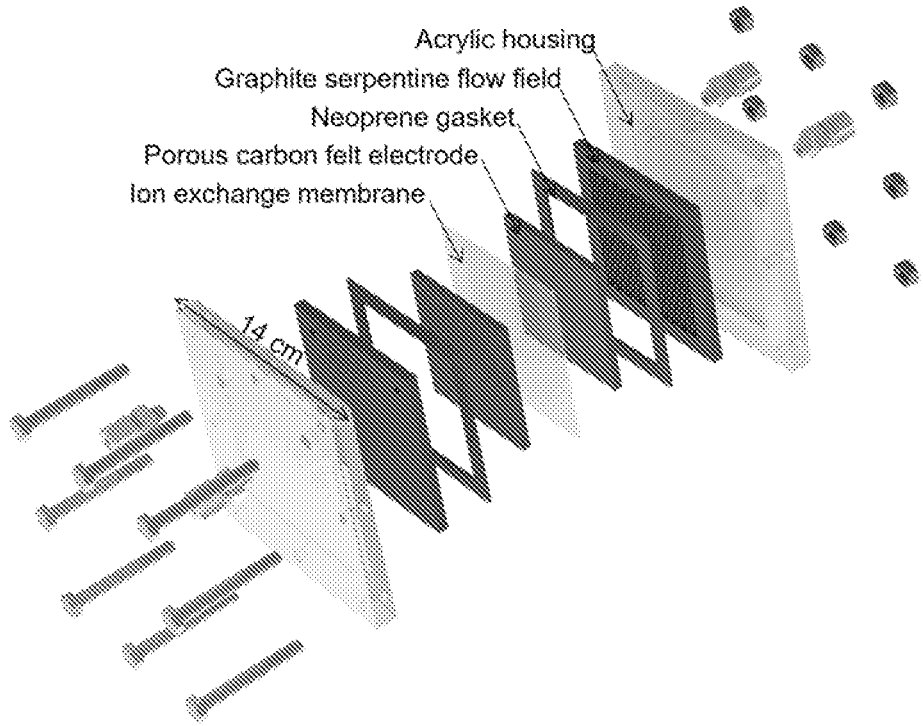
FIG. 1.18

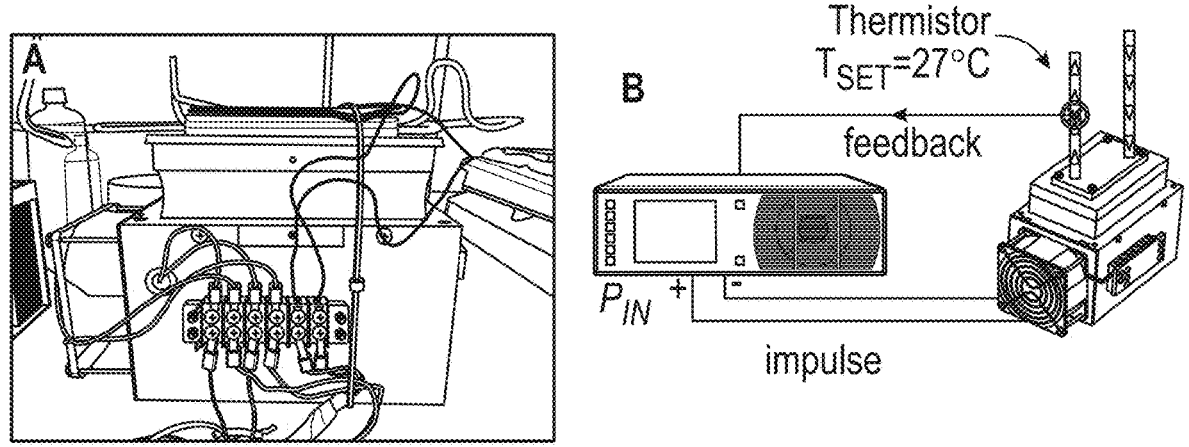
FIGs. 1.19A-1.19B
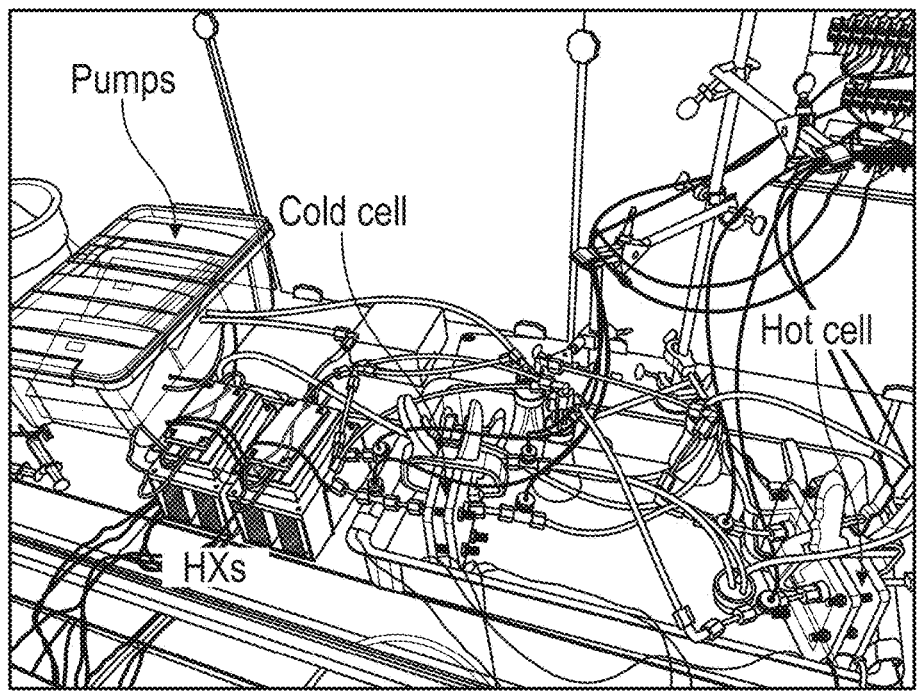
FIG. 1.20

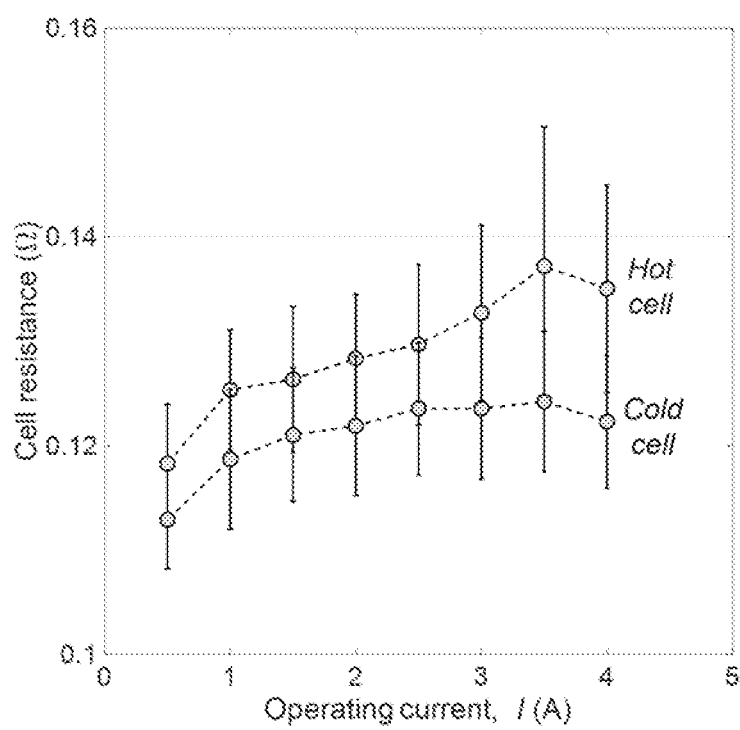
FIG. 1.21

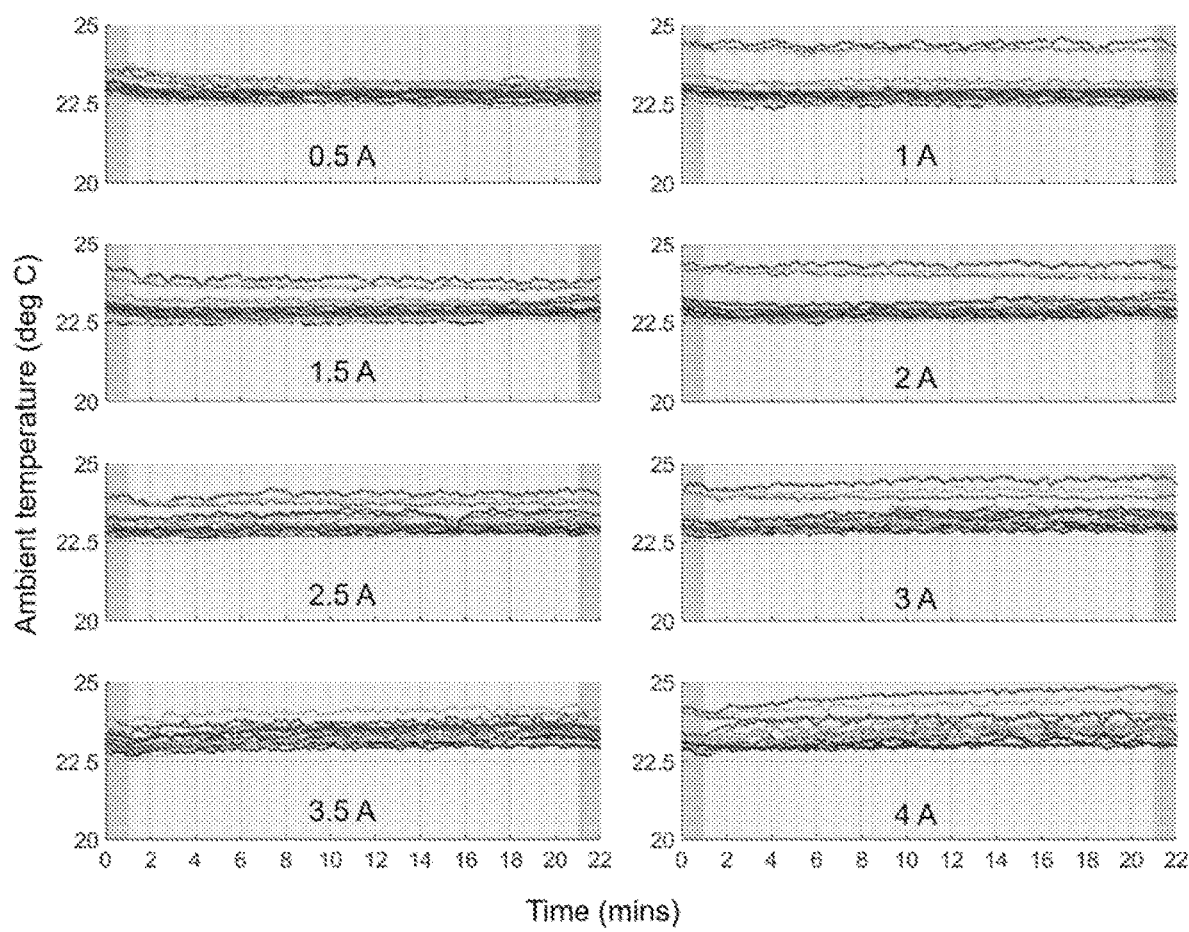
FIG. 1.22

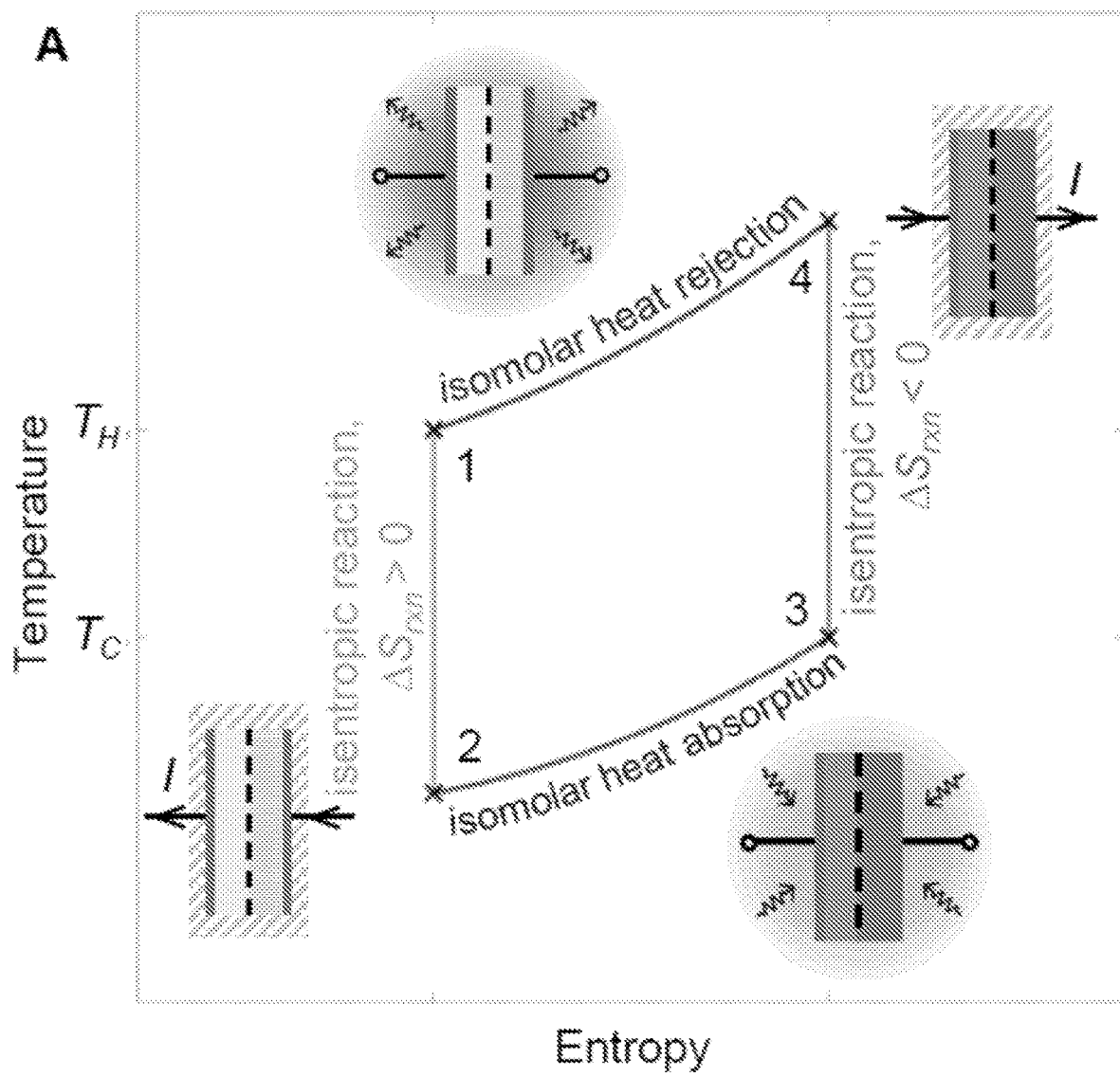
FIG. 2.1A

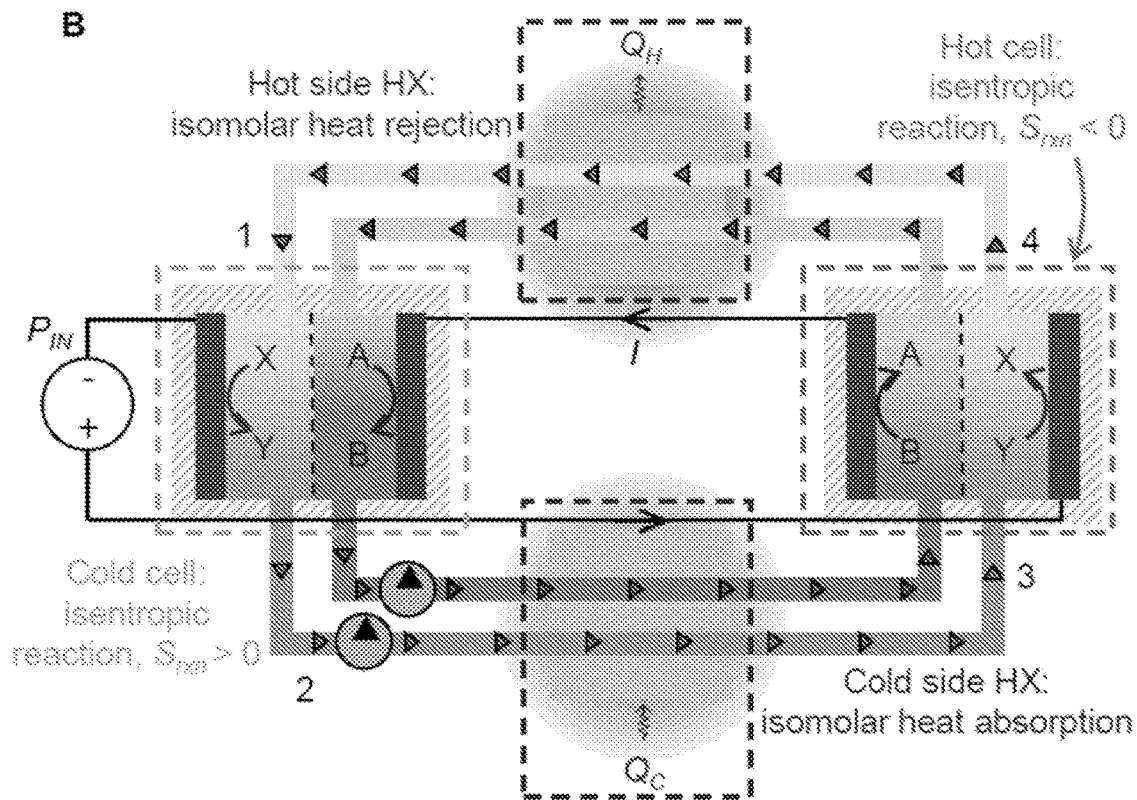
FIG. 2.1B
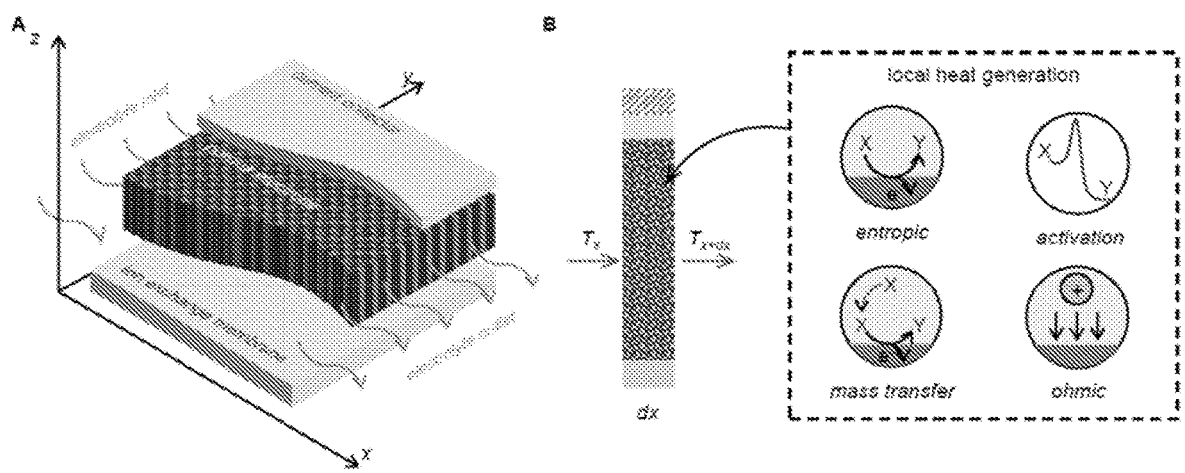
FIGs. 2.2A-2.2B

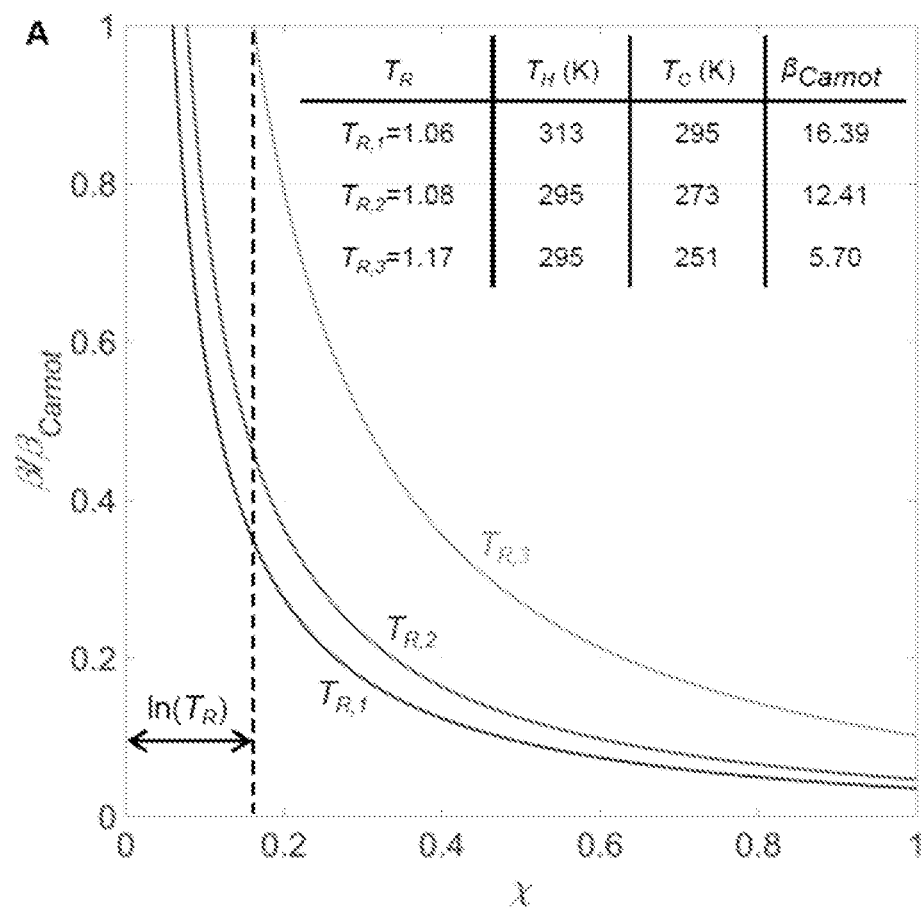
FIG. 2.3A

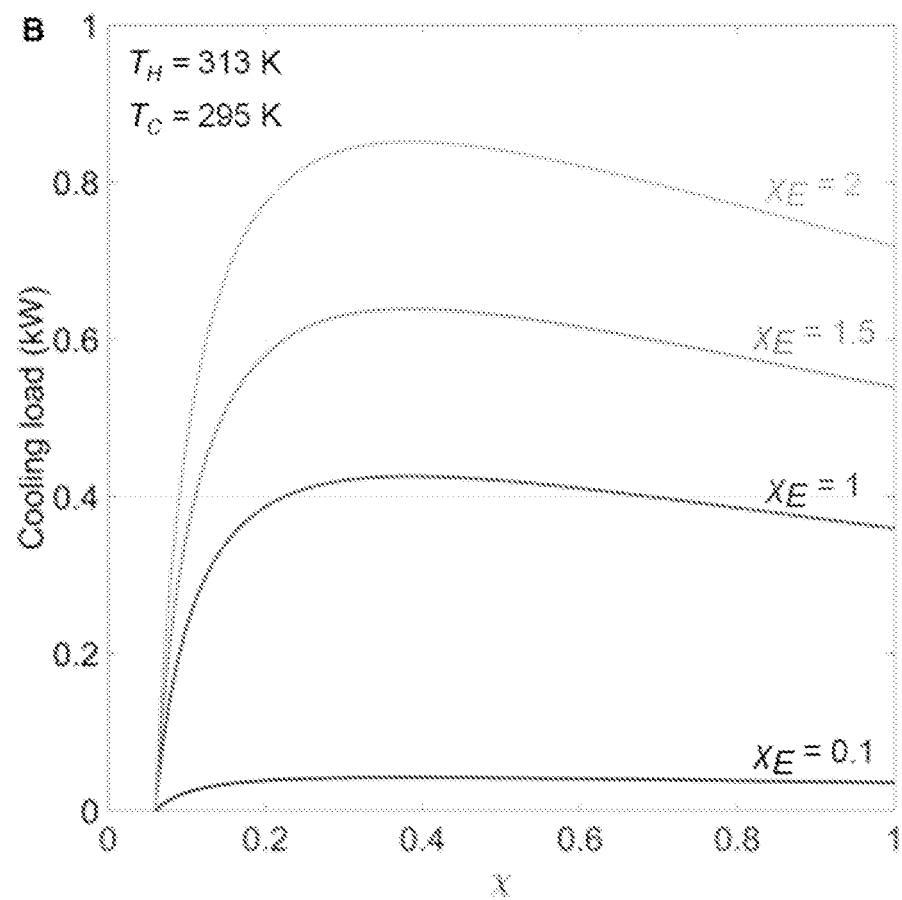
FIG. 2.3B

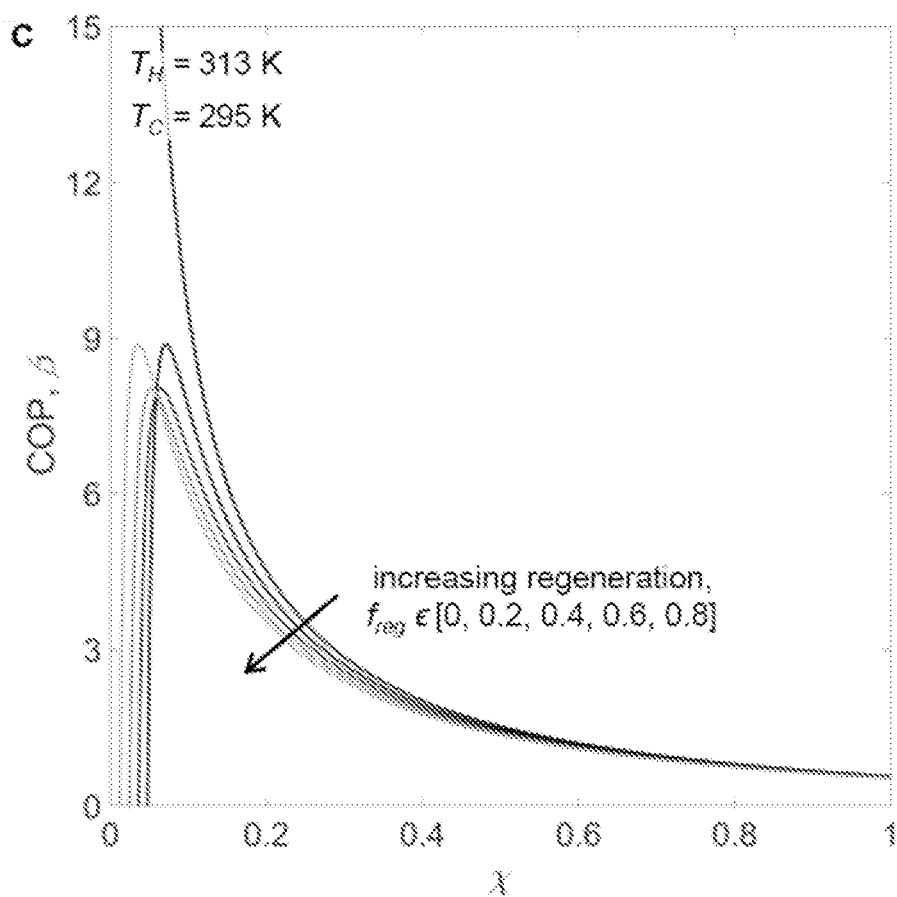
FIG. 2.3C

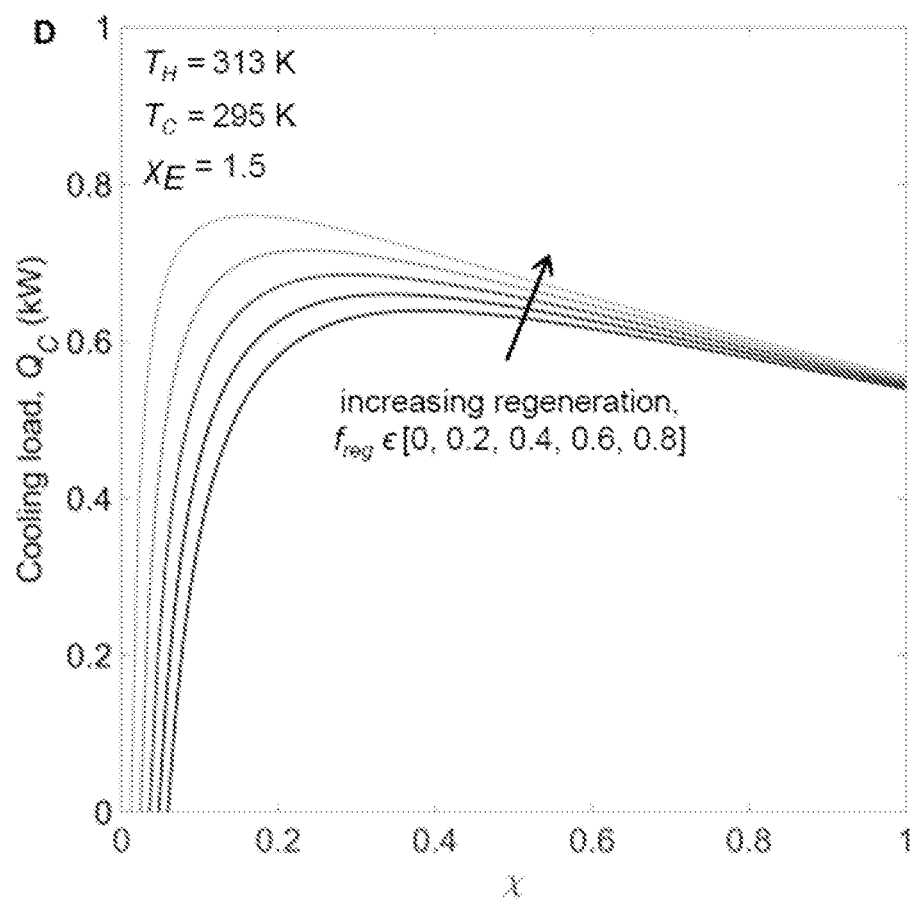
FIG. 2.3D

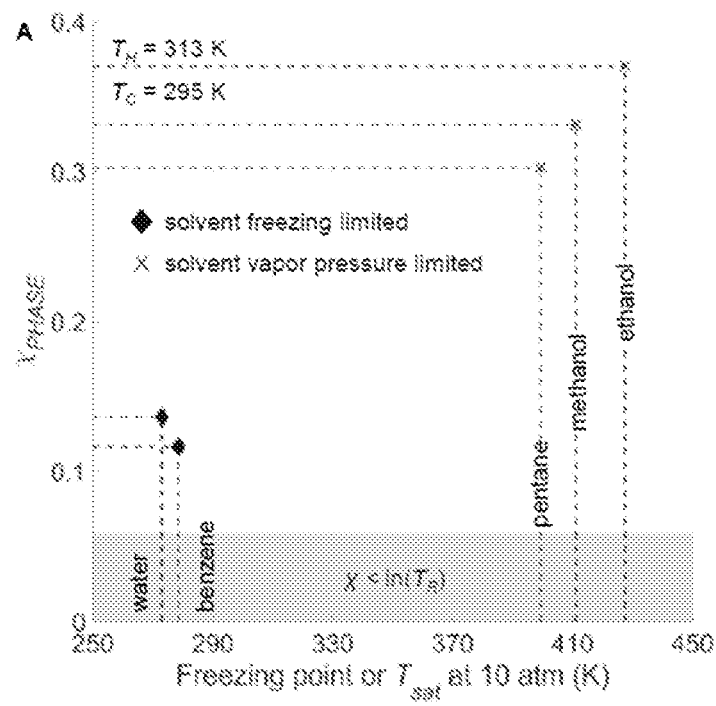
FIG. 2.4A
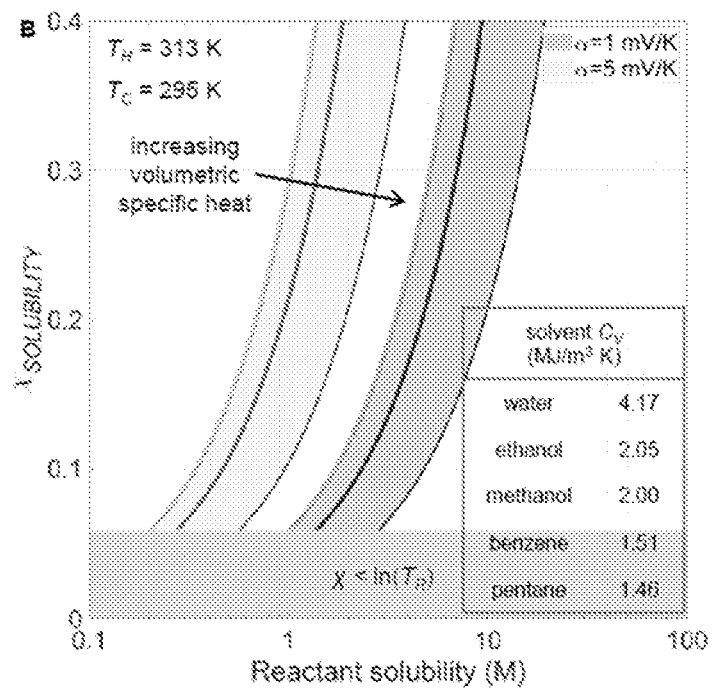
FIG. 2.4B

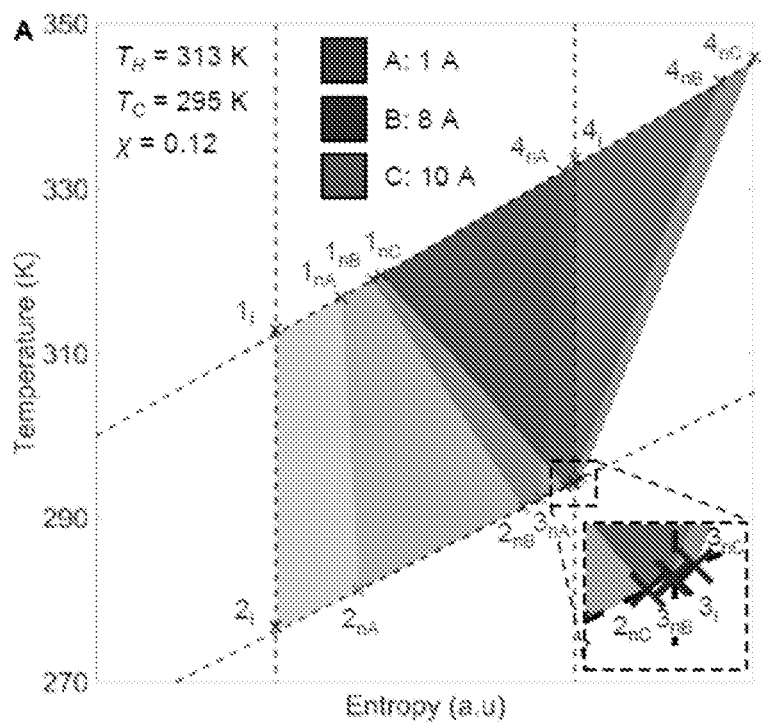
FIG. 2.5A
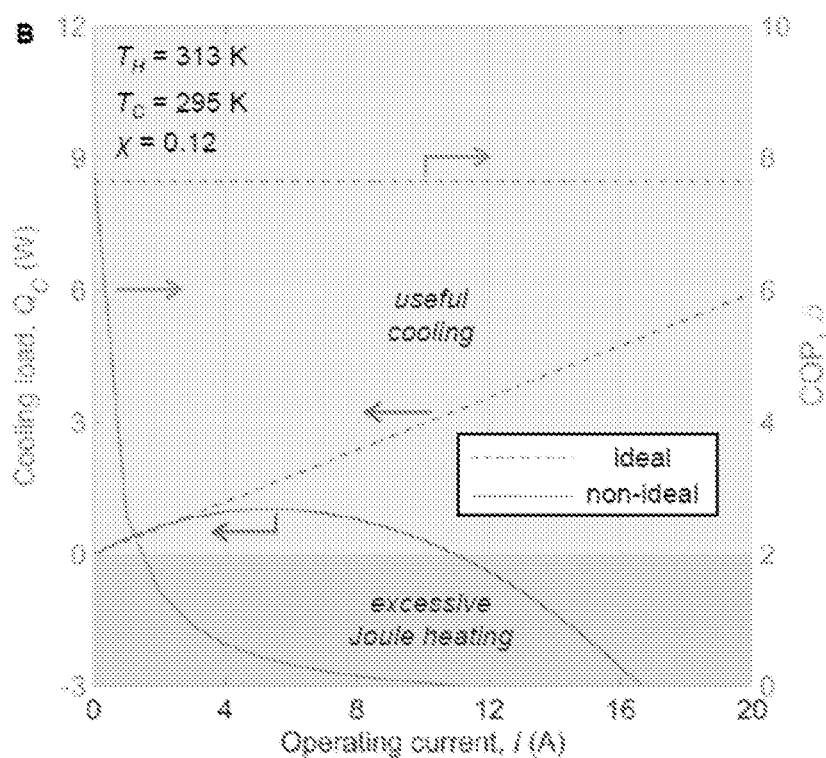
FIG. 2.5B

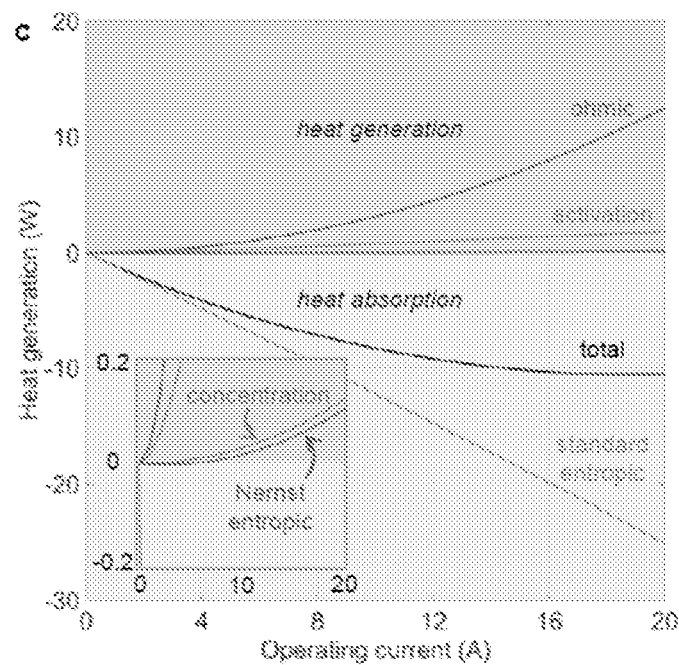
FIG. 2.5C
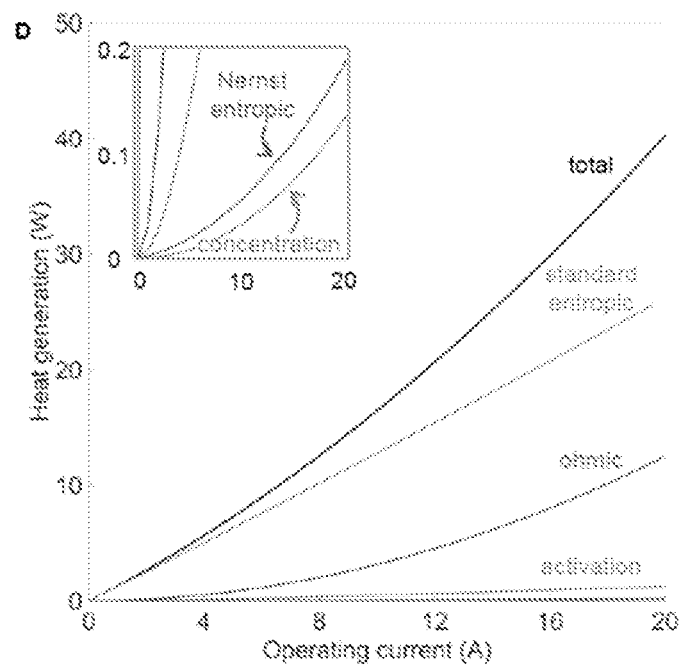
FIG. 2.5D

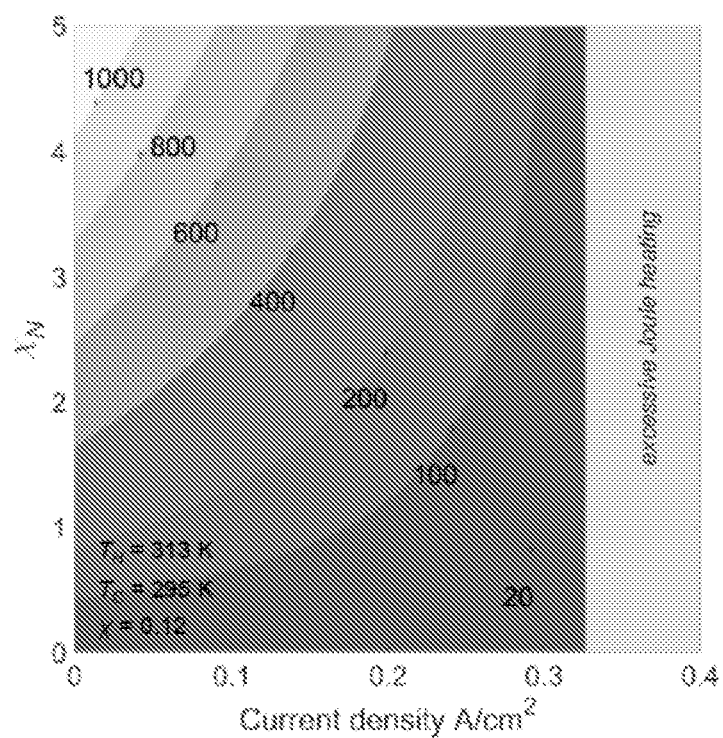
FIG. 2.6
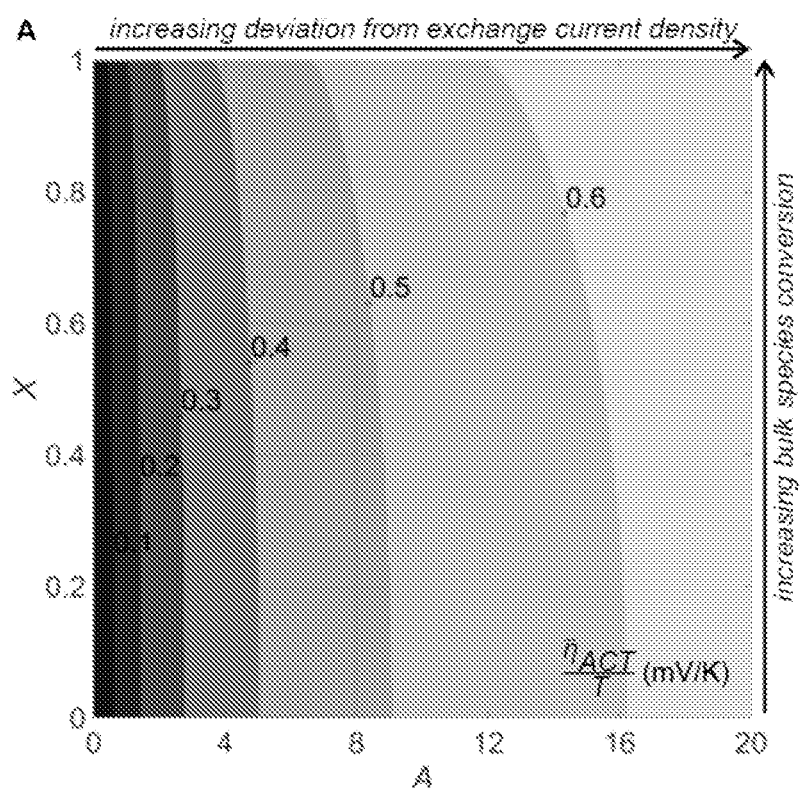
FIG. 2.7A

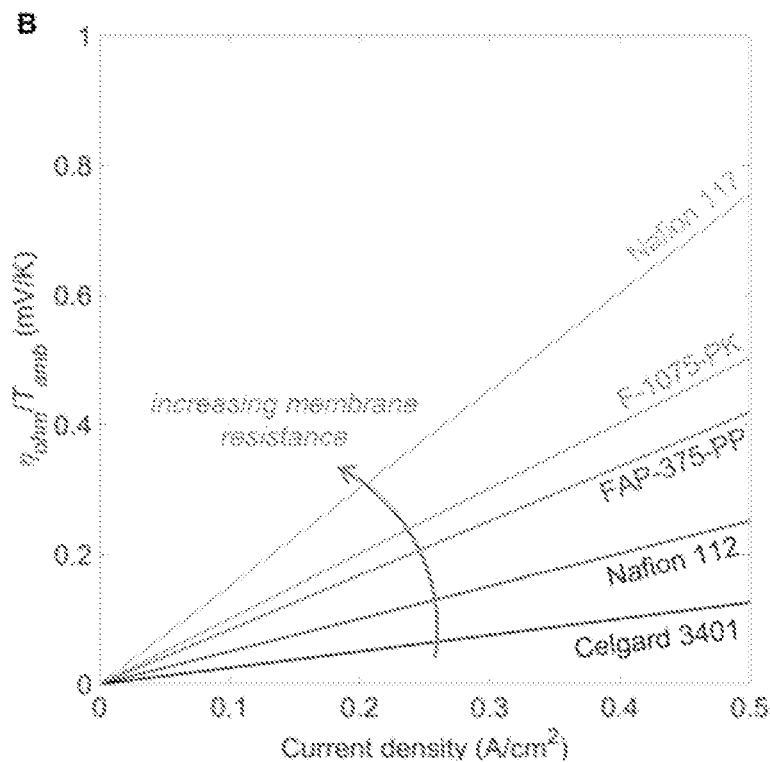
FIG. 2.7B
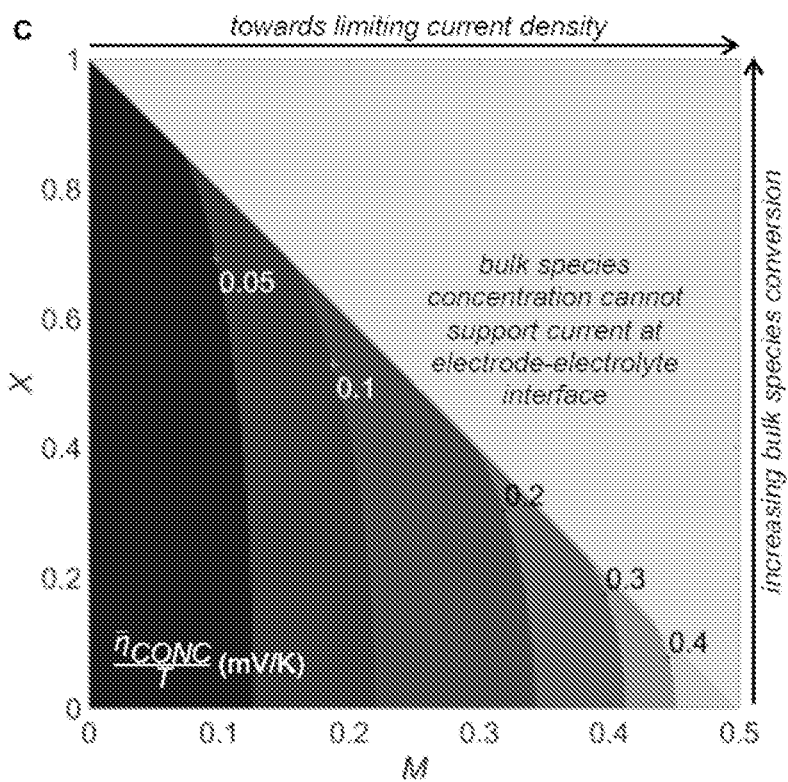
FIG. 2.7C

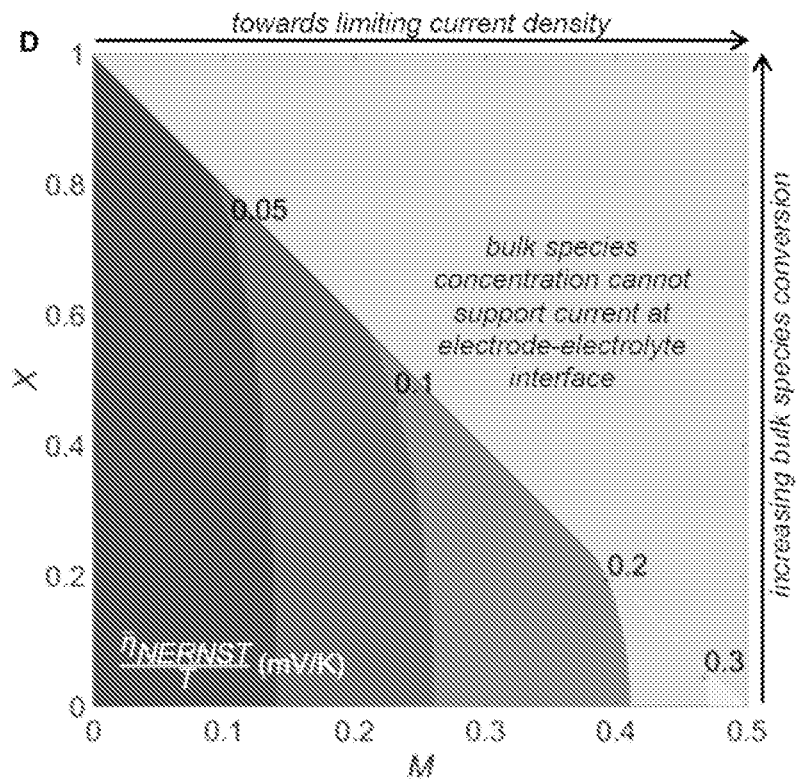
FIG. 2.7D
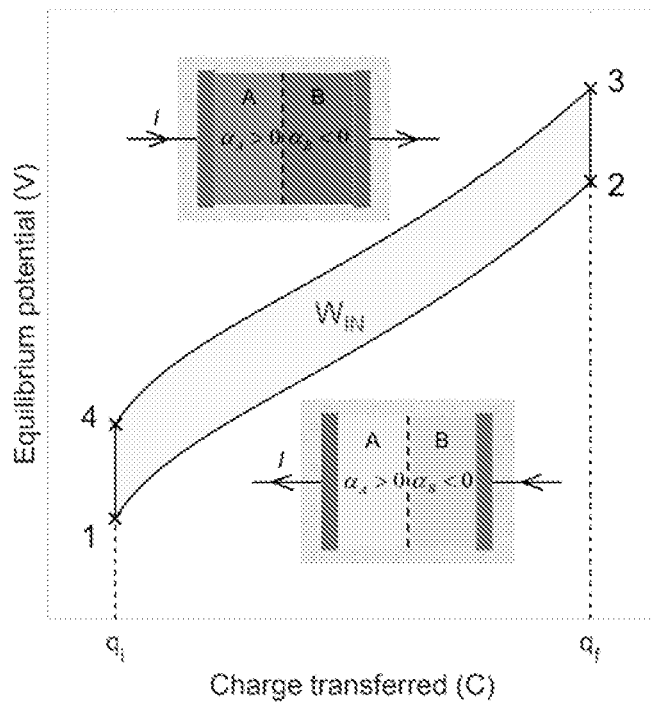
FIG. 2.8

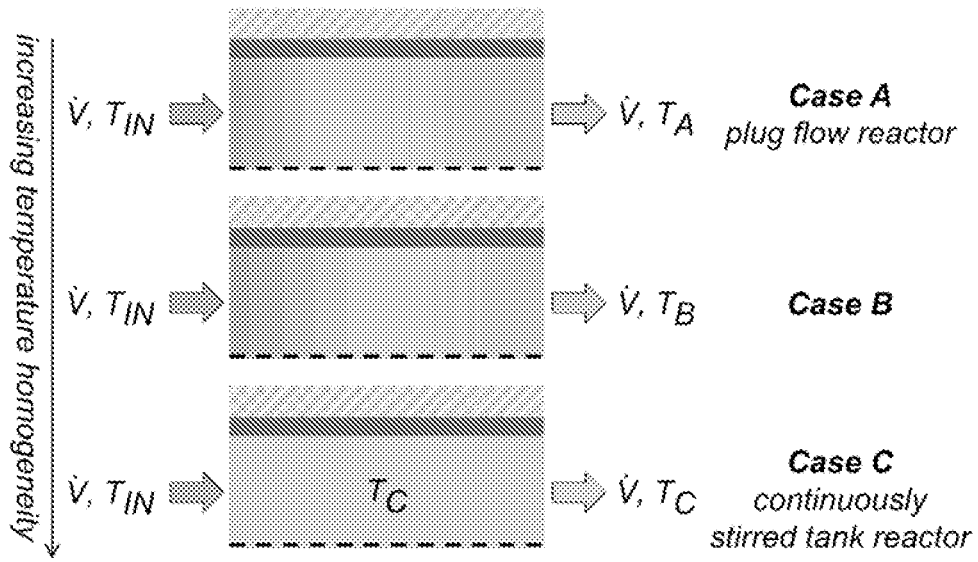
FIG. 2.9
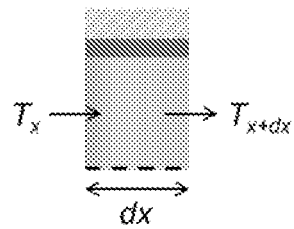
FIG. 2.10
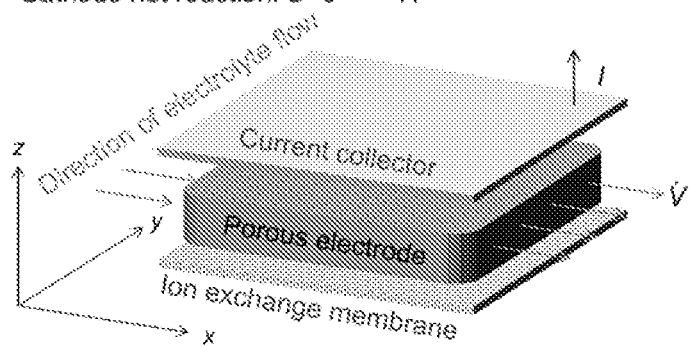
FIG. 3.11

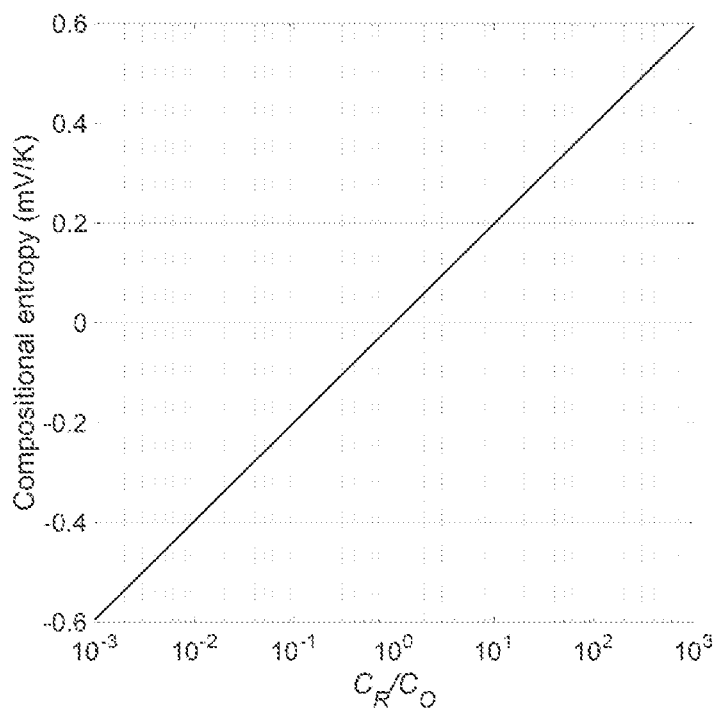
FIG. 2.12
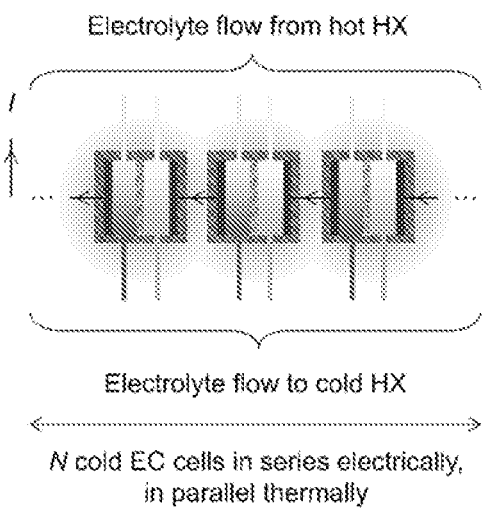
FIG. 2.13

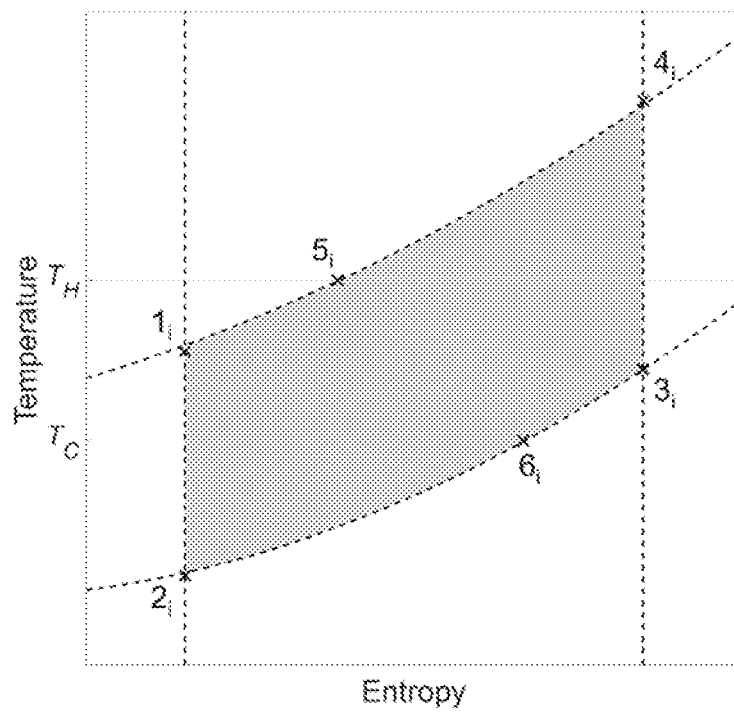
FIG. 2.14
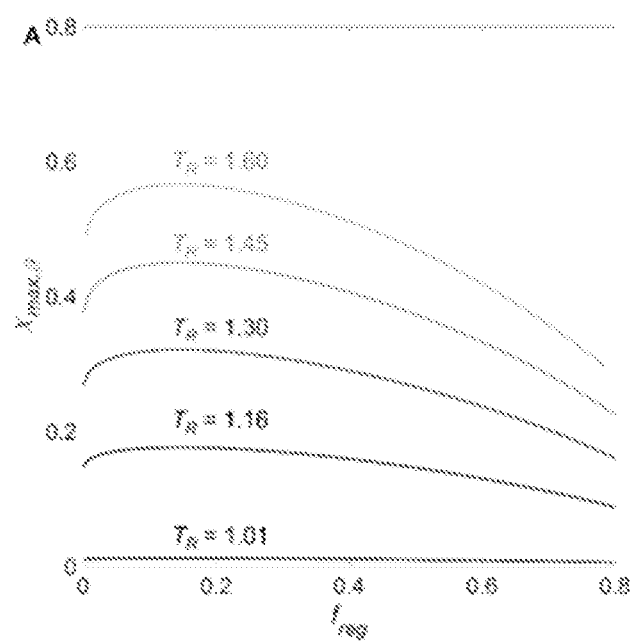
FIG. 2.15A

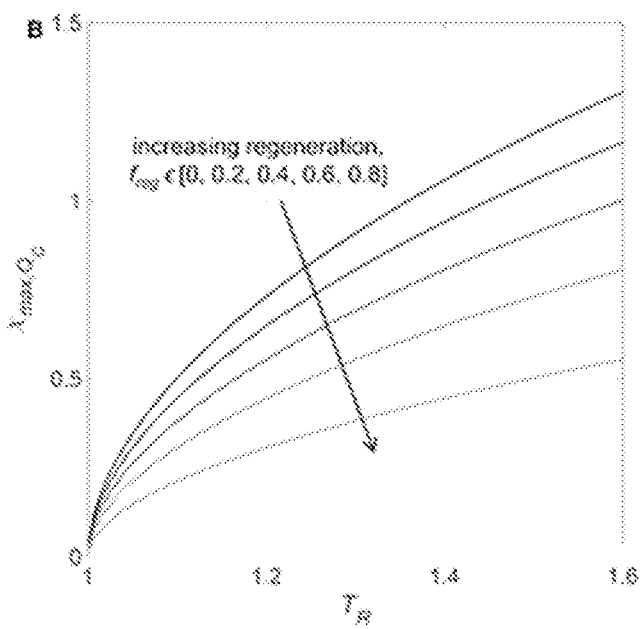
FIG. 2.15B
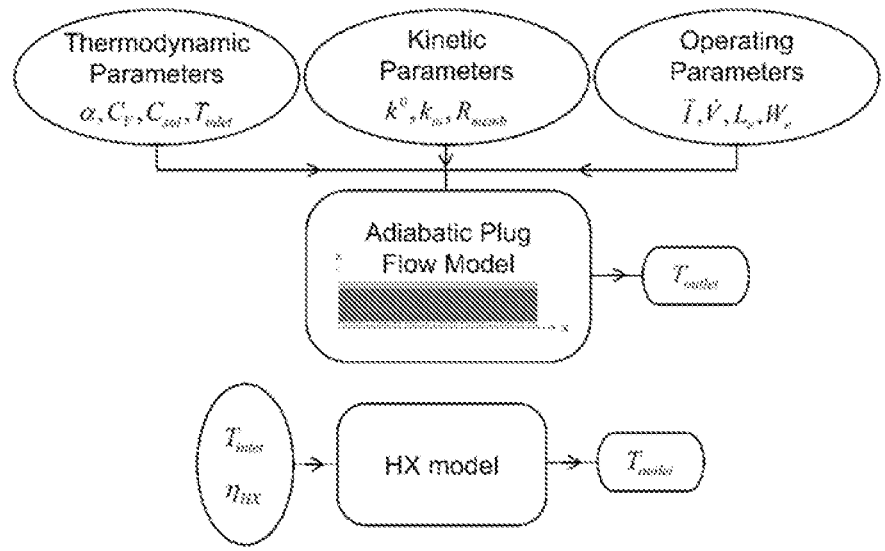
FIG. 2.16

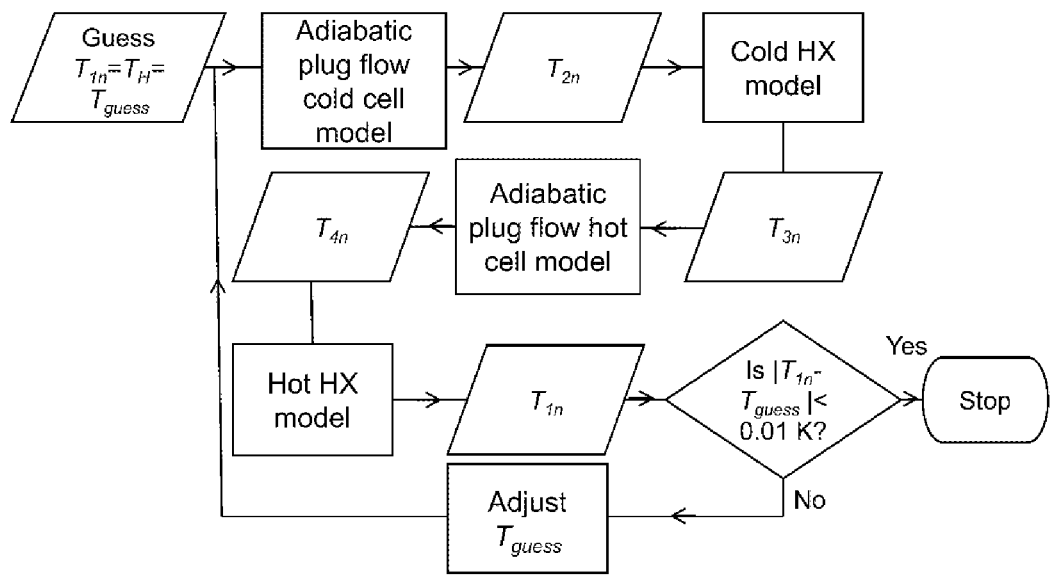
FIG. 2.17

BRAYTON ELECTROCHEMICAL REFRIGERATOR/AIR CONDITIONER

CROSS-REFERENCE TO RELATED APPLICATIONS

This application is a U.S. National Stage patent application claiming priority to PCT/US2022/023809 filed Apr. 7, 2022, which claims the benefit of U.S. Provisional Application No. 63/172,925, filed on Apr. 9, 2021 and U.S. Provisional Application No. 63/307,397 filed Feb. 7, 2022, both of which are incorporated herein by reference in their entirety.

BACKGROUND

Driven by rising regional temperatures, growing regional populations, and accelerating urbanization, global cooling demand is expected to triple by 2050. In a business-as-usual scenario, nearly all of this demand will be met using hydrofluorocarbons (HFCs) employed in vapor compression units. HFCs have global warming potentials (GWP) several times higher than that of carbon dioxide, and vapor compression associated emissions are projected to be as high as 9 $GtCO_2$-eq/yr (i.e. 15% of $CO_2$-eq emissions) by 2050.

One facet of the solution is the discovery and development of zero-GWP alternative cooling technologies. In principle, it is possible to take a heat engine, like a thermally regenerative electrochemical cycle (TREC), with sufficiently low internal irreversibility and induce refrigeration via the reverse operation with an external work input. While TRECs have been widely researched for power generation, the converse, a continuous electrochemically-driven refrigerator has not been previously demonstrated.

Electrochemically driven refrigeration has been tenuously hypothesized and modelled in the past. Duan et al. developed a numerical model for a continuous electrochemical refrigerator based on the Stirling cycle, validated the open circuit voltage and overpotentials at various states of charge and current densities, and used the numerical model to predict cooling. A Stirling type cycle inherently makes demonstration of electrochemical refrigeration difficult as the entropic heat absorption is split between the moving electrolyte, heat transfer across the electrochemical cell boundaries, and the thermal capacitance of the bespoke system. Recently, Mckay et al. demonstrated evidence of electrochemical cooling in a thermogalvanics architecture. However, the cooling load reported was ~0.12 mW, and the electrolyte was heated to 50° C. to reduce the activation overpotential. Furthermore, the maximum possible temperature span of this incarnation is limited by the tradeoff between the higher limiting current density and the thermal inertia afforded by a higher electrolyte flowrate.

However, what is needed is a system and method for steady-state, continuous, sustained electrochemical refrigeration.

SUMMARY

In accordance with the purpose(s) of the present disclosure, as embodied and broadly described herein, the disclosure, in one aspect, relates to systems and methods for electrochemical cooling and/or refrigeration.

In one aspect, the present disclosure provides for a system for electrochemical cooling, comprising: a cold electrochemical cell comprising a first ion exchange membrane, wherein a first ion flux between a first working fluid and a second working fluid across the first ion exchange membrane absorbs heat from the first working fluid and the second working fluid, lowering a temperature of the first working fluid and the second working fluid exiting the cold electrochemical cell; a heat source; a cold side heat exchanger, wherein the cold side heat exchanger absorbs heat from the heat source to increase the temperature of the first working fluid and the second working fluid flowing through the cold side heat exchanger; a hot electrochemical cell comprising a second ion exchange membrane, wherein a second ion flux between the first working fluid and the second working fluid across the second ion exchange membrane releases heat into the first working fluid and the second working fluid, raising the temperature of the first working fluid and the second working fluid exiting the hot electrochemical cell; a heat sink; and a hot side heat exchanger, wherein the hot side heat exchanger rejects absorbed heat into the heat sink to decrease the temperature of the first working fluid and the second working fluid; and wherein the first working fluid and the second working fluid circulate continuously through a first fluid path and a second fluid path that are independent of one another without physically mixing together. The present disclosure also provides for an apparatus including the system described above and herein, where the apparatus can optionally be a refrigerator, an air conditioner, or a heat pump.

In one aspect, the present disclosure provides for a method for electrochemical cooling, the method comprising: circulating a first working fluid in a first closed circuit comprising a first half of a cold electrochemical cell, a first portion passing through a cold side heat exchanger, a first half of a hot electrochemical cell, and a first portion passing through a hot side heat exchanger; circulating a second working fluid in a second closed circuit comprising a second half of a cold electrochemical cell, a second portion passing through a cold side heat exchanger, a second half of a hot electrochemical cell, and a second portion passing through hot side heat exchanger; wherein the first half of the cold electrochemical cell is separated from the second half of the cold electrochemical cell by a first ion exchange membrane; wherein the first half of the hot electrochemical cell is separated from the second half of the hot electrochemical cell by a second ion exchange membrane; and driving current from an external power supply through the cold electrochemical cell and the hot electrochemical cell, wherein the current drives a first redox reaction in the cold electrochemical cell, where the first redox reaction has an entropy change greater than 0, and wherein the current drives a second redox reaction in the hot cell, where the second redox reaction is a reverse of the first redox reaction, and wherein the second redox reaction has an entropy change less than 0; wherein the system produces a temperature drop.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1.1A-1.1B show the concept for the Brayton Electrochemical Refrigerator (BECR). FIG. 1.1A: Temperature-entropy diagram for the BECR cycle showing the nature of the four constituent processes that convert the electrolytes sequentially and cyclically from states 1 to 4. QH and QC are the rejected heat and the absorbed heat, respectively. The area enclosed within the cycle is the electrical work input required to drive the cycle. FIG. 1.1B: Schematic showing the essential components operating in a continuous scheme. Two redox active electrolytes shown in dark gray (A+e$^-$ ⇌ A') and light gray (B'+e$^-$ ⇌ B) are pumped (shown using solid triangles) through four components, each corresponding to one process shown in FIG. 1.1A and marked by the associated electrolyte states. An external power supply consumes power $P_{IN}$ and drives current I through an adiabatic cold (electrochemical) cell, driving a net electrochemical reaction A+B→A'+B' with $\Delta S_{rxn}$>0 isentropically. The entropic heat required for the electrochemical reaction is absorbed from the lattice of the electrolytes, lowering the temperature of the electrolytes exiting the cold cell. A cold side heat exchanger (HX) absorbs heat (represented by squiggly arrows) from a cold source $T_C$ devoid of any electrochemical reaction. The power supply also drives the opposite electrochemical reaction, A'+B'→A+B with $\Delta S_{rxn}$<0, in the adiabatic hot cell. In this cell, entropic heat liberation raises the temperature of the electrolytes exiting the hot cell. The hot side HX rejects absorbed heat into a hot sink $T_H$. Current continuity in the electrochemical cells is preserved by an ion exchange membrane that allows for an ionic current, shown to be cationic in this schematic.

FIGS. 1.2A-1.2B show electrolyte characterization. FIG. 1.2A: Temperature coefficients of the individual electrolytes (non-isothermal measurement) and the full cell (isothermal measurement) as a function of the state of charge (SOC). The direction of the reaction occurring in the cold electrochemical cell was chosen to be the SOC reference. The dashed lines are linear fits that describe the temperature coefficients as a function of the SOC. FIG. 1.2B: The linear fit from the previous panel and the specific heat capacity of the electrolyte are used to calculate the expected drop in electrolyte temperature as function of reaction extent along the isentropic path for a closed electrochemical cell. The initial configuration starts at 90% SOC with the electrolytes in thermal equilibrium at 300 K. For this calculation, it is assumed that the ion exchange membrane has infinite thermal resistance.

FIGS. 1.3A-1.3D show BECR proof-of-concept. Schematics showing the (FIG. 1.3A) thermo-hydraulic and (FIG. 1.3B) electrical connections of the experimental setup. FIG. 1.3C: Representative data set for 1.5 A showing the time variation of the electrolyte temperatures at the inlets and outlets of the electrochemical cells and the cell voltages. FIG. 1.3D: Time variation of the cold cell outlet and inlet temperature differential for three representative current values. Here, $\Delta T_{ij}$ is the difference between the cold cell electrolyte outlet and inlet temperatures and is defined as $T_{ci}-T_{cj}$. The dark gray regions are when no current is sourced, and the indicated current is sourced in the light gray domain. In FIGS. 1.3B-1.3C, the lines and associated shaded regions represent the mean value and standard deviation of the indicated parameter over six repetitions.

FIGS. 1.4A-1.4E show BECR performance. Electrolyte specific cooling loads for the (FIG. 1.4A) $I_3^-/I^-$ and (FIG. 1.4B) FCN$^{3-}$/FCN$^{4-}$ electrolytes as a function of the operating current. Shaded top regions indicate a positive cooling load where the entropic heat absorption dominates Joule heat and the electrolytes are capable of cooling. Shaded regions near the bottoms of FIGS. 1.4A-1.4B indicate a negative cooling load due to excessive Joule heating. Electrolyte specific rejected heat for the (FIG. 1.4C) $I_3^-/I^-$ and (FIG. 1.4D) FCN$^{3-}$/FCN$^{4-}$ electrolytes as a function of the operating current. FIG. 1.4E: Measured and predicted values of the coefficient of performance (COP) and total cooling load as a function of the operating current. Markers and error bars (visible if bigger than the marker) represent the mean value and standard deviation of the quantity across six repetitions. The lines and shaded bounds of the predicted COP (too small to be visible) and cooling load represent the same. Dashed lines serve as guides for the measured values.

FIGS. 1.5A-1.5B show a comparison of refrigeration technologies. FIG. 1.5A: Electrochemical refrigeration (EC) compared against popular refrigerants used in magnetocaloric (MC), thermoelectric (TE), vapor compression (VC), metal hydride (MH) and absorption (Ab) refrigeration along the axes of the maximum possible gravimetric entropy change ($\Delta S$) and the inverse of the gravimetric specific heat capacity ($C^{-1}$). FIG. 1.5B: Comparison of the entropy per unit carrier normalized by the universal gas constant, R, for the same technologies along with the corresponding physical nature of the transformations.

FIG. 1.6 shows schemes to achieve electrochemical cooling. Isothermal heat absorption [P→I] and isentropic change in temperature [P→A] are two orthogonal schemes that can be used to achieve refrigeration. Both these processes can be used in conjunction with electrochemical reactions to achieve electrochemical refrigeration.

FIG. 1.7 shows Stirling and Brayton cycles for electrochemical refrigeration. Employing electrochemical refrigeration in thermodynamic cycles via the isothermal [P→I] and isentropic [P→A] schemes manifest as the Stirling and Brayton cycles respectively. The expressions for $Q_C$ and $\Delta T$ for the two schemes are obtained as described below in the limit of no irreversible heat generation.

FIGS. 1.8A-1.8D show experimental setup and procedure for non-isothermal temperature coefficient measurements. (FIG. 1.8A) Disassembled and (FIG. 1.8B) assembled electrochemical cell used for non-isothermal temperature coefficient measurements. (FIG. 1.8C) Assembled electrochemical cell with electrolyte placed between two thermoelectric modules before the experiment is run. (FIG. 1.8D) Schematic showing the experimental process and how the non-isothermal coefficient is obtained from the raw data.

FIGS. 1.9A-1.9D show experimental setup and procedure for isothermal temperature coefficient measurements. (FIG. 1.9A) Disassembled isothermal electrochemical cell comprising of (1.) the electrodes, (2.) the cell housing, (3.) the current collectors, and (4.) the Nation membrane used for the isothermal temperature coefficient measurements. (FIG. 1.9B) Assembled electrochemical cell loaded with electrolytes and equipped with redundancies to prevent mass transfer. (FIG. 1.9C) The completely assembled electrochemical cell placed between the thermoelectric modules. (FIG. 1.9D) Schematic showing the experimental process and how the isothermal temperature coefficient is measured.

FIGS. 1.10A-1.10B show calculation of isothermal temperature coefficient from raw data. (FIG. 1.10A) Typical data acquired from one isothermal temperature coefficient measurement. The top plot shows the temperatures of the graphite current collectors. While these come to thermal equilibrium relatively soon, they are not indicative of thermal equilibrium. Thermal equilibrium is achieved in the domains indicated by the boxed regions in the bottom plot. At these times, the open circuit voltage does not change with time and therefore, there is no change in the temperature profile anywhere within the cell. (FIG. 1.10B) Variation of the open circuit voltage with temperature. A criterion is used to determine the times of thermal equilibrium in (FIG. 1.10A) and the voltage and average temperatures corresponding to those times are used to populate (FIG. 1.10A). The slopes of the linear regression (shown as dashed lines) are the temperature coefficients that populate FIGS. 1.2A-1.2B.

FIG. 1.11 shows styrofoam calorimetry schematic for electrolyte specific heat capacity. Heat generated by a resistive heater is distributed in the liquid via fast stirring, raising its temperature T. The temperature is monitored using 4 RTDs to evaluate the specific heat capacity of the liquid.

FIGS. 1.12A-1.12B show styrofoam calorimetry experimental setup. (FIG. 1.12A) Resistive heater and the four RTDs affixed to a piece of acrylic for integrity. (FIG. 1.12B) The same prior to immersion in the liquid of interest, the iodide/triiodide electrolyte in this case. The setup is place on a magnetic stirrer that turns a stir bar in the liquid.

FIG. 1.13 shows raw data from calorimetry experiments. A typical temperature-time achieved during the specific heat capacity measurements. A noise floor regime exists during the nascency of the run as the RTDs are not sensitive to the change in temperature. This region is truncated. The linear temperature rise (characteristic of an exponential growth at very short time) is used to inform the specific heat capacity.

FIG. 1.14 shows electrolyte specific heat capacity measurement from calorimetry experiments. Variation of the total thermal inertia with the volume of liquid used. The slope of the linear regression (shown as dashed lines) is the volumetric specific heat evaluated in the attached table. The uncertainties are acquired from the standard error of the fits. Note that the y intercept for the three liquids is different due to the addition of polymer glue to the exposed resistor leads to prevent corrosion.

FIGS. 1.15A-1.15B show long duration cycling data. (FIG. 1.15A) Raw data of the galvanic-electrolytic cycling performed for 100 cycles over the course of ~200 hours. (FIG. 1.15B) Zoomed in version of (FIG. 1.15A). Regions accompanied by black text represent an electrolytic current i.e. conventional current entering the cathode and regions accompanied by gray text represent a galvanic current i.e. conventional current leaving the cathode. The two types of regions represent the direction of chemical reaction occurring within the cold and hot electrochemical cell in the BECR cycle respectively.

FIGS. 1.16A-1.16D show optical tachometer retrofit to measure electrolyte flowrate. Collage of the optical tachometry technique used to measure the pump RPM (FIG. 1.16A) A reflective metal foil is placed on the rotating pump head. At a point in the rotation, the foil is directly below the (FIG. 1.16B) LED and photodiode. (FIG. 1.16C) Circuit diagram showing the elements used to acquire a time-varying voltage that is recorded by an oscilloscope (FIG. 1.16D) The periodic time-varying traces from both pumps as captured by the oscilloscope.

FIG. 1.17 shows RPM vs. flowrate calibration experiments. Calibration curves and measured flowrates for both electrolyte pumps obtained using the optical tachometry technique.

FIG. 1.18 shows an exploded view of the CAD model of the cells employed as the cold and hot electrochemical cells.

FIGS. 1.19A-1.19B show active heat exchangers developed for this work. (FIG. 1.19A) One of the active heat exchangers made using a thermoelectric module attached to a stainless-steel tube liquid path embedded in a copper block. (FIG. 1.19B) A closed loop that employed the active heat exchanger and programmable temperature controller were used to regulate the temperature of the electrolyte leaving the heat exchanger to $T_{SET}=27°$ C. This temperature regulated electrolyte then entered both the inlets of the cold and hot electrochemical cells.

FIG. 1.20 shows BECR proof-of-concept. A photograph of the completely assembled proof-of-concept experiment setup inside a fume hood. Not pictured are the programmable temperature controllers, data acquisition units, and galvanostat.

FIG. 1.21 shows variation of cell resistance with operating current for both electrochemical cells. At higher currents, the resistance remains fairly constant indicating ohmic behavior. This is further corroborated by the low Damkohler number (and therefore low conversion) which implies that the system is operating far from the mass-transfer regime. Markers and error bars represent the mean value and standard deviation across six repetitions. The dashed lines serve as guides.

FIG. 1.22 shows ambient temperature traces during BECR proof-of-concept. Three thermocouples were placed in random locations around the setup to measure the ambient temperature during all repetitions for all currents. There is no correlation between these trends and the onset of the current. This is compelling evidence that the change in the electrolyte temperature is due to the electrochemical reaction. As in FIGS. 1.3B-1.3C, dark grey areas are when there is no electrical current through the system and the light grey areas represent a non-zero current flowing through the electrochemical cells.

FIGS. 2.1A-2.1B show the Brayton electrochemical refrigerator (BECR) operating principle FIG. 2.1A: Temperature-entropy diagram describing how a generic electrochemical system can achieve refrigeration in four sequential steps based on the ideal BECR cycle. FIG. 2.1B: Schematic of a continuous BECR system that employs all-soluble redox couples in a solvent, open electrochemical cells based on flow battery architectures, appropriate heat exchangers, and pumps.

FIGS. 2.2A-2.2B show key features of low order model developed for an adiabatic plug flow electrochemical cell. FIG. 2.2A: The energy balance to predict the temperature change of electrolytes in an adiabatic plug flow cell is performed on the depicted domain: a porous electrode and one-half of the IEM. The flow profile, and therefore the temperature and concentration profiles are one-dimensional. FIG. 2.2B: The local heat generation that governs the flow-wise change of the electrolyte temperature is composed of entropic heat absorption or generation, depending on the direction of the half-cell reaction, and electrochemical overpotentials (activation, mass transfer, and ohmic) that always generate heat.

FIGS. 2.3A-2.3D show ideal BECR cycle performance. FIG. 2.3A: The influence of the BECR operating parameter $\chi$ on COP ($\beta$)-Carnot COP ($\beta_{Carnot}$) fraction for three temperature ratios $T_R$ corresponding to a specific hot side temperature $T_H$ and cold side temperature $T_C$. FIG. 2.3B: Variation of the cooling load QC with $\chi$ for different values of entropic driving force $\chi_E$ for an ideal BECR cycle used in a space cooling application. The influence of $\chi$ on (FIG. 2.3C) COP and (FIG. 2.3D) cooling load (for a given value of the entropic driving force, $\chi_E$=1.5) parametrized by regeneration, $f_{reg}$, up to 80% for the same space cooling application.

FIGS. 2.4A-2.4B show practical material considerations for the BECR cycle Maximum applicable to a BECR cycle operating in a space cooling application as a function of (FIG. 2.4A) solvent freezing and evaporation, and (FIG. 2.4B) insufficient reactant solubility. The dark gray regions denote the values of for which no cooling is attainable.

FIGS. 2.5A-2.5D show non-ideal BECR cycle performance. The predicted performance of a non-ideal BECR cycle with N=1, operating at $\chi$=0.12 in a space cooling application. FIG. 2.5A: Temperature-entropy diagrams of the non-ideal BECR cycles increasingly deviate from the ideal cycle (shaded in light gray for reference) with higher operating current (1 A, 8 A, or 10 A, shown in increasing shades of dark gray). Subscripts i, n, and A, B, or C indicate ideal scenarios, non-ideal scenarios, and the operating currents in the legend, respectively. FIG. 2.5B: Cooling load and COP of the non-ideal BECR cycle in comparison to their ideal cycle counterparts as a function of the operating current. The operating current dependent contributions of individual effects on the heat generation in the (FIG. 2.5C) cold cell and (FIG. 2.5D) hot cell.

FIG. 2.6 shows Scaling the non-ideal BECR cycle for higher cooling loads Cooling load (in W) for non-ideal BECR cycle as a function of entropic driving force $\chi_E$ and operating current density. As opposed to FIGS. 2.5A-2.5D, higher values of N are allowed here and factored in to $\chi_E$. All thermodynamic, kinetic, and electrochemical cell dimensions are the same as in FIGS. 2.5A-2.5D.

FIGS. 2.7A-2.7D show electrochemical overpotentials as a function of their corresponding figures-of-merit, X, A, or M. FIG. 2.7A: Electrode volume averaged activation overpotential normalized by temperature as a function of the dimensionless parameters A and X. FIG. 2.7B: Ohmic overpotential normalized by $T_{amb}$=298 K as a function of current density for different commercially available ion exchange membranes or separators. Electrode volume averaged and temperature normalized (FIG. 2.7C) concentration overpotential and (FIG. 2.7D) Nernst entropic terms as a function of the dimensionless parameters M and X. The dimensionless parameters X represents the degree of bulk species conversion of the limiting reagent species, A represents the deviation from the exchange current density, and M represents the proximity to the limiting current density.

FIG. 2.8 shows equilibrium potential versus charge transferred plot for the sequential BECR cycle. An electrochemical system that is best equipped to induce refrigeration has its temperature lowered by the application of a cathodic current through a half-cell reaction with and an anodic current through a half-cell reaction with $\alpha$>0. This process is illustrated in the inset figure under the path connecting states 1 and 2. The opposite occurs for the system as it heats up from state 3 to 4. The shaded area under the curve represents the electrical work input required from an external power supply.

FIG. 2.9 shows three cases showing the effect of internal mixing mechanisms within one electrode. Case A with the least amount of dispersion is likened to a plug flow reactor and case C, with maximal dispersion is likened to a continuously stirred tank reactor. All three cases are adiabatic to facilitate isentropic reactions.

FIG. 2.10 shows differential volume energy balance for case A of FIG. 2.9.

FIG. 2.11 shows a schematic depicting the domain for which a low order 1D model for the BECR cycle was developed.

FIG. 2.12 shows compositional entropy for n=1 as a function of the ratio of the concentrations of the reduced and oxidized species.

FIG. 2.13 shows electrochemical cell stacking to achieve higher degrees of chemical conversion for specific flowrate and operating current values.

FIG. 2.14 shows a temperature entropy diagram of an ideal BECR cycle with some regeneration. The addition of a regenerator in to the BECR cycle adds an internal heat exchange process between the electrolytes (processes $5_i$ to $1_i$ and $6_i$ to $3_i$) that lowers the temperature constraints put on the cycle by the source and sink temperatures.

FIGS. 2.15A-2.15B show values of $\chi$ corresponding to maximum (FIG. 2.15A) COP and (FIG. 2.15B) cooling load as a function of regeneration and $T_R$.

FIG. 2.16 shows two models used in a disclosed iterative procedure showing in the input parameters and the outputs.

FIG. 2.17 shows an iterative procedure to find the states temperatures of the non-ideal BECR cycle.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present disclosure provides for systems and methods of electrochemical cooling. The methods and systems can be used in devices and apparatuses such as refrigerators, air conditioners, and other cooling apparatuses. The systems and methods make use of a Brayton equivalent electrochemical cycle to provide cooling without the use of any ozone-depleting gases and/or greenhouse gases. In an aspect, the disclosed systems and methods make use of isentropic liquid electrochemical reactions to produce cooling without the need for compression or pressurization. In this regard, the rational engineering of electrolytes can dramatically improve electrochemical heat engines and heat pumps (refrigerators), which are emerging as low-cost, high-efficiency thermal energy conversion technologies. Also disclosed herein are parameters that make electrolytes attractive for thermal energy conversion in the disclosed methods and systems.

In one aspect, the present disclosure provides for systems for electrochemical cooling. In general, the system includes two closed loops that separated working fluids in a continuous manner through different parts of the system. The closed loops of the system may not be under pressure beyond atmospheric pressure and may not be otherwise under pressurization or compression, which is advantageous as the system is less expensive and less complex. The result of the working fluid flowing through the system is a temperature drop of at least about 0.05 K, or of at least about 0.15 K. In an aspect, the system can produce a temperature drop of about 0.05 K to about 50 K, about 0.05 K to about 20 K, about 0.05 K to about 10 K, or about 2 K to about 7 K. In another aspect, the system can produce a temperature drop of about 2, 3, 4, 5, 6, 7, 8, 9, 10, 20, 30, 40 or 50 K. Additional details are provided below and in the Examples, in particular, consideration of the FIGS. 1.1A, 1.1B, 2.1A and 2.1B provides multiple ways in which to understand features of the present disclosure.

In one aspect, the system includes a cold electrochemical cell having a first ion exchange membrane (e.g., cation or anion exchange membrane). An ion flux (e.g., anion or cation depending upon the chemical system selected) between a first working fluid (e.g., a first redox active electrolyte) and a second working fluid (e.g., a second redox active electrolyte) across the first ion exchange membrane absorbs heat from the first working fluid and the second working fluid to lower a temperature of the first working fluid and the second working fluid exiting the cold electrochemical cell. In an aspect, the first ion exchange membrane and the second ion exchange membrane are the same type ion exchange membrane, while in another aspect the ion exchange membranes are different as long as the desired temperature drop is achieved in the system. In addition, the system includes a heat source (e.g., inside of a refrigerator, inside of a cooler, inside of room, inside of a car, etc. as well as one or more components that generate heat within any of these devices) and a cold side heat exchanger (e.g., plate and fin, shell and tube, evaporator, downcomer and fins, radiators, as well as other known heat exchangers for which the working fluids can flow adjacent and/or within, where each can be made of thermally conductive materials such as metal, alloys, and the like). The cold side heat exchanger absorbs heat from the heat source and the temperature of the first working fluid and the second working fluid is increased as they flow through the cold side heat exchanger.

In addition, the system also includes a hot electrochemical cell comprising a second ion exchange membrane (e.g., cation or anion exchange membrane). The ion flux between the first working fluid and the second working fluid across the second ion exchange membrane releases heat, raising the temperature of the first working fluid and the second working fluid exiting the hot electrochemical cell. The system includes a heat sink (e.g., ambient environment, inside of a room, outside of a house, ground, body of water, other heat sinks that can be used with refrigerators, coolers, air conditioners, etc.) and a hot side heat exchanger (e.g., plate and fin, shell and tube, evaporator, downcomer and fins, radiators, as well as other known heat exchangers for which the working fluids can flow adjacent and/or within, where each can be made of thermally conductive materials such as metal, alloys, and the like), where the hot side heat exchanger rejects absorbed heat into the heat sink as the first working fluid and the second working fluid pass through the hot side heat exchanger. The hot side heat exchanger and the cold side heat exchanger can be of the same type or of a different type. The first working fluid and the second working fluid circulate continuously through a first fluid path and a second fluid path that are independent from one another (less the interaction ion exchange membranes) without physically mixing together. In some aspects, the first and second working fluids do not circulate through the heat source, the heat sink, or both the heat source and the heat sink.

The following provides further context to the operation of the system. The system includes circulating the first working fluid in a first closed circuit (e.g., tubes, channels, etc) that includes the first half of the cold electrochemical cell, a first portion passing through the cold side heat exchanger, a first half of the hot electrochemical cell, and a first portion passing through the hot side heat exchanger. The system also includes circulating the second working fluid in a second closed circuit (e.g., tubes, channels, etc.) that includes the second half of a cold electrochemical cell, a second portion passing through the cold side heat exchanger, a second half of the hot electrochemical cell, and a second portion passing through the hot side heat exchanger. The first half of the cold electrochemical cell is separated from the second half of the cold electrochemical cell by the first ion exchange membrane. The first half of the hot electrochemical cell is separated from the second half of the hot electrochemical cell by the second ion exchange membrane. A current from an external power supply applied to the cold electrochemical cell and the hot electrochemical cell drives a first redox reaction in the cold electrochemical cell to reduce the temperature of the first and second working fluids (e.g., where the first redox reaction has an entropy change greater than 0). Also a current (e.g., equal in numerical value to but of opposite charge as that in the cold electrochemical cell) drives a second redox reaction in the hot electrochemical cell to increase the temperature of the first and second working fluids (e.g., the second redox reaction has an entropy change less than 0), where the second redox reaction is a reverse of the first redox reaction. As a result, the system causes a temperature drop, which can be used in refrigerators, air conditioners, and the like. The examples and figures provide additional features and understanding.

As described above, herein, and in reference to FIGS. 1.1A, 1.1B, 2.1A and 2.1B in the examples, electrochemical cooling system includes two closed independent fluid flow loops (e.g., tube, channels, or other flow device) that separate the working fluids, where the only interaction is across the ion exchange membrane. The working fluids flow in a continuous manner through different parts of the system to exchange and remove heat form the heat source so that apparatus for which the system is part of decreases in temperature.

The cold electrochemical cell, the hot electrochemical cell, or both can also a housing including a chamber separated into a first side and a second side by the first ion exchange membrane or second ion exchange membrane, respectively. The housing can be made of an appropriate type of material appropriate for the apparatus using the system. The first side and the second side independently include one or more of a porous electrode, a gasket, a flow channel plate, or a combination thereof. The porous electrode functions to increase the active surface area where electrochemical reactions take place. The porous electrode comprises carbon felt, a metal foam (e.g., aluminum foam, nickel foam, steel foam, etc.), a conducting polymer foam (e.g., PEDOT:PSS foam, metalized polyurethan foam, a carbon nanotube foam, etc.), a conducting ceramic foam (e.g., metalized alumina foam, silicon carbide foam, metalized glass foam, etc.), or a combination thereof. The flow channel plate functions to circulate the working fluids in an efficient manner to produce a large surface area. The flow channel plate can have a plurality of serpentine channels, for example.

The system can optionally include other components such as a fan, pumps, valves, a computer system to measure performance or to display temperature, temperatures changes, and the like, as well as other component that can be used to incorporate the system into the particular apparatus. Also, the dimensions of the system and various components can be appropriately scaled based on the dimensions of the apparatus, the desired temperature change, and the like.

The system can have a total cooling load of greater than about 0.9 W, or of from about 1 W to about 12 W, or of about 1, 2, 3, 4, 5, 6, 7, 8, 9, 10, 11, or about 12 W, or a combination of any of the foregoing values, or a range encompassing any of the foregoing values.

The system can also include a first circulation pump for circulating the first working fluid and a second circulation pump for circulating the second working fluid. In a further aspect, the first and second circulation pumps independently produce a flowrate of from about 0.4 mL/s to about 5 mL/s, or of about 0.4, 0.4, 1, 1.5, 2, 2.5, 3, 3.5, 4, 4.5, or about 5 mL/s, or a combination of any of the foregoing values, or a range encompassing any of the foregoing values.

The external power supply can supply an operating current of from about 0.5 A to about 20 A, or of about 0.5, 1, 2, 3, 4, 5, 6, 7, 8, 9, 10, 11, 12, 13, 14, 15, 16, 17, 18, 19, or about 20 A, or a combination of any of the foregoing values, or a range encompassing any of the foregoing values.

The system can have a coefficient of performance (COP) of at least about 0.9, or of at least about 8, or of about 1, 2, 3, 4, 5, 6, 7, 8, 9, 10, 11, 12, 13, 14, 15 or 16, or a combination of any of the foregoing values, or a range encompassing any of the foregoing values.

In some aspects, the system can include adiabatic walls that can be removed to allow the system to absorb heat from the surrounding environment, where heat absorption results in a temperature drop in the surrounding environment.

The first ion exchange membrane can be a first cation exchange membrane and the second ion exchange membrane can be a second cation exchange membrane, where each can be the same or different. In this set up, the ion flux is an anionic flux. In an aspect, the first cation exchange membrane and the second cation exchange membrane are selected from a hydrocarbon membrane, a per-fluorinated sulfonic acid membranes, or a solid ion-conducting electrolyte. The type of cation exchange membrane can be selected with consideration of the redox reaction constituents. The dimensions of the first ion exchange membrane and the second ion exchange membrane can vary based on the desired performance, the type of exchange membrane, the type of working fluids, the dimensions of the system (e.g., the cold electrochemical cell, the hot electrochemical cell), and the like.

The hydrocarbon membrane can be covalently functionalized with negatively charged groups. The polymers themselves maybe homopolymers (e.g., polystyrene), random copolymers (e.g., polystyrene divinylbenzene), block copolymers (e.g., polybenzophenone/poly(arylene ether)), or graft copolymers (e.g., polysulfone grafted with polystyrene side chains). The functional group (e.g., sulfonate, carboxylate) can be a negatively charged group that is covalently bonded to the polymer structure offering immobilized hopping sites for the cations. These functional group may be introduced into the polymer after the polymerization reaction, or by the polymerization of functionalized monomer or oligomer units.

Per-fluorinated sulfonic acid membranes are a class of membranes are mechanical and chemical stable. The membranes can feature a completely fluorinated hydrocarbon-derived backbone and a sulfonic acid group that supports the cation transport. Examples include but are not limited to sulfonated copolymers of tetrafluoroethylene and a fluoropolymer (e.g., sulfonated tetrafluoroethylene based fluoropolymer-copolymer). Specific examples are being commercially sold as Nafion and Aquivion by DuPont and Solvay, respectively.

Solid ion-conducting electrolyte can be used depending upon the cation to be transported. For example, for a pair of all anionic redox reaction that uses sodium counterions, alumina with non-stoichiometric sodium content (also called beta-alumina) can be used. Similar electrolytes are available for lithium, potassium, lead, barium, and the like and can be used depending upon the redox chemistry.

The first ion exchange membrane can be a first anion exchange membrane and the second ion exchange membrane can be a second anion exchange membrane. In this set up, the ion flux is a cationic flux. The first anion exchange membrane and the second anion exchange membrane are selected from an ionomer membrane or a solid-ion conducting electrolyte membrane. The type of anion exchange membrane can be selected with consideration of the redox reaction constituents.

Ionomer membranes can include polymer (homopolymer or copolymers) based on the alkyl and/or aromatic monomers that have been functionalized by covalently bound positively charged groups, typically quarternary ammonium cations. The quarternary ammonium allows for anion transport Solid-ion conducting electrolyte membranes can also be used and offer exceptional ion selectivity. For example, $CsSnCl_3$, a chloride salt of cesium and tin has been explored a chloride ion conductor The first working fluid can be a first redox active electrolyte and the second working fluid can be a second redox active electrolyte. The first working fluid and the second working fluid can also include a solvent, a pH-modulating component, a buffer salt, or other non-electrochemically active additives for balancing purposes, and a combination thereof.

In an aspect, the first and second redox active electrolytes can be $M^z$-$L'_a$ and $M^{z-n}$-$L''_b$. M is a transition metal with multiple oxidation states z and z–n in the case of n electrons being transferred in the reduction reaction. L' and L'' are the same or different ligands that engages with coordinate covalent (or dative bonding) with the metal center. M can include iron, chromium, manganese, vanadium, cobalt, and copper. L can include inorganic species like water, ammonia, cyanide, carbon monoxide, or organic species like cyclopentadienyl, amines, phosphines, oxalate, malate, porphyrins, and ethylenediaminetetraacetic acid. In addition, derivatives of each of the foregoing ligands can be used as well. While different ligands have the ability to modulate the standard electrode potential, the potential itself is not of consequence because the BECR cycle moves electrons between the cathode (or anode) of the hot electrochemical cell and the anode (or cathode) of the cold electrochemical cell where the forward and backward reactions of the same half-cell reactions are driven. As a result, appropriate and acceptable ligands and their derivatives can also modulate the solubility and pH stability window. Also, this class of reactions incorporates different ligands and their associated stoichiometries, as denoted by subscripts a and b, which states that this disclosure encompasses homogenous or heterogenous ligand transfer reactions. Also included in this class of reaction are half-cell reactions that involve a transition metal center undergoing a change in oxidation state accompanied by a neutral and/or charged species that participates in reversible bond cleavage with the ligand. For example, in the half-cell reaction $V(v)O_2^+ + 2H^+ + e \rightleftharpoons V(iv)O^{2+} + H_2O$, the oxygen ligand that is bound to vanadium in the +5 oxidations state is cleaved and forms water, leaving vanadium in the +4 oxidation state with the $O^{2-}$ ligand. Counterions of the salts used to introduce the transition metal centers or the electron-donating ionic ligands are within the scope of the present disclosure. The counter-ions can modulate the electrochemical kinetics via their ionic diffusivities (chloride ion diffuses faster than the bulkier iodide) and transference numbers, and can modulate the solubility of the redox active species (ammonium counterions improves the solubility of the ferrocyanide relative to the potassium or sodium counter-ions due to its hydrogen bond accepting capabilities) However, these do not change the driver of electrochemical cooling, which is the entropy of the electron transfer associated with changing oxidation state of a transition metal center of a redox active species.

In an aspect, the first and second redox active electrolytes can quinone and phenol. Quinones are a class of aromatic derivatives that have one or more carbonyl groups. Phenols are aromatic hydrocarbons containing one or more hydroxyl groups. Quinones can undergo a proton coupled electron transfer to introduce a proton at the oxygen of the carbonyl group, thereby forming the corresponding phenol. The present disclosure encompasses reactions that include, the number of aromatic rings in the quinone, total number and location of the carbonyl and hydroxyl groups, and any salt resulting from the acidic phenol, i.e. the proton in the hydroxyl being replaced with another cation like potassium or sodium. The present disclosure also includes redox spectator substitutional groups that are put in any location on the quinone and phenol. All of the above modifications while modulating the standard potential, solubility, pH stability window, employ the entropy of the redox reaction to generate electrochemically driven cooling and are included herein.

In an aspect, the first and second redox active electrolytes can be $X_m^{y-}$ and $X_n^{z-}$. X is a halogen (e.g., iodine, bromine, chorine, fluorine) or a chalcogen (e.g., sulfur, selenium) that exhibits electron coupled transformation from a lower order to a higher order polyhalogen or polychalcogen. The counter-ions used to introduce the halogenide and chalcogenide ions may be a positive cation with the appropriate oxidation state such as alkali metals (e.g., lithium, sodium, potassium), alkali earth metals (e.g., calcium, magnesium), transition metals (e.g., iron, vanadium, copper, chromium), group 13 metals like aluminum and gallium, group 14 metals like tin and lead, group 15 elements like arsenic and bismuth, group 16 elements like selenium and tellurium, and even molecular cations like ammonium, sulfonium, and phosphonium are all options as cationic counter-ions to the redox active polyhalogenide or polychalcogenide redox reaction. All these salts are within the scope of the present disclosure, the entropy of the redox active species (the halogenide or chalcogenide) is leveraged to generate electrochemical cooling.

In one aspect, in the disclosed system, the first and second redox active electrolytes can be ion pairs selected from: $FCN^{3-}/FCN^{4-}$, $Fe^{2+}/Fe^{3+}$, p-quinone/p-quinol, Fe(II)-TEA/Fe(III)-TEA, $I_3^-/I^-$, or any combination thereof.

In a further aspect, the first solution and the second solution individually include solvents selected from water, DMSO, methanol, or any combination thereof. In a still further aspect, the first solution, the second solution, or both further include a pH-modulating component selected from $H_2SO_4$, NaOH, guanidinium chloride, citric acid, citrate buffer, phosphate buffer, or any combination thereof.

In another aspect, the first redox active electrolyte and the second redox active electrolyte individually include a counter ion selected from $Cl^-$, $K^+$, $ClO_4^-$, $SCN^-$, or any combination thereof.

In one aspect, the first solution and the second solution individually include $Fe^{2+}/Fe^{3+}$ in aqueous $H_2SO_4$ with $Cl^-$ counter ions; $FCN^{3-}/FCN^{4-}$ in aqueous NaOH with $K^+$ counter ions; Fe(II)-TEA/Fe(III)-TEA in aqueous NaOH with $Cl^-$ counter ions; $FCN^{3-}/FCN^{4-}$ in aqueous KCl and guanidinium chloride with $K^+$ counter ions; $Fe^{2+}/Fe^{3+}$ in aqueous DMSO with $Cl^-$ counter ions; $Fe^{2+}/Fe^{3+}$ in aqueous citric acid with $Cl^-$ counter ions; p-quinone/p-quinol in aqueous $H_2SO_4$; p-quinone/p-quinol in aqueous citrate buffer; p-quinone/p-quinol in aqueous phosphate buffer; $Fe^{2+}/Fe^{3+}$ in water with $Cl^-$ counter ions; $Fe^{2+}/Fe^{3+}$ in methanol and water with $Cl^-$ counter ions; $Fe^{2+}/Fe^{3+}$ in methanol and water with $ClO_4^-$ counter ions; $Fe^{2+}/Fe^{3+}$ in methanol and water with $NO_3^-$ counter ions; $Fe^{2+}/Fe^{3+}$ in methanol with $SCN^-$ counter ions; $FCN^{3-}/FCN^{4-}$ in water with $K^+$ counter ions; $I_3^-/I^-$ in water with $K^+$ counter ions; or any combination thereof. In one aspect, the first redox active electrolyte is $I_3^-/I^-$ and the second redox active electrolyte is $FCN^{3-}/FCN^{4-}$.

The amount of the first working fluid and the second working fluid can vary depending upon the dimensions of the system and the volume of the tubes or channels within which the first working fluid and the second working fluid flow and optionally based upon the desired temperature change desired.

Example 1 illustrates the use specific redox reactions and ion exchange membrane in the system and method.

Now having described aspects of the system, the following provides details regarding the aspects of the methods. The present disclosure provides for methods for electrochemical cooling, for example, the method can be used in refrigeration or air conditioning. In an aspect, the method can include circulating the first working fluid in a first closed circuit (e.g., a set of flow tubes, channels, etc that traverse different area of the system) that includes a first half (e.g., or side) of a cold electrochemical cell, a first portion (e.g., all of the first working fluid or part of it) passing through a cold side heat exchanger (e.g., which is adjacent the heat source), a first half (e.g., or side) of a hot electrochemical cell, and a first portion (e.g., all of the first working fluid or part of it) passing through a hot side heat exchanger (e.g., which is adjacent the heat sink). In addition, the method also includes circulating a second working fluid in a second closed circuit (e.g., a set of flow tubes, channels etc. that traverse different area of the system) that includes a second half (e.g., or side) of a cold electrochemical cell, a second portion (e.g., all of the second working fluid or part of it) passing through a cold side heat exchanger, a second half (e.g., or side) of a hot electrochemical cell, and a second portion (e.g., all of the second working fluid or part of it) passing through hot side heat exchanger. The first half of the cold electrochemical cell is separated from the second half of the cold electrochemical cell by a first ion exchange membrane and the first half of the hot electrochemical cell is separated from the second half of the hot electrochemical cell by a second ion exchange membrane. In other words, the first and second closed circuits form a continuous loop that traverse the different areas and only interact across the first and second ion exchange membranes. An external power supply applies a current to the cold electrochemical cell and the hot electrochemical cell (e.g., of equal numerical magnitude but of opposite sign). The current (e.g., a first current) drives a first redox reaction in the cold electrochemical cell, where the first redox reaction has an entropy change greater than 0. Also, the current (e.g., second current) drives a second redox reaction in the hot cell (e.g., the second redox reaction is a reverse of the first redox reaction) and where the second redox reaction has an entropy change less than 0. The result is that the method is a temperature drop on the side of the heat source as heat energy is removed therefrom.

In regard to the current, the first current and the second current can be equivalent in the numerical value and opposite in charge, for example the first current can be −5 A and the second current +5 A.

Optionally, an adiabatic barrier surrounding the first and second closed circuits can be reversible removed to allow the first working fluid, the second working fluid, or both to absorb environmental heat.

The methods of the present disclosure can be implemented using the systems described herein. The first working fluid and the second working fluid as well as the first and second ion exchange membranes are described above and herein. In addition, the cold electrochemical cell, the cold side heat exchanger, the hot electrochemical cell, and the hot side heat exchanger are described above and herein.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "an electrolyte," "a flow rate," or "an electrochemical cell," including, but not limited to, mixtures, combinations, or series of two or more such electrolytes, flow rates, or electrochemical cells, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

Unless otherwise specified, pressures referred to herein are based on atmospheric pressure (i.e. one atmosphere).

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Electrolyte Engineering can Improve Electrochemical Heat Engine and Refrigeration Efficiency Electrochemical heat engines and refrigerators relying on the thermogalvanic effect (i.e., the temperature dependence of the equilibrium potential of a half-cell reaction) may be realized using one or two half-cell reactions. Single half-cell reaction systems have coupled heat and mass transport, thereby sacrificing efficiency for simplicity and compactness. Systems that use two half-cell reactions, henceforth called dual-redox systems, can achieve higher efficiencies by affording electrochemical systems that use traditional thermodynamic cycles operating as heat engines or heat pumps. This example details four electrolyte specific tradeoffs that can inform the rational selection and engineering of electrolytes to improve the stability and performance of state-of-the-art dual-redox electrochemical energy conversion systems.

The three parameters that quantify the attractiveness of an electrolyte as a working fluid in a dual-redox thermogalvanic heat engine or refrigerator are the temperature coefficient $\alpha$, limiting reagent solubility $C_{SOL}$, and the electrolyte specific heat c. The temperature coefficient of a half-cell reaction is given by $\alpha=\partial U/\partial T=\Delta S_{rxn}/nF$ where U and $\Delta S_{rxn}$ are the equilibrium potential and entropy change of the reaction, T is temperature, F is Faraday's constant, and n is the number of electrons transferred. A large temperature coefficient implies a large entropy change per unit electron transferred, and by extension, a large capacity for reversible heat absorption or rejection. While the source of the entropy change varies based on the nature of the participating species, continuous operation of the dual-redox system typically utilizes liquid phase half-cell reactions. dominant source of entropy change for such reactions is solvation entropy. Since both electrolytes in a dual-redox system undergo opposite charge transfer processes, they must have opposing parities in $\alpha$ to maximize the net entropy change of the redox reaction. The solubility of the limiting reagent, $C_{SOL}$, determines the extent of the corresponding reaction and by extension, the possible entropy change per unit volume of the electrolyte. Finally, the voltage generated (or required) by a dual-redox heat engine (or refrigerator) is proportional to the difference between the heat source and sink temperatures. Therefore, a low electrolyte specific heat, c, improves the performance of the system by eliciting a large electrolyte temperature response per unit heat absorbed or rejected. The figure-of-merit $Y=\alpha C_{SOL}/c$ quantifies the attractiveness of an electrolyte for its use in a dual-redox system. One electrolyte is chosen to have a large positive Y, and the other a large negative Y, to maximize the performance of the dual-redox system, corresponding to the parity in $\alpha$. However, there are four tradeoffs that exists between the properties $\alpha$, $C_{SOL}$, and c, that appear mutually orthogonal when engineering electrolytes for this application.

Solvation Entropy vs. Solubility

The entropy change of a half-cell reaction is proportional to the difference in chemical potential of the participating species. In concentrated solutions, this difference decreases with increasing ionic strength of the electrolyte as described by the Debye-Huckel theory. Therefore, increasing the reactant concentration of a half-cell reaction will be met with a concomitant decrease in the entropy change. Additionally, a supporting electrolyte that mitigates IR-drop can also lead to lower entropy change of the half-cell reaction by increasing the electrolyte ionic strength. The rate of this decrease is inversely proportional to the dielectric strength of the pure solvent, $\varepsilon$, while a low dielectric constant affords a large solvation entropy change. Therefore, future efforts must seek to maximize the product of the solvation entropy change and reactant solubility (the numerator of Y) by rationally selecting or engineering half-cell reaction and solvent combinations. Certain supporting electrolytes can also "salt in" reactant species past their pure solvent solubility limit via ion-pairing. The role of these short-range interactions on solvation entropy are harder to predict and affords opportunities for further research.

Solubility vs. Solvent Specific Heat

Choosing a pure solvent or solvent system with low specific heat can increase Y. Solvents must be carefully selected to possess an optimal combination of low specific heat and high dielectric constant to maximize Y. The same hydrogen bonding that gives water and ammonia their high specific heats also gives solvents their high dielectric constants. Attention is drawn herein to ionic liquid solvents like [emim][$BF_4$] and [pmpyr][$NTf_2$] that possess low vapor pressure (and easily condensable gases) like $SO_2$ and difluoromethane (DFM). It is noted that the specific heat of a solution is lower than that of the pure solvent. Perhaps, engineered supporting electrolytes can decrease the specific heat of the solvent, while simultaneously improving the solubility of the reactant species with negligible, or even a positive impact to solvation entropy. Since the solvation entropy too is a function of the dielectric constant, concerted research efforts must be made to maximize Y by tuning specific heat, reactant solubility, and the temperature coefficient.

Solvation Entropy vs. Activation Energy

Minimizing irreversibilities are essential to creating efficient dual-redox heat engines and refrigerators. Activation overpotential is an inescapable source of irreversibility associated with electrochemical reactions and it is governed by the activation energy. The system figure-of-merit $X=T\Delta S_{rxn}/E_a$, quantifies the entropic heat of the electrochemical reaction relative to the activation energy. The Marcus theory of electron transfer states that the activation energy is proportional to the outer reorganization energy, $\lambda_o$, which is derived from electrostatic theory. Using the outer reorganization energy as a proxy for the activation energy, the expression for the Born solvation entropy, and Onsager's equation for the dielectric constant of a polar solvent, the solvent contribution to X is given as $(2\varepsilon+1)/(2\varepsilon^2+1)$. Therefore, while large solvent rearrangement leads to large solvation entropy, it is a smaller solvent reorganization that leads to low activation energy. Therefore, the electrolytes for dual-redox heat engines and refrigerators must be ranked using the system figure-of-merit X also for completion. Due to this inescapable tradeoff between thermodynamics and kinetics, it may be prudent to focus research efforts on decreasing solvent specific heat and reactant solubility, rather than engineering half-cell reactions with arbitrarily high solvation entropy changes.

Solvation Entropy vs. Stability

The most compelling argument against a dual-redox system that relies on solvation entropy. This figure plots the solvation entropy of reduction for various metal-complex half-cell reactions as a function of charge density as per the Born solvation model. Within this framework, only all-cationic (or all-anionic) half-cell reactions afford $\alpha>0$ (or $\alpha<0$). This makes it very challenging to keep half-cell reactions separated for extended periods of time because of poor ion selectivity with existing ion exchange membranes. To circumvent this practical challenge, herein is proposed a specific class of half-cell reactions that occur entirely in the liquid phase, but do not rely on solvation entropy for their temperature coefficient. Half-cell reactions that feature bond cleavage coupled electron transfer must increase their translational entropy due to gains in the degrees of freedom. If this gain is sufficiently high, it can overcome any contributions from solvation effects as demonstrated by the all-anionic half-cell reaction $I_3^-+2e^-\rightarrow eI^-$ with $\alpha=0.5$ mV/K. Other all-anionic half-cell reactions include poly-halogen, inter-halogen, poly-sulfur, redox active guest-host, and proton coupled electron transfer reactions. Further research must be conducted to evaluate the feasibility of such existing reactions, and to discover new electron transfer reactions with many bond dissociations.

Example 2: Continuous Electrochemical Refrigeration Based on the Brayton Cycle

Driven by rising regional temperatures, growing regional populations, and accelerating urbanization, the global cooling demand is expected to triple by 2050. In a business-as-usual scenario nearly all of this demand will be met using hydrofluorocarbons (HFCs) employed in vapor compression units. HFCs have global warming potentials (GWP) several times higher than that of carbon dioxide, and vapor compression associated emissions are projected to be as high as 9 Gt$CO_2$-eq/yr (i.e. 15% of $CO_2$-eq emissions) by 2050.

One facet of the solution is the discovery and development of zero-GWP alternative cooling technologies. In principle, it is possible to take a heat engine, like a thermally regenerative electrochemical cycle (TREC), with sufficiently low internal irreversibility and induce refrigeration via the reverse operation with an external work input. While TRECs have been widely researched for power generation, the converse, a continuous electrochemically-driven refrigerator has not been previously demonstrated. Here, a technology is demonstrated that is the refrigeration analogue of a (TREC) relying on the thermogalvanic effect, which utilizes the entropy change of redox reactions to generate electrical work from a temperature difference. Electrochemically driven refrigeration has been tenuously hypothesized and modelled in the past. Duan et al. developed a numerical model for a continuous electrochemical refrigerator based on the Stirling cycle, validated the open circuit voltage and overpotentials at various states of charge and current densities, and used the numerical model to predict cooling. A Stirling type cycle inherently makes demonstration of electrochemical refrigeration difficult as the entropic heat absorption is split between the moving electrolyte, heat transfer across the electrochemical cell boundaries, and the thermal capacitance of the bespoke system. Recently, Mckay et al. demonstrated evidence of electrochemical cooling in a thermogalvanics architecture. However, the steady-state cooling load reported was ~0.12 mW, and the electrolyte was heated to 50° C. to reduce the activation overpotential. Furthermore, the maximum possible temperature span of this incarnation is limited by the tradeoff between the higher limiting current density and the thermal inertia afforded by a higher electrolyte flowrate.

In this study, the Brayton Electrochemical Refrigerator (BECR) is developed, which achieves sustained electrochemical refrigeration by employing three key features.

First, two complementary half-cell reactions are identified (i.e. the triiodide/iodide, and ferricyanide/ferrocyanide) that maximize cooling and stability. Second, modified flow battery electrochemical cell architectures are developed that facilitate continuous cooling by increasing single-pass electrochemical conversion and reducing electrochemical overpotential. Third, this technology is based on the Brayton cycle as opposed to the Stirling cycle that is frequented by TREC systems. Additionally unlike the single-half cell thermogalvanic architectures, the dual-half cell electrochemical system decouples ionic and heat transport allowing for access to higher current densities at lower Joule heat. Finally, the Brayton cycle was chosen rather than the Stirling cycle because the isothermal heat absorption process in a Stirling cycle is in competition with the advecting electrolyte that concomitantly exchanges heat with the surroundings. This coupled heat and mass transfer problem for the Stirling cycle is challenging; the Brayton cycle, which also has its own challenges, circumvents this specific coupled problem by using a thermally insulated electrochemical system and separate heat exchangers. With the Brayton cycle, all of the electrochemical cooling lowers the temperature of the electrolytes and the heat absorption process from the refrigerated space is accomplished with a conventional heat exchanger separately. Together, these features allow the BECR cycle developed in this work to achieve a peak cooling load of 0.934 W and a peak COP of 8.09. The maximum temperature drop obtained is ~0.15 K at peak cooling load, while the theoretical maximum temperature drop is ~2-7 K, depending on the electrolyte.

Brayton Electrochemical Refrigerator

The BECR scheme (FIG. 1.1B) employs two separated redox active electrolytes in a closed system that is comprised of two electrochemical cells, two circulation pumps, and two heat exchangers. Refrigeration is achieved by circulating the electrolytes through these components where they are subject to the processes shown in the temperature-entropy diagram in FIG. 1.1A. For tractability, FIG. 1.1A features the averaged state of both electrolytes at a specific point in the scheme. The electrolytes are driven from state 1 to state 2 in the cold electrochemical cell isentropically using an electric current. The direction of this current is such that the entropy change of the electrochemical reaction is positive ($\Delta S_{rxn} > 0$), leading to a decrease in electrolyte temperature. The reduction (A+e$^-$→A') and oxidation (B→B'+e$^-$) reactions both require entropic heat, which is sourced from the electrolyte lattice, since the cell is thermally insulated. A membrane keeps the two electrolytes separate and shuttles ions in response to the electric field created by the electron transfer between the half-cell reactions to maintain charge neutrality. These ions must ideally be a spectator ion that is introduced into the electrolyte as a counter-ion or via a supporting electrolyte. The electrolytes then absorb heat from the cold source at a temperature $T_C$, in the cold side heat exchanger thereby heating the electrolytes from state 2 to 3. In the hot electrochemical cell, the driven electrochemical reaction is opposite to that of the cold electrochemical cell, i.e., $\Delta S_{rxn} < 0$. In this case, both the reduction (B+e$^-$→B') and oxidation (A→A'+e$^-$) reactions generate entropic heat, which is rejected into the electrolyte. Therefore, the electrolytes heat up within the hot electrochemical cell, traversing from state 3 to state 4. Finally, the electrolytes return to state 1 from state 4 by rejecting heat to a hot sink at temperatures $T_H$ in the hot side exchanger.

Selection and Characterization of Electrolyte Refrigerants

The BECR efficiency and cooling load are governed by the entropy change of the combined electrochemical reaction, which is given as ($\Delta S_{rxn}/nF = \alpha_{CELL}$, where $\alpha_{CELL}$ is the cell temperature coefficient. The cell temperature coefficient is the combination of contributions from both electrolytes, $\alpha_{CELL} \approx \alpha_C + \alpha_A$, where subscripts C and A denote the cathode and anode, respectively. To develop the proof-of-concept, several half-cell reactions were first screened (Table 2.1) for appropriate half-cell reactions using a non-isothermal temperature coefficient measurement technique. Ultimately, the aqueous $I_3^-/I^-$ ($\alpha_I > 0$) and ferricyanide/ferrocyanide (FCN$^{3-}$/FCN$^{4-}$, $\alpha_{FCN} < 0$) half-cell reactions were chosen due to the relatively high $\alpha_{CELL} = \alpha_I - \alpha_{FCN}$ value (~2 mV/K), and the low crossover of both anionic redox-active species when combined with a cation exchange membrane, such as Nafion, as employed in this work. The state of charge (SOC) dependent values of $\alpha_I$, $\alpha_{FCN}$, and $\alpha_{CELL}$ (measured using the isothermal temperature coefficient measurement technique described below) are shown in FIG. 1.2A. The SOC is defined as the normalized electrons per unit volume of electrolyte that is available for electron transfer in the direction of the cold cell electrochemical reaction ($\Delta S_{rxn} > 0$). The maximum number of electrons per volume is determined by the solubility of the limiting reagent, in this case, potassium ferrocyanide at 0.6 M.

TABLE 2.1

Non-Isothermal Temperature Coefficient for Different Half-Cell Reactions

| No. | Half-cell reaction | Value (mV/K) |
|---|---|---|
| 1. | Fe$^{2+}$ (0.01M)/Fe$^{3+}$ (0.01M) in 1M H$_2$SO$_4$ aqueous solution, Cl$^-$ counter-ions | 1.0 |
| 2. | FCN$^{3-}$(0.01M)/FCN$^{4-}$ (0.01M) in 1M NaOH aqueous solution, K$^+$ counter-ions | −1.0 |
| 3. | Fe(II)-TEA (0.01M)/Fe(III)-TEA (0.01M) in 1.3M NaOH aqueous solution, Cl$^-$ counter-ions | −0.6 |
| 4. | FCN$^{3-}$(0.01M)/FCN$^{4-}$ (0.01M) in 1M KCl and 1M guanidinium chloride aqueous solution, K$^+$ counter-ions | −1.6 |
| 5. | Fe$^{2+}$ (0.01M)/Fe$^{3+}$ (0.01M) in 0.04M DMSO aqueous solution, Cl$^-$ counter-ions | 1.3 |
| 6. | Fe$^{2+}$ (0.01M)/Fe$^{3+}$ (0.01M) in 0.04M citric acid aqueous solution, Cl$^-$ counter-ions | 0.6 |
| 7. | p-quinone (0.01M)/p-quinol (0.01M), in pH 0 aqueous H$_2$SO$_4$ | −0.4 |
| 8. | p-quinone (0.01M)/p-quinol (0.01M), in pH 0.5 aqueous H$_2$SO$_4$ | −0.5 |
| 9. | p-quinone (0.01M)/p-quinol (0.01M), in pH 1 aqueous H$_2$SO$_4$ | −0.6 |
| 10. | p-quinone (0.01M)/p-quinol (0.01M), in pH 1.5 aqueous H$_2$SO$_4$ | −0.7 |
| 11. | p-quinone (0.01M)/p-quinol (0.01M), in pH 2 aqueous H$_2$SO$_4$ | −0.9 |
| 12. | p-quinone (0.01M)/p-quinol (0.01M), in pH 2.5 aqueous H$_2$SO$_4$ | −1.0 |
| 13. | p-quinone (0.01M)/p-quinol (0.01M), in pH 3 aqueous H$_2$SO$_4$ | −1.1 |
| 14. | p-quinone (0.01M)/p-quinol (0.01M), in pH 3 aqueous 0.01M citrate buffer | −0.9 |
| 15. | p-quinone (0.01M)/p-quinol (0.01M), in pH 3.5 aqueous 0.01M citrate buffer | −0.8 |
| 16. | p-quinone (0.01M)/p-quinol (0.01M), in pH 4 aqueous 0.01M citrate buffer | −0.8 |

TABLE 2.1-continued

Non-Isothermal Temperature Coefficient for Different Half-Cell Reactions

| No. | Half-cell reaction | Value (mV/K) |
|---|---|---|
| 17. | p-quinone (0.01M)/p-quinol (0.01M), in pH 4.5 aqueous 0.01M citrate buffer | −0.9 |
| 18. | p-quinone (0.01M)/p-quinol (0.01M), in pH 5 aqueous 0.01M citrate buffer | −1.0 |
| 19. | p-quinone (0.01M)/p-quinol (0.01M), in pH 5.5 aqueous 0.01M citrate buffer | −1.4 |
| 20. | p-quinone (0.01M)/p-quinol (0.01M), in pH 6 aqueous 0.01M citrate buffer | −1.4 |
| 21. | p-quinone (0.01M)/p-quinol (0.01M), in pH 6 aqueous 0.01M phosphate buffer | −1.2 |
| 22. | p-quinone (0.01M)/p-quinol (0.01M), in pH 6.5 aqueous 0.01M phosphate buffer | −1.3 |
| 23. | p-quinone (0.01M)/p-quinol (0.01M), in pH 7 aqueous 0.01M phosphate buffer | −1.4 |
| 24. | p-quinone (0.01M)/p-quinol (0.01M), in pH 7.5 aqueous 0.01M phosphate buffer | −1.5 |
| 25. | p-quinone (0.01M)/p-quinol (0.01M), in pH 8 aqueous 0.01M phosphate buffer | −1.4 |
| 26. | p-quinone (0.01M)/p-quinol (0.01M), in pH 7 0.01M phosphate buffer prepared in MeOH | −1.5 |
| 27. | $Fe^{2+}$ (0.01M)/$Fe^{3+}$ (0.01M) in water, $Cl^-$ counter-ions | 1.5 |
| 28. | $Fe^{2+}$ (0.01M)/$Fe^{3+}$ (0.01M) in 10% by volume MeOH in water, $Cl^-$ counter-ions | 1.4 |
| 29. | $Fe^{2+}$ (0.01M)/$Fe^{3+}$ (0.01M) in 50% by volume MeOH in water, $Cl^-$ counter-ions | 0.7 |
| 30. | $Fe^{2+}$ (0.01M)/$Fe^{3+}$ (0.01M) in 90% by volume MeOH in water, $Cl^-$ counter-ions | 0.2 |
| 31. | $Fe^{2+}$ (0.01M)/$Fe^{3+}$ (0.01M) in 90% by volume MeOH in water, $ClO_4^-$ counter-ions | 1.0 |
| 32. | $Fe^{2+}$ (0.01M)/$Fe^{3+}$ (0.01M) in 90% by volume MeOH in water, $NO_3^-$ counter-ions | 0.4 |
| 33. | $Fe^{2+}$ (0.01M)/$Fe^{3+}$ (0.01M) in MeOH, $SCN^-$ counter-ions | 1.0 |
| 34. | $FCN^{3-}$ (0.54M)/$FCN^{4-}$ (0.06M) in water, $K^+$ counter-ions | −1.5 |
| 35. | $FCN^{3-}$ (0.3M)/$FCN^{4-}$ (0.3M) in water, $K^+$ counter-ions | −1.8 |
| 36. | $FCN^{3-}$ (0.06M)/$FCN^{4-}$ (0.54M) in water, $K^+$ counter-ions | −1.9 |
| 37. | $I_3^-$(0.03M)/$I^-$ (2.31M) in water, $K^+$ counter-ions | 0.3 |
| 38. | $I_3^-$ (0.15M)/$I^-$ (1.95M) in water, $K^+$ counter-ions | 0.4 |
| 39. | $I_3^-$(0.27M)/$I^-$(1.59M) in water, $K^+$ counter-ions | 0.5 |

While the temperature coefficient represents the entropic driving force that leads to cooling, the heat capacity of the electrolyte represents the thermal inertia. The volumetric heat capacities of the electrolytes were measured at the 50% SOC configuration using a calorimeter to be 2.49±0.38 MJ $m^{-3}$ $K^{-1}$ for aqueous $I_3^-/I^-$ and 3.58±0.78 MJ $m^{-3}$ $K^{-1}$ for aqueous $FCN^{3-}/FCN^{4-}$. These values are used as constants for the included thermal calculations, since it is not expected the heat capacities of the electrolytes to change significantly due the small intra-electrolyte species conversion occurring with electron transfer. The SOC dependent temperature coefficients and heat capacities can be used to predict the maximum isentropic temperature difference as a function of reaction extent as depicted in FIG. 1.2B, achievable in the absence of thermodynamic irreversibilities (i.e., inter-electrolyte and exo-cell heat transfer, and Joule heating), within a closed electrochemical cell. FIG. 1.2B was generated by the method described below. In general, the temperature difference may be increased by alternative half-cell reactions with larger temperature coefficients, lower specific heat capacity, and higher solubility of the limiting reagent. In order to obtain the maximum isentropic drop in temperature for a given flowrate, electrode volume, and operating current in an open system, the electrochemical cell must adhere to the tenants of a plug flow reactor (i.e., without any heat or mass dispersion). In such an architecture, for a given pair of electrolytes, the isentropic drop in temperature increases with higher electrolyte residence time and operating current. The reader is referred to the theoretical work presented elsewhere herein for additional thermodynamic cycle details, the BECR figure of merit, and the predicted performance. Additionally, it was confirmed that the $I_3^-/I^-//$Nafion//$FCN^{3-}/FCN^{4-}$ system possessed the required lifetime for the proof-of-concept experiment by cycling it at ~16 mA/$cm^2$ within a potential window far away from water-splitting regimes ([−600 mV, 600 mV]) for 100 cycles over 200 hours. For perspective, the proof-of-concept refrigerator was operated for only 50 cycles and 20 hours, observing steady, continuous cooling.

BECR Implementation

The implementation experiment (FIG. 1.3A) and the schematic in FIG. 1.1B are alike, save for the heat exchangers. In the prototype, one heat exchanger regulates the temperature of each half-cell electrolyte at the inlets of the hot and cold cells to 27° C., thereby, maintaining constant inlets temperature to clearly demonstrate that cooling is occurring from only the electrochemical reactions and is not an artifact of ambient (room) temperature fluctuations (i.e. $T_H=T_C=27°$ C.). The electrochemical cells have acrylic housing to increase thermal resistance to the surroundings and a graphite serpentine flow field to increase the residence time, and therefore the degree of electrochemical conversion of the electrolyte. Electrolyte flowrates were measured using optical tachometers. Eight different electric current inputs (up to 4 A) were sourced with a galvanostat to the electrochemical cells for 20 minutes to achieve steady-state (with 1 minute of open circuit data measurement on either side of the sourced current domain, FIG. 1.3B). When the current is applied, the electrolytes exiting the cold cell is driven to a lower SOC, decreasing the outlet temperatures of both electrolytes using the entropy of the reactions. Conversely, the electrochemical reaction in the hot cell increases the SOC (the direction of I is reverse in hot cell relative to cold cell), in turn increasing the outlet temperature over time. Since the electrochemical cells are in series and flowrates of one electrolyte stream in both cells are equal, the SOC of the electrolytes entering both cells remain invariant after steady-state has been achieved (when the $V_{HOT}$ and $V_{COLD}$ saturate). The cells reach thermal steady-state ($dT_i/dt=0$) at ~7 minutes and electric steady-state ($dV_i/dt=0$) at ~2 minutes. At thermal steady-state, the difference between the electrolyte outlet and inlet temperatures is equal to the net heat generation within the corresponding electrode. The difference of the values of this temperature differential was used at steady-state (t=21 minutes) and at the onset of the current (t=1 minute) as the steady-state temperature response of the electrolyte to the heat process occurring in the electrode (FIG. 1.3C).

The steady-state temperature response was used to evaluate the electrolyte specific cooling load (FIG. 1.4A and FIG. 1.4B) and rejected heat (FIG. 1.4C and FIG. 1.4D) using the heat capacity and flowrate of the electrolytes. The $FCN^{3-}/FCN^{4-}$ electrolyte outperforms its counterpart because $|\alpha_{FCN}| > |\alpha_I|$, and because it has a lower overpotential at 4 A, where the entropic cooling effects of the triiodide reduction are negated by Joule heating. The larger Joule heating associated with the $I_3^-/I^-$ reaction arises from its higher activation overpotential, attributed to the large solvent reorganization energy of the covalent bond cleavage that accompanies the triiodide reduction. The electrolyte specific cooling loads were combined to obtain the total cooling load, $\dot{Q}_C$ (FIG. 1.4E). The coefficient of performance (COP), β was evaluated using (FIG. 1.4E), where $P_{IN}-I(V_{HOT}+V_{COLD})$. The circulating pumping power was neglected in these calculations; an estimate of the pumping power based on Darcy's law is provided below. BECR can achieve a target cooling capacity by achieving a high degree of electrochemical conversion at low electrolyte flowrate. Therefore, unlike flow batteries, the BECR is not bound by the tradeoff between high pumping power and high porous electrode specific surface area. The precipitous drop in COP with increasing current (shown in FIG. 1.4E) has thermodynamic and kinetic origins. Even though the cells operate in the ohmic regime (FIG. 1.21) at the higher current values, the Joule heating scales with $I^2$, increasing the irreversibility. Furthermore, $T_2$ and increasing $T_4$ decrease and increase respectively with increasing current. This leads to heat transfer processes that are increasingly deviant from the isothermal heat transfer characteristic of the ideal Carnot cycle. The measured cooling load and COP (evaluated above) are in good agreement with the predicted values, calculated using an energy balance.

Finally, it is emphasized that while this proof-of-concept demonstration of continuous electrochemical refrigeration is made possible by appreciable electrolyte redox conversion, significant improvement can still be made by increasing the residence time of the electrolytes. The first Damköhler number, given by the ratio of the reaction rate and the advective molar transport rate, for this work is ~0.08, which amounts to ~8% conversion for a plug flow reaction with first-order kinetics. There is substantial scope for improvement by operating at higher currents (increased rate of reaction) or decreasing the volumetric flowrate of the electrolytes (decreased molar influx). Of course, the latter must be done keeping in mind that decreasing the electrolyte flowrate to arbitrarily low values will decrease the cooling load, and hence there exists an optimum electrolyte flowrate for a given current that provides maximum electrolyte specific cooling load. As future motivation, Kim et al. reported a two-fold increase in the temperature coefficient of $FCN^{3-}/FCN^{4-}$ by employing 15 wt % methanol-water solution as the solvent. Yamada et al. increased the temperature coefficient of $I_3^-/I^-$ to 2 mV/K using a supramolecular scheme. These works could be immediately adopted into the BECR cycle to improve the cooling load several fold.

Discussion and Conclusions

A continuous electrochemical refrigerator that is inspired by the reverse Brayton cycle has been demonstrated herein. It achieves a peak COP of 8.09 with a temperature drop of 0.07 K, and a peak cooling load of 0.934 W (at 14.6 $mW/cm^2$, normalized by the cross-sectional area of the porous electrodes). It is acknowledged that only a modest temperature drop of 0.15 K at peak cooling load was observed (FIG. 1.3C) but theoretically it could have achieved a temperature drop of 2-7 K (FIG. 1.2B) if a greater degree of electrochemical conversion could be achieved. It demonstrates cooling for a total of ~18 hours without any sign of deterioration of the system performance. Additionally, the inverse gravimetric heat capacities and the gravimetric maximum possible entropy change of existing refrigerants have been compared with those of the disclosed electrochemical refrigerants (FIG. 1.5A). The maximum possible entropy change and the specific heat represent the entropic driving force and the thermal inertia towards cooling. With existing aqueous redox chemistries, it was found that electrochemical refrigeration compares well against vapor compression, suggesting that it could someday be an appreciable zero-GWP refrigeration technology. A more compelling argument for electrochemical refrigeration can be made upon comparing the entropy change per unit carrier, $\Delta S_{CARRIER}$, for the technologies (FIG. 1.5B). Through this lens, the entropic driving force for electrochemical refrigeration is more than double that of vapor compression. Table 2.2 details the device COP and temperature drop achieved by experimental works corresponding to the previously mentioned refrigeration technologies. It must be noted that popular refrigerants used in other refrigeration technologies were chosen in FIGS. 1.5A-1.5B and Table 2.2 simply to provide context to this work. Research within each of these technologies may have led to other refrigerants that demonstrate superior performance. For example, a rotary magnetocaloric refrigerator that employs LaFeSiH as the refrigerant has shown to a temperature lift of 11 K, and a COP of 1.9. Table 2.2 shows that significant work must be done to improve the temperature drop of the disclosed technology, while maintaining the COP, to improve its commercial viability. It is believed that this can be done through additional research into high temperature coefficient half-cell reactions with high solubility, low freezing point solvents with low specific heat capacities, and electrochemical cell architectures that can drive isentropic reactions to completion. Higher temperature coefficient half-cell reactions with high solubility have larger entropy changes per unit volume of electrolyte, and thereby increase an electrolyte's capacity for cooling, in addition to delaying the onset of temperature induced precipitation. Low vapor pressure (e.g., ionic liquids) and low freezing point solvents (e.g., alcohols) allow for the BECR cycle to operate in a larger parameter space (operating current and electrolyte flowrate) with little threat of excessive internal pressurization and/or the electrolyte freezing. Lower electrolyte specific heat elicits a greater temperature response per unit electrochemical reaction. Electrochemical cell architectures that drive the reactions toward completion (higher first Damköhler number) isentropically (minimal overpotential) can generate higher electrolyte temperature drops. The operating current and electrolyte flowrate influence the COP and cooling load, and they must be rationally optimized according to the thermodynamic, kinetic, and physical properties of the electrolytes.

TABLE 2.2

Comparison of device COP and temperature drop of some refrigeration technologies

| Technology | Refrigerant | COP | Temperature drop(K) | Comment |
|---|---|---|---|---|
| Electrochemical | $I_3^-/I^-//FCN^{3-}/FCN^{4-}$ | 8.09 | 0.07 | peak COP |
| | $I_3^-/I^-//FCN^{3-}/FCN^{4-}$ | 0.93 | 0.15 | peak cooling load |
| Vapor compression | R410a | 3.1 | 6-8 | HVAC |
| | R134a | 3.5 | 10-40 | Refrigeration |
| Magnetocaloric | Gadolinium | 0.8 | 15.4 | |
| Thermoelectric | Bismuth telluride | 0.72 | 14 | |
| Absorption | Ammonia-water | 0.45 | 27 | |
| Metal hydride | Lanthanum nickel | 0.26 | 30 | |

TABLE 2.3

Properties and Values for Different Refrigeration Technologies

| Metal Hydride | |
|---|---|
| $\Delta H$ | $-30.1$ kJ/mol $H_2$ |
| $\Delta S$ | $-110$ J/mol $H_2$ K |
| Low phase composition | 0 moles $H_2$/mole La |
| High phase composition | 5 moles $H_2$/mole La |
| Pressure | 2.5 bar |
| Temperature | 20° C. |
| Moles of $H_2$ | 11.56 moles/kg $LaNi_5$ |
| $LaNi_5$ specific heat capacity | 151.95 J/mol K |
| $LaNi_5$ molar mass | 0.432 kg/mol |
| Vapor Compression (R140a) | |
| $\Delta S = s_g(298K) - s_f(298K)$ | 0.626 kJ/kg K |
| specific heat capacity | 0.697 kJ/kg K |
| Magnetocaloric | |
| $\Delta S$ | 0.019 kJ/kg K |
| Specific heat capacity | 90-27 J/kg K |
| Ammonia-water | |
| $\Delta H$ | 35.38 kJ/mol $NH_3$ |
| Weight of $NH_3$ in 1 kg solution | 236.64 g |
| solubility | 31 w/w % |
| Electrochemical Refrigeration | |

| | $Fe^{2+}/Fe^{3+}$ | $FCN^{3-}/FCN^{4-}$ |
|---|---|---|
| Temperature coefficient | 1.1 mV/K[5] | -4.2 mV/K[6] |
| Solubility | 5.6 mol/L | 0.784 mol/L |
| Solution density | | 1.3 kg/L |
| Solution specific heat | | 3 kJ/kg K |

Electrochemical Thermodynamic Cycles. The following nomenclature is used below:

TABLE 2.4

Nomenclature for Electrochemical Thermodynamic Cycles

| Nomenclature | | | |
|---|---|---|---|
| I | applied current [A] | $\Delta S_{rxn}$ | entropy of reaction [J/mol K] |
| $Q_c$ | isothermal heat absorbed [J] | $\Delta T$ | adiabatic drop in temperature [K] |

The entropic heat absorbed during an electrochemical reaction may be utilized via two different schemes to achieve refrigeration (FIG. 1.6). If the electrochemical system under consideration has diathermal walls, and an electrochemical reaction with I>0 and $\Delta S_{rxn}$>0 is driven, heat will flow into the system from the surroundings. If this process is done slow enough, the heat transfer may be done under near isothermal conditions. This concept is represented as scheme [P→I] in FIG. 1.6. Conversely, if the electrochemical system has adiabatic walls, driving an electrochemical reaction with I>0 and $\Delta S_{rxn}$>0 will result in drop in temperature of the system.

Once the required amount to heat has been absorbed from the system, the adiabatic walls may be removed to allow the electrochemical system to absorb heat from the surroundings. This concept is represented as scheme [P→A] in FIG. 1.6. The isothermal and isentropic electrochemical processes can be used as drivers in the electrochemical analogue of the Stirling and Brayton cycles, respectively. These schemes are highlighted in the context of their respective thermodynamic cycles in FIG. 1.7.

Methods

Materials. All chemicals were purchased from commercial suppliers (Sigma-Aldrich, VWR International, The Science Company), and were of at least reagent grade and were used without purification. MilliQ grade (19.7 MΩ cm) ultrapure deionized water was used to prepare all the solutions. Non-aqueous solvents were used without drying.

Electrochemical cells. The electrochemical cells were designed to maintain an adiabatic environment and increase the residence time of the electrolytes within the cell. A 0.5 inch-thick acrylic endplates and a serpentine channel made of resin impregnated graphite (Graphite Store, MW001204) were used. FIG. 1.18 shows an exploded view of the cold and hot electrochemical cells. The acrylic housing sandwiches the graphite serpentine, porous electrodes (AvCarb, G600A), and cation exchange membrane (Nafion 211). Eight M6 bolts were used to hold the assembly together. Electrolytes were introduced into the cells using PVDF adapters (McMaster-Carr, 5533K411). The current collectors were thin copper strips that were placed in between the acrylic housing and graphite serpentine. The size of the porous electrodes (and therefore the rest of the assembly) was chosen using a conservative estimation. A simple energy balance affords the following equation for small temperature changes; $\dot{V}C_V\Delta T = I\alpha T_\infty - I^2R$. Here, it is assumed that the majority of the overpotential occurs due to the ohmic overpotential from the membrane resistance. Some conservative values are used for the flowrate, $\dot{V}$ (1 mL/s), heat capacity $C_V$ (3.5 MJ/m³ K), temperature coefficient, α (1.5 mV/K), and membrane resistance (1 Ωcm²). If a 0.5 K drop in temperature at 10 A is desired, the cross-sectional area of the cell should be ~36 cm². 8 cm×8 cm cross-sectional area porous electrodes were selected to further decrease the effect of overpotentials.

Heat exchangers. An active heat exchanger was chosen (FIGS. 1.19A-1.19B) rather than a passive heat exchanger to eliminate ambient temperature fluctuation and maintain a constant electrochemical inlet cell temperature; this allows us to unequivocally demonstrate electrochemical cooling decoupled from ambient temperature fluctuations of the heat exchangers. The active heat exchange was performed using a thermoelectric module attached to a cold plate, which had a tube for the electrolyte to flow. Since the electrolytes must always be kept from mixing with each other, two active heat exchanger modules were used (TE technology, CP-061HT). ⅛" (3.175 mm) OD stainless steel tube was embedded (chosen for its corrosion resistance to the triiodide/iodide, and ferricyanide/ferrocyanide redox couples) into two ¼" (6.35 mm) thick copper block, which were mounted to the thermoelectric heat exchanger. ¼" (6.35 mm) thick neoprene rubber was use to insulate the thermoelectric and copper block from the environment. The parts of the stainless steel tubing that were in contact with the ambient air were liberally covered in a polymer as insulation. The temperature was set and regulated by souring power to the thermoelectric modules using a programmable temperature controller (SRS, PTC10) that employed two PTC440 TEC drivers. The temperature feedback to the closed PID loop was provided by thermistors (OMEGA, Item #44031) that monitored the temperature of the electrolytes exiting the heat exchangers. The programmable temperature controller used a PTC320 card to acquire inputs from the thermistors located at the outlets.

Porous electrode and ion exchange membrane preparation. Prior to all experiments, the porous electrodes were immersed in an acid bath containing three parts 68% nitric acid and one part 18 M sulfuric acid. They were heated to 80° C. and refluxed overnight. The electrodes were washed in DI water until pH neutral and then heated in an oven at 400° C. for three hours. The electrodes were assembled into the electrochemical cells and flooded with electrolytes as soon as possible. The as purchased Nafion membrane was first heated in a 2 M KOH solution at 60° C. overnight. It was then washed thoroughly with DI water and then stored in a 4 M KCl solution. After each experiment, the membrane was washed thoroughly with DI water and stored in the KCl solution until the next experiment.

Electrolytes for the experiment. Of all the redox active species employed in the experiment, the species with the limiting solubility was the ferrocyanide with a room temperature solubility of ~0.6 M. Therefore, with reference to the cold electrochemical cell reaction, the cell is at 100% state of charge when the ferrocyanide ion is at that value. Conversely it is at 0% state of charge when all of the ferrocyanide has been converted to ferricyanide at 0.6 M. The quantity of the iodide ions and triiodide ions are determined using the solubility constraint of the ferrocyanide species and by the requirement, albeit arbitrary, that at 50% state of charge, both the electrolyte had the same concentration of potassium ions. Potassium ions were used for the iodide, ferricyanide, and ferrocyanide species. The triiodide ion is achieved by dissolving molecular iodine into an iodide solution which causes the iodine to abstract an iodide to form the triiodide. This reaction has an equilibrium constant that strongly favors the triiodide ion and therefore it is assumed that no iodine is present in the solution. The experiment was primed with electrolyte at 80% state of charge and the details are provided in Table 2.5.

Galvanic-Electrolytic Cycling. Once the chosen half-cell reactions were confirmed to have a high isothermal entropy change and that the system possessed no temperature hysteresis, galvanic and electrolytic cycling was performed to ensure that the system did not change appreciably over the course of the experiment. This was done using the electrochemical cell illustrated in FIGS. 1.9A-1.9D. The electrolytes were prepared in the 10% state-of-charge configuration as given in Table 2.5 below. The iodide/triiodide was connected to the positive terminal of the galvanostat (BioLogic, VSP 300). This cycling experiment is inherently different from what one may perform for a battery. In the case of a battery power source, one is interested in the how much electrical work the battery can output in galvanic mode after it has been charged in electrolytic mode. The potential therefore cycles between 0 V and some positive value. In this work however, the near complete chemical conversion and the thermal effects that accompany that conversion are of interest. Therefore, depending on the activity of the redox active species, the voltage required to drive the reaction in a specific direction can go from positive to negative as $\Delta G_{rxn}$ crosses over the point of chemical equilibrium. Regardless of the points of chemical equilibrium, the potentiostat was used to enforce maximum chemical conversion until mass transfer effects become prominent. Through iterations, the voltage window was chosen to be [600 mV, −600 mV] and the cell was cycled at ±200 mA, at ~16 mA/cm² (FIGS. 1.15A-1.15B). This experiment shows that the redox system is indeed reversible within the potential and time windows if the proof-of-concept experiment. This is to be expected because both the redox reactions occur at neutral pH which suppresses hydrogen evolution. The window is intentionally kept away from the water splitting regimes. The source of the iodide, ferricyanide and ferrocyanide ions were potassium salts. Therefore, Nafion, a cation exchange membrane, ensured that only potassium ions shuttled from one electrode to the other to preserve charge balance. Any solvent flux due to osmotic pressure was suppressed by maintaining an air-tight seal.

TABLE 2.5

Prepared Electrolyte Concentrations

| $I_3^-/I^-$ electrolyte | | $FCN^{3-}/FCN^{4-}$ electrolyte | |
|---|---|---|---|
| species | concentration (M) | species | concentration (M) |
| Species concentration in the electrolytes prepared at 80% SOC (with reference to the cold cell electrochemical reaction) for the BECR proof-of-concept experiment. 300 mL of both aqueous electrolyte was prepared. | | | |
| KI | 1.92 | $K_3FCN$ | 0.12 |
| $I_2$ | 0.24 | $K_4FCN$ | 0.48 |
| Species concentration in the electrolytes prepared at 10% SOC (with reference to the cold cell electrochemical reaction) for the galvanostatic cycling experiment. | | | |
| KI | 2.34 | $K_3FCN$ | 0.54 |
| $I_2$ | 0.03 | $K_4FCN$ | 0.06 |

Note that $I_2$ is sparingly soluble in water. The equilibrium constant for the $I_3^-$ from $I^-$ and $I_2$ heavily favors the product, and so the amount of $I_2$ and KI added to the electrolyte reflects the required $I_3^-$ concentration.

Proof-of-concept setup. The tubing used to connect the components together were ¼" (6.25 mm) OD, ⅛" (3.175 mm) ID. The tubing used to contain the ferricyanide/ferrocyanide electrolyte was a flexible PVC tubing, and rigid PFA tubing was used to contain the triiodide/iodide electrolyte due to the electrolyte's tendency to engage in SN2 nucleophilic attack with non-fluorinated polymers. All adapters and fittings that were made of PVDF. At the inlet and outlet electrolyte ports of the electrochemical cells, RTDs were introduced into the electrolyte streams using PVDF tee-adapters. Previous experiments showed that it was necessary for these RTDs to have a metal shield to prevent capacitive coupling to the voltage applied by the galvanostat. In addition to the components shown in FIG. 1.3A, two sealed Erlenmeyer flasks were used for each electrolyte stream as a reservoir source (and sink) for the inlets (and outlets) of the electrochemical cells, which served three purposes: (i) they acted as gas traps that removed any air bubbles from the system, (ii) allowed one pump to generate two flow streams, and (iii) by placing the outlet (or inlet) tubing above (or below) the liquid level, they ensured the flow of electrolytes in only one direction (eliminating any possibility of unintended back flow). K-type thermocouples were placed close to the electrochemical cells to provide evidence that the temperature changes caused by sourcing the electrochemical current are not correlated to changes in environmental temperature. A photograph of the completed setup is shown in FIG. 2.20. Peristaltic pumps (Control Company, 3385) circulate the electrolyte. The hot and cold electrochemical cells are connected electrically in series to the galvanostat (Biologic, VSP-300). Eight stainless-steel shielded RTDs (Adafruit Industries LLC, 3290) are introduced into the electrolyte flow paths at the inlets and outlets of the electrochemical cells. The setup was assembled inside a fume hood whose temperature was monitored using three thermocouples (FIG. 1.22).

Calculation of equilibrium time cell resistance. The equilibrium time cell resistance during the proof-of-concept were calculated using the expression below where i denotes the values corresponding to the hot or cold cell.

$$R_i = \frac{V_i(t = 21 \text{ minutes}) - V_i(t = 1 \text{ min})}{I} \quad (2.1)$$

Calculation of measured and predicted cooling loads. The measured total cooling load was calculated by the sum of the electrolyte specific products of the volumetric specific heat ($C_{V,e}$), volumetric flowrate ($\dot{V}_e$), and equilibrium time drop in temperature ($\Delta T_{ij}$).

$$\dot{Q}_{C,measured} = \Sigma_e \dot{V}_e C_{V,e} \Delta T_{ij} \quad (2.2)$$

Subscript e denotes electrolyte and subscripts i and j denote the RTDs located at the electrolyte outlet and inlet on the cold cell respectively. The predicted total cooling load was calculated using an energy balance.

$$\dot{Q}_{C,predicted} = I\alpha T - I^2 R_{COLD} \quad (2.3)$$

T is the volume averaged temperature within the cold cell. Since the maximum drop in temperature in this work is ~0.2 K, it is assumed that the cell is isothermal at 27° C.

Non-Isothermal Temperature Coefficient Measurements. Half-cell reactions were screened using a non-isothermal temperature coefficient measurement. To contain a variety of redox active couples and solvent combinations, the cell housing was made of a 7 cm long PTFE cylinder with a 1.5 cm bore across its length house the electrolyte solution. The electrodes were made of resin impregnated graphite (Graphite Store, MW001204). After the electrolyte was loaded into the cell housing, the PTFE annulus was sandwiched by the graphite electrodes using neoprene gaskets and two M16 bolts that thread into the bottom electrodes. Fiber glass washers are used to keep the graphite electrode electrically isolated via zinc plated bolts. The assembled cell is then sandwiched between two thermoelectric modules (TE technology, CP-061HT) using a lead screw mechanism that minimizes interfacial thermal resistance by applying pressure. When the experiment is started, the programmed thermoelectric modules apply varying thermal gradients as shown in FIGS. 1.8A-1.8D. The top thermoelectric module is always maintained at a higher temperature than the bottom one. The temperatures of the electrodes are continuously monitored using K-type thermocouples and the voltage across the two electrodes is measured using a data acquisition unit (Agilent, 34970A). The hot electrode and cold electrode are always connected to the positive and negative terminals, respectively. The non-isothermal temperature coefficient is evaluated by the slope of the voltage change and the difference in temperature between the two electrodes. For these measurements, electrolytes were prepared with equal concentrations of the reduced and oxidized species.

Isothermal Temperature Coefficient Measurements. Once two promising half-cell reactions with the appropriate temperature coefficients were shortlisted, they were assembled in an electrochemical cell with an ion-exchange membrane (IEM) of choice (FIGS. 1.9A-1.9D). This was done for two reasons: (i) to confirm that the temperature coefficients added up in a complete electrochemical cell setup and that there were no mechanisms that diminished the entropy of the half-cell reactions, and (ii) to evaluate the lifetime of the electrochemical system under varying temperature under the open-circuit condition. To test a variety of redox systems, the tenants of maximum inertness were maintained. The cell housing was made of PTFE and 2 cm through holes were bored into the middle to house the porous electrodes. Carbon felt (AvCarb, G600A) were used as the cathode and anode material. They sandwiched the ion-exchange membrane of choice. The current collectors were made of resin impregnated graphite (Graphite Store, MW001204) and zinc plated screws were screwed into them to facilitate robust electrical connections. The cell housing was sealed using M6 bolts and neoprene gaskets. The electrolytes were first introduced into the cell using syringes and then air-tight sealed using redundant stop cocks and one-way valves. This restricted any solvent motion due to osmotic pressure. After the electrochemical cell was assembled and checked for any leakage, it was placed in between the same two thermoelectric modules in the previous section. This time however, the modules were programmed to establish the same temperature. The temperature feedback that informed the PID controller were disconnected from the modules and firmly affixed on the cathode and anode current collectors. Thermocouples were used to measure the temperature of both current collectors and the open circuit voltage of the cell was monitored continuously. Keeping in line with convention, the half-cell reaction with the positive temperature coefficient was connected to the positive terminal. When the experiment is started, the thermoelectric modules draw power to drive the feedback temperatures (located on the current collectors) to the set value. However, thermal equilibrium is achieved when the entire cell (specifically the porous electrodes) attains the bespoke temperature. At this point, there should ideally be no change in the open circuit voltage with time. This was taken to be the point of thermal equilibrium and the open circuit voltage and electrochemical cell temperature were recorded for data processing. This was repeated for multiple set values and the rate of change of the voltage with respect to temperature afforded the temperature coefficient of the half-cell reactions. See FIGS. 1.10A-1.10B for generated data and processing.

Quantifying Electrolyte Specific Heat Capacity. The measurement of electrolyte specific heats was mildly complicated by the tendency of the iodide/triiodide electrolyte to liberate corrosive $I_2$ vapor upon heating. This could be detrimental costly laboratory equipment (e.g., automated differential scanning calorimeters), therefore, simpler "styrofoam cup" calorimetry was performed. Consider the "styrofoam cup" calorimeter assembly as shown in FIG. 1.11. It is filled with some liquid whose specific heat capacity is to be measured. A resistive heater is immersed into the liquid and generates heat at the rate P. A stir bar keep the liquid well mixed so that the temperature is homogenous. Employing a simple energy balance for the liquid that begins at thermal equilibrium (T=$T_{amb}$), the following expression is obtained under the assumption of high thermal resistance of the Styrofoam cup.

$$(VC_V + C_{CAL})\frac{dT}{dt} \approx P \tag{2.4}$$

Using the above equation, the specific heat capacity of the liquid may be evaluated using a linear regression. For the resistive heater, a 1Ω thin-film resistor (Riedon PF1262-1RF1) capable of generating up to 20 W of heat was chosen. It was screwed into a 2 cm×2 cm×3 mm graphite plate with some heat sink compound to improve its thermal conductance with the liquid. The temperature of the liquid was measured using four RTDs (Adafruit Industries LLC, 3290) placed in random locations within the fluid (FIGS. 1.12A-1.12B). Prior to the experiment, the resistive heater and RTDs were immersed in the liquid of interest, contained in the styrofoam cup, with fast stirring using a stir bar (700 RPM). During the experiment, a power source (Keithley 2230G-30-3) was used to source 1.5 A through the heater, and the temperatures and voltage across the resistor was continuously monitored using a data acquisition unit (NI, cDAQ). The experimental time was short (<50 s) such that the temperature-time slopes were linear as shown in FIG. 1.13. The temperature of the liquid was taken to be the average of the four temperature traces and some of the data was visually truncated to ignore the noise floor regime. The experiment was first validated using deionized water. This set-up was then used to measure the specific heat capacities of the electrolytes (FIG. 1.14). The y-intercept in the plot below is different for the different liquids because of the polymer adhesive that had to be applied to the resistive heater for corrosion resistance.

Electrolyte Temperature as a Function of Reaction Extent. For an arbitrary electrochemical system, the first law of thermodynamics may be written as the following expression.

$$dH = d\left(\sum_i N_i \overline{H}_i\right) = \sum_i \overline{H}_i dN_i + \sum_i N_i d\overline{H}_i = TdS + \sum_i \mu_i dN_i \tag{2.5}$$

In the above expression, H is the total enthalpy, N is the number of particles, $\overline{H}$ is the partial molar enthalpy, T is temperature, S is entropy, μ is chemical potential, and subscript i represents all species participating in the electrochemical system. Recalling that $((\delta \overline{H}_i/\delta T)_P)=\overline{C}_{P,i}$ where $\overline{C}_{P,i}$ is the partial molar heat capacity and employing the concept of an average heat capacity $C_P$, the above expression may be written as the following.

$$TdS = C_P dT + \sum_i \overline{H}_i dN_i - \sum_i \mu_i dN_i \tag{2.6}$$

Finally, it is recognized that by fixing the initial and final states of the reaction, a reaction coordinate can be defined. One point on the reaction coordinate will then map to relative concentrations of all species in the electrochemical system. It is also recognized that the changes in the partial molar enthalpies and chemical potential are simply the enthalpy and Gibbs free energy of the reaction. The above equation can now be written as the following for the special case of an isentropic reaction.

$$dS = \frac{C_P}{T}dT + \Delta S_{rxn}(\xi)d\xi = 0 \tag{2.7}$$

The reaction coordinate, ξ, is interchangeable with the state of charge. Finally, the linear fit from the trends in FIG. 1.2A, and specific heat capacities may be used to integrate both sides of the above equation to find the final temperature as a function of reaction extent.

Quantifying Electrolyte Flowrate. Electrolyte flow was generated using two identical peristaltic pumps (Control company, 3385). The peristaltic pumps use a potentiometer to control the speed of the peristaltic pump. Once connected to a closed-flow loop, the speed of the pump decreases and, therefore, the pump flowrate needs to be calibrated against the rotational speed that is set by the potentiometer's position when connected to the flow loop. To measure the speed of the pump, an optical tachometry technique was used as shown in FIGS. 1.16A-1.16D. A reflective piece of foil was first attached to the circumference of the pump head. Directly above the pump head, an LED and a photodiode (PD) was mounted within a recession cut into a piece of foam. The assembly was arranged such that during the rotation of the pump head, the LED and PD would be directly over the foil. At this instance, the light emanating from the LED is reflected to the PD. The time-varying current generated from the PD passes through a 909 kΩ resistor and the time-varying voltage is recorded by an oscilloscope (Tektronix TBS1202B). This voltage trace comprised of moments of high intensity when the foil was directly underneath the LED and PD, and of low intensity in the absence of the foil during the rotation. The periodicity of this trace informed the pump speed. A calibration experiment was performed to map the flowrate of each pump to the pump speed. For a specific setting on the pump, the speed was first measured using the optical tachometry technique above. Then, the flowrate for that setting was measured using a graduated cylinder and a stopwatch. This was done for three different setting and a linear regression was performed to evaluate the calibration (FIG. 1.17). This was done for both pumps. During the proof-of-concept experiment, the speeds of both pumps were recorded, and the calibration curves were used to evaluate the flowrate of the electrolytes. Raw data acquired is shown in Table 2.6.

TABLE 2.6

Raw Data from Pump Calibration[a]

| | RPM # | Average RPM (Hz) | Std. Dev RPM (Hz) | Average flowrate (mL/s) | Std. Dev flowrate (mL/s) |
|---|---|---|---|---|---|
| iodide/triiodide pump | 1 | 4.5 | 0.00 | 5.00 | 0.01 |
| | 2 | 3.18 | 0.00 | 3.29 | 0.03 |
| | 3 | 2.06 | 0.00 | 2.09 | 0.02 |
| ferricyanide/ ferrocyanide pump | 1 | 3.73 | 0.00 | 3.66 | 0.03 |
| | 2 | 1.17 | 0.00 | 0.40 | 0.05 |
| | 3 | 1.99 | 0.00 | 1.95 | 0.19 |

[a]All measurements were repeated five times to acquire statistics.

Estimation of Pumping Power. The pressure drop $\Delta P$ experienced by a fluid as it flows through a porous medium is given by Darcy's law which is given below.

$$\Delta P = \frac{v \mu \Delta x}{K} \quad (2.8)$$

where $v$ is fluid velocity, $\mu$ is dynamic viscosity, $\Delta x$ is path length, and K is permeability. Converting the fluid velocity to volumetric flowrate and multiplying both sides of the above equation with the volumetric flowrate $\dot{V}$ to obtain the pumping power $P_{PUMP}$.

$$P_{PUMP} = \Delta P \dot{V} = \frac{\dot{V}^2 \mu \Delta x}{A_C K} \quad (2.9)$$

The permeability for a porous electrode is given by the Kozeny-Carman equation given below as a function of pore radius $r_p$, electrode porosity $\varepsilon$, and Kozeny-Carman constant.

$$K = \frac{4 r_p^2}{C_{KC}} \frac{\varepsilon^2}{(1-\varepsilon)^2} \quad (2.10)$$

Using a pore radius of 10 μm, porosity of 0.7, and Kozeny-Carman constant of 5.55, the above permeability is calculated to be $3.92 \times 10^{-10}$ m$^2$. Assuming that the electrolyte takes the convoluted path of the graphite serpentine where each serpentine flow-field has a total of 20 channels. The channels are 3 mm wide and 3 mm deep. It was conservatively estimated that the entire depth is occupied by the porous electrode due to the compressive stress put into the electrochemical cell assembly. In reality, there will be parallel pathways that reduce the pumping demand e.g. graphite serpentine channel area unobstructed by the electrode, bypass electrolyte routes within the porous electrode with a very short path length from the inlet to the outlet. The volumetric flowrate of the electrolyte is taken to be 1 mL/s, and the dynamic viscosity of the electrolyte is taken to be $8.9 \times 10^{-4}$ Pa s. Using these parameters, the pumping power required to drive the electrolyte through one porous electrode is estimated to be 0.4 W. Since one pump drives the electrolyte through two porous electrodes in parallel, the total power consumed by one pump is 0.2 W. Two pumps in were used to drive electrolyte through two sets of porous electrodes each in parallel; therefore, the entire pumping power is estimated to be 0.4 W.

Uncertainty and Error Propagation. The electrolyte specific cooling load QC, at thermal equilibrium (acquired at time $t_{eq}$) is given by the following expression.

$$Q_{C,e} = \dot{V}_e C_{V,e} \Delta T_{ij}(t_{eq}) \quad (2.11)$$

where $\dot{V}$ is volumetric flowrate, $\Delta T_{ij} = T_i - T_j$ is the difference between the electrolyte inlet and outlet temperature of the cold electrochemical cell, and subscript e represents the electrolyte. The uncertainty in the electrolyte specific cooling load is then given by the following expression.

$$\frac{\delta Q_{C,e}}{Q_{C,e}} = \sqrt{\left(\frac{\delta \dot{V}_e}{\dot{V}_e}\right)^2 + \left(\frac{\delta C_{V,e}}{C_{V,e}}\right)^2 + \left(\frac{\delta \Delta T_{ij}(t_{eq})}{\Delta T_{ij}(t_{eq})}\right)^2} \quad (2.12)$$

The uncertainty in the equilibrium time difference between the outlet and inlet temperatures is given by the standard deviation of such differences acquired across all repetitions and is given by the expression below.

$$\delta \Delta T_{ij} = \sqrt{\frac{1}{N-1} \sum_{rep}^{N} \left(\Delta T_{ij,rep} - \frac{1}{N} \sum_{rep}^{N} \Delta T_{ij,rep}\right)^2} \quad (2.13)$$

In the above equation, subscript rep represents each of N repetitions. The uncertainty in the total cooling load, which is simply the sum of the electrolyte contributions, is given by, $$\delta Q_C = \sqrt{\sum_e \delta Q_{C,e}^2} \quad (2.14)$$

A similar approach is taken for rejected heat $Q_H$. The COP $\beta$ is given by the ratio of the total cooling load $Q_C$ and the electrical work input $W_{IN}$. The uncertainty of the COP is then given by the corresponding formula for error propagation.

$$\frac{\delta \beta}{\beta} = \sqrt{\left(\frac{\delta Q_C}{Q_C}\right)^2 + \left(\frac{\delta W_{IN}}{W_{IN}}\right)^2} \quad (2.15)$$

The uncertainty of the work input is given by the product of the current (uncertainty of current regulated by the galvanostat is effectively zero) and the uncertainty of the cell voltages.

Example 3: System Dynamics and Metrics of an Electrochemical Refrigerator Based on the Brayton Cycle The global cooling demand is projected to triple by 2050 due to rising regional temperatures, rapid urbanization, and regional population growth. Currently, this demand is poised to be fulfilled almost completely by vapor compression. While efficient and scalable, vapor compression uses working fluids, hydrofluorocarbons, that have a global warming potential orders of magnitude larger than $CO_2$. Studies have shown that if the status quo is left unchallenged, HFC emissions will be 9 GtCO$_2$-eq/yr or 15% of the total CO$_2$-eq emissions.

One potential solution to mitigating this problem is the discovery and development of technologies that have zero global warming potential, called not-in-kind technologies. Inspired by the vast improvements made in flow battery chemistry, herein is disclosed a novel, continuous electrochemical refrigeration cycle. Though electrochemically driven refrigeration has been modelled by a few works previously, these previous works have based their analyses around the Stirling cycle. This cycle necessitates isothermal electrochemical reactions, which are practically difficult to realize as this implies that the electrolytes must be well-mixed and fins must be incorporated onto the electrochemical reaction vessel. Additionally, electrochemical refrigeration based on the Stirling cycle inherently divides the entropic heat absorbed between the moving electrolyte and heat transfer across the electrochemical cell boundaries. Therefore, despite tenuous academic interest, continuous electrochemical refrigeration based on the Stirling cycle has never been experimentally demonstrated.

This work introduces the Brayton Electrochemical Refrigeration (BECR) cycle, which employs the electrochemical analogue to the Brayton refrigeration cycle. Herein is demonstrated an experimental proof-of-concept of the BECR cycle which demonstrates its technological superiority over the ones that rely on the Stirling cycle. The analytic framework which quantitatively describes the performance of a BECR system using thermodynamic and kinetic parameters is also presented. First, the ideal BECR cycle is analyzed (perfect heat exchangers and zero electrochemical overpotential) that reveals the performance of the technology in the limit of internal reversibility. Though unrealistic, this analysis demonstrates the fullest extent of the BECR performance, and through the dimensionless figure-of-merit X, provide intuition for the operation of the BECR cycle and simple expressions for the cooling load and coefficient of performance (COP). Two main practical considerations that limit the operation of the BECR cycle are then identified. Finally, the non-ideal BECR cycle with real heat exchanger efficiencies and electrochemical overpotentials are analyzed, subject to the practical considerations previously mentioned. This analysis explores the thermodynamic, kinetic, and operational requirements of a BECR system that generates useful cooling, and how it may be scaled up to generate higher cooling loads. This framework will guide the concerted efforts that are required of engineers to advance the competency of this technology and introduce it into the refrigeration and heat pumping market.

BECR Cycle Operating Principle

The BECR cycle relies on the thermogalvanic effect, the metric for which is the temperature coefficient $\alpha$. For a general half-cell reaction, $O + ne^- \rightarrow R$ the temperature coefficient is given by $$\alpha = \frac{\partial U}{\partial T} = \frac{\Delta S_{rxn}}{nF} \tag{3.1}$$

where U is the equilibrium potential of the half-cell reaction measured against a reference, T is temperature, $\Delta S_{rxn}$ is the entropy of the half-cell reaction, n is the number of electrons transferred, and F is Faraday's constant. The highest performing BECR cycle will comprise two half-cell reactions with opposite signs of $\alpha$, as the magnitude of the subsequent cooling effect is additive, similar in manifestation to using both n- and p-type semiconductors with thermoelectric legs. This maximizes the $\Delta S_{rxn}$ of the net electrochemical reaction, and therefore, the refrigeration performance.

Overall, the BECR cycle is comprised of four processes that are undertaken by a generic electrochemical system consisting of two redox active species, electrodes, and an appropriate ion-exchange membrane (IEM). These processes are best described on a temperature-entropy diagram as shown in FIG. 2.1A. In the first process, the electrochemical system is driven from state 1 to state 2 via an isentropic electrochemical reaction. The direction of the applied voltage bias is such that the entropy of the reaction, $\Delta S_{rxn}$, is greater than zero. The total derivative of the entropy of an electrochemical system undergoing an isentropic reaction is given by $$dS = \frac{C_P}{T}dT + \Delta S_{rxn}d\xi = 0 \tag{3.2}$$

where $C_P$ is the averaged specific heat capacity of the system, and $\xi$ is the reaction coordinate (see below for derivation). Equation 3.2 shows that the temperature of the electrolytes must decrease for an isentropic (i.e., dS=0) electrochemical reaction. The extent of the electrochemical reaction causes the volume averaged temperature of the electrochemical system to cool down to some temperature $T_2$ below the cold source temperature, $T_C$. In the next process, the system is electrically disconnected and placed in thermal contact with the cold heat source and is driven from state 2 to state 3 via isomolar heat absorption. This process is described as isomolar because the number of participating species do not change in the absence of an electrochemical reaction. The process is complete when the temperature of the system reaches that of $T_C$. In the third process, the reverse electrochemical reaction occurs isentropically, driving the system from state 3 to state 4. The voltage bias is reversed from that of the isentropic reaction in the first process. The entropy of the reaction, $\Delta S_{rxn}$ is less than zero and, therefore, the volume averaged temperature of the system increases. The extent of the electrochemical reaction is such that the net charge transferred between states 3 and 4 is equal to that of the charge transferred between states 1 and 2, i.e. the chemical configuration of the system at state 4 is the same as that of state 1. The extent of the electrochemical reaction causes the volume averaged temperature of the electrochemical system to heat up to some temperature $T_4$ above the hot sink temperature, $T_H$. In the fourth and final process, the system is electrically disconnected, placed in thermal contact with the hot heat sink, and driven from state 4 to state 1 via isomolar heat rejection. The process is complete when the temperature of the system reaches that of $T_H$. Upon completion, the temperature and chemical configuration of the system is restored to state 1.

The overall electrical work input required to complete the cycle is the difference in Gibbs free energy of the closed-circuit electrochemical reactions and has a positive value as necessitated by the Clausius statement (see below). This sequential cycle can be made continuous by employing all soluble redox couples, flow battery architectures for the electrochemical cells, and heat exchangers that allow both electrolytes to separately exchange heat with their respective environments (FIG. 2.1B). FIG. 2.1A is a depiction of the ideal BECR cycle that operates with isentropic electrochemical reactions and perfect heat exchanger efficiency ($\varepsilon_{HX}=1$). These assumptions are relaxed for the non-ideal BECR cycle, which features entropy generation from Joule heating within the electrochemical cell, electrolyte mixing, internal heat transfer, and a realistic heat exchanger efficiency. For ideal and non-ideal BECR cycles operating with the same cold source and hot sink, these mechanisms have a net effect of reducing the cooling load $Q_C$ and coefficient of performance $\beta$.

A critical point that must be addressed at this juncture is about the nature of an electrochemical cell capable of driving an isentropic electrochemical reaction. To this end, it is sufficient for the electrochemical cell to be adiabatic and operate without irreversibilities. However, since the purpose of the isentropic reaction is to obtain the maximum drop (or rise) in temperature using a temperature dependent heat generation term, the electrochemical cell must be built as per the tenets of a plug flow reactor. The ideal electrochemical plug flow reactor that achieves a high isentropic change in temperature prevents exocellular heat transfer, operates with a high electrolyte residence time and high operating current, and mitigates thermal dispersion to support the spatial temperature evolution of the electrolyte. See below for further discussion.

Total Derivative of Entropy Change for an Electrochemical System

TABLE 3.1

Symbols Used in Derivation

Nomenclature

| | | | |
|---|---|---|---|
| H | total enthalpy [J] | $\overline{H}_i$ | partial molar enthalpy [J/particle] |
| T | temperature [K] | S | entropy [J/K] |
| $\mu$ | chemical potential [J/particle] | N | number of particles |
| $\overline{C}_P$ | partial molar heat capacity [J/particle K] | $\zeta$ | reaction coordinate [mol] |
| $\Delta S_{rxn}$ | entropy of reaction [J/mol K] | | |

Subscripts i    Species i

For an arbitrary electrochemical system, the first law of thermodynamics may be written as $$dH = d\left(\sum_i N_i \overline{H}_i\right) = TdS + \sum_i \mu_i dN_i \qquad (3.3)$$

Applying the chain rule to Equation 3.3, the following equation is derived.

$$\sum_i \overline{H}_i dN_i + \sum_i N_i d\overline{H}_i = TdS + \sum_i \mu_i dN_i \qquad (3.4)$$

Recalling that $(\partial \overline{H}_i/\partial T)_P = \overline{C}_{P,i}$, Equation 3.4. may be written as given below under the assumption of thermal equilibrium.

$$TdS = \sum_i N_i \overline{C}_{P,i} dT + \sum_i \overline{H}_i dN_i - \sum_i \mu_i dN_i \qquad (3.5)$$

For pedagogical purposes, the concept of a state-averaged heat capacity is employed. This may be done by fixing the initial and final states of the reaction, averaging the number of particles and partial molar heat capacity for each species. Under this treatment, the following is obtained:

$$TdS = C_P dT + \sum_i \overline{H}_i dN_i - \sum_i \mu_i dN_i \qquad (3.6)$$

Finally, it is recognized that by fixing the initial and final states of the reaction, a reaction coordinate can be defined. One point on the reaction coordinate will then map to relative concentrations of all species in the electrochemical system. It is also recognized that the changes in the partial molar enthalpies and chemical potential are simply the enthalpy and Gibbs free energy of the reaction. Equation 3.6. can now be written as $$dS = \frac{C_P}{T} dT + \Delta S_{rxn} d\xi \qquad (3.7)$$

Electronic Work Required for the BECR Cycle

TABLE 3.2

Symbols Used for Electronic Work Calculations

Nomenclature

| | | | |
|---|---|---|---|
| $\alpha$ | temperature coefficient [V/K] | U | equilibrium potential [V] |
| T | temperature [K] | n | number of electrons transferred |
| F | Faraday's constant [C/mol] | $U^0$ | standard equilibrium potential [V] |
| q | charge transferred [C] | W | electrical work [J] |

Subscripts

| | | | |
|---|---|---|---|
| A | half-cell reaction A | B | half-cell reaction B |
| HOT | hot cell | COLD | cold cell |

For a generic redox reaction $A + ne^- \rightarrow B$, the temperature coefficient of the redox reaction is given by $$\alpha = \frac{\partial U}{\partial T} = \frac{\Delta S_{rxn}}{nF} \qquad (3.8)$$

where the equilibrium potential of the redox reaction is measured relative to some reference potential. For a redox reaction with a positive temperature coefficient, a cathodic current results in a positive entropy of reaction, and an anodic current leads to a negative entropy of reaction. Therefore, the entropy of the net electrochemical reaction may be maximized by pairing half-cell reactions with both positive and negative temperature coefficients. In the cold cell, the voltage bias is applied such that the half-cell reaction with $\alpha > 0$ undergoes a cathodic current, and that with $\alpha < 0$ undergoes an anodic current. For a complete electrochemical system with a cathode and anode redox reaction, the equilibrium potential of the cell can be written as $$U_{CELL} = U_c - U_a = U^0 + \alpha_c(T_c - T_{ref}) - \alpha_a(T_a - T_{ref}) \qquad (3.9)$$

In the above equation, the temperatures of the half-cell reactions are constrained to be different in order to ignore entropy generation from internal heat transfer. This may be realized by an arbitrarily high thermal resistance of the separator. The infinitesimal reversible electrical work done on/by any electrochemical system is given by $dW = -U_{CELL}(T, q)dq$, where dq is positive in the direction of a cathodic current. In the absence of any side reactions and 100% Faradaic efficiency, the charge transferred is coupled to the chemical composition of the electrochemical system. Therefore, the equilibrium potential of the cell is a function of the charge transferred from the chemical composition. The total electrical work input into the BECR cycle then is given by $$W_{IN} = -\left( \int_1^2 U_{COLD}(T, q) dq + \int_3^4 U_{HOT}(T, q) dq \right) \quad (3.10)$$

where the limits of the integrals represent the states on the BECR cycle. It is recognized that the chemical constituency is the same in states 2 and 3, and in states 4 and 1. For clarity, the chemical constituency is labeled in states 1 and 4 as $q_i$ and in states 2 and 4 as $q_f$ Furthermore, the half-cell reaction with $\alpha>0$ is labeled as A, and that with $\alpha<0$ as B. Adopting these limits and substituting for the equilibrium potentials the following equation is arrive at:

$$W_{IN} = -\left( \int_{q_i}^{q_f} dq \right. \quad (3.11)$$
$$\left. [\alpha_A(q)(T_{A,COLD}(q) - T_{A,HOT}(q)) - \alpha_B(q)(T_{B,COLD}(q) - T_{B,HOT}(q))] \right)$$

In Equation 3.11, by disallowing for any internal heat transfer, the temperature of the half-cell reaction ensemble can be mapped to the chemical composition and therefore, the charge transferred (Equation 3.7). As shown in FIG. 2.8, for every state between the initial and final states, the equilibrium potential in the hot cell is greater than that of the cold cell. This may be explicitly derived by integrating Equation 3.7 to express the temperature of a half-cell reaction as a function of the reaction coordinate. $W_{IN}>0$ must be greater than zero because the change from $q_i$ to $q_f$ represents a positive change along the reaction coordinate (the direction of charge transferred in the cold cell is chosen to be positive as a reference), thus proving the need for an external power supply from electrochemical thermodynamics.

Adiabatic Plug Flow Electrochemical Cells for High Isentropic Temperature Change

TABLE 3.3

Symbols Used for Adiabatic Plug Flow Equations Nomenclature

| | | | |
|---|---|---|---|
| $\dot{V}$ | electrolyte flowrate [m³/s] | c | volumetric specific heat [J/m³ K] |
| T | local electrolyte temperature [K] | I | operating current [A] |
| α | temperature coefficient [V/K] | $L_e$ | electrode length along x direction [m] |

An electrolyte passing through its corresponding electrodes is subject to the heat generation or consumption according to Equation 3.7. However, the heat generation term is directly proportional to the electrolyte temperature and therefore, the temperature field of the electrolyte dictates the outlet temperature of the electrolyte from the field. Temperature inhomogeneity is supported by high electrolyte residence time, high reaction rate, and low thermal dispersion. Two sources of thermal dispersion are (i) porous electrode tortuosity (ii) thermal back conduction. Tortuous electrodes can mix electrolyte streams of different temperature leading to reduction in temperature inhomogeneity. Thermal back conduction along the electrode fibers or the current collector can also reduce thermal gradients within the electrolyte. This spectrum of temperature homogeneity and the resulting outlet temperature are shown in the three cases featured in FIG. 2.9.

In all three cases, the electrolyte enters the electrode at flowrate $\dot{V}$ and temperature $T_{IN}$, leaves it at the same flowrate but at different temperatures that is a function of the temperature field of the electrolyte, and the current distribution along the one-dimensional electrolyte flow is uniform. In case A, there is no thermal dispersion whatsoever and the electrode may be likened to a plug flow reactor. The electrolyte enters the electrode at temperature $T_{IN}$ and gradually drops to $T_A$ due to entropic heat absorption associated with the half-cell reaction. In case C, the electrolyte is well-mixed and the electrolyte is at a homogenous temperature $T_C$. Case B represents some intermediately mixed case the architecture supports a smaller temperature gradient relative to case A.

Applying energy balance for case A on a differential volume at some position in the x-wise direction (FIG. 2.10), the following equation is derived.

$$\dot{V}c\frac{dT}{dx} = \frac{-I\alpha T}{L_e} \quad (3.12)$$

Upon integration, the outlet temperature of the electrolyte is given by $$T_A = T_{IN}\exp\left(\frac{-I\alpha}{\dot{V}c}\right) \quad (3.13)$$

Applying energy balance to case C, the following equation is obtained.

$$\dot{V}cT_{IN} - \dot{V}cT_C - I\alpha T_C = 0 \quad (3.14)$$

Rearranging the equation affords the expression for the outlet temperature for case C.

$$T_C = \frac{T_{IN}}{1 + I\alpha/\dot{V}c} \quad (3.15)$$

The ratio of the outlet temperature in both cases is then given by $$\frac{T_A}{T_C} = \frac{\exp(-\chi)}{1/1 + \chi} \quad (3.16)$$

where $\chi = I\alpha/\dot{V}c$. The right-hand side of the above equation is always less than 1 for $\chi>0$. This implies that keeping all things constant, a lower outlet temperature can be achieved in a plug flow reactor temperature.

Energy Balance in Electrochemical Cells

The heat associated with electrochemical reactions was first addressed by Sherfey and Brenner and has since then been developed in several works for specific electrochemical systems. Bernardi et. al developed a more general framework for the heat evolved in an electrochemical system that accounted for phase changes, changing heat capacity, and electrolyte mixing. This work will use the framework developed by Bernardi et al. to describe electrochemical systems that employ soluble redox species and where electrolyte mixing is not appreciable. The following analysis was performed on a low order one-dimensional adiabatic plug flow electrochemical cell to elucidate the interplay of the thermodynamics, kinetics, and operating parameters. Due to symmetry, the analysis was focused on to a porous electrode and one-half of the IEM as shown in FIGS. 2.2A-2.2B. Applying the first law of thermodynamics to a control volume in an open system, it is assumed (i) a constant current density within the porous electrode, (ii) one-dimensional electrolyte flow with high heat transfer and mass transfer Péclet numbers with all-soluble redox reaction species, (iii) negligible electrolyte mixing, (iv) negligible edge effects, and (v) adiabatic boundary conditions on either side of the domain in the z-direction; this energy balance leads to the expression below.

$$\dot{V} C_V \frac{dT}{dx} = \left(\frac{\vec{I} \cdot \hat{n}}{L_e}\right)(-\eta - \alpha T) \quad (3.17)$$

where $\dot{V}$ and $C_v$ are the volumetric flowrate of the electrolyte and volumetric specific heat of the electrolyte, T is the local temperature, $\vec{I}$ is the current vector, $\hat{n}$ is the unit vector in the direction of a cathodic current, $L_e$ is the length of the electrode in the x-direction, and $\eta$ is the total local overpotential. The details for the derivation of Equation 3.17 may be found below. The outlet temperature of the electrolyte may now be predicted once the Joule heating due to the overpotentials is detailed. The total local overpotential is the summation of the local activation, local concentration, and volume normalized ohmic overpotentials and these expressions are derived from Butler-Volmer kinetics as shown below. The expressions for all the heat generation terms involved in Equation 3.17 are summarized in Table 3.4.

TABLE 3.4

Summary of All Heat Generation Terms in Equation 3.17

| Heat Generation Term | Expression | Comments |
|---|---|---|
| Temperature coefficient | $\alpha = \alpha^0 - \eta_{NERNST} = $ $\alpha^0 - \frac{R}{nF}\ln\left(\frac{C_R^S}{C_O^S}\right)$ | The expression is derived from the Nernst equation. $\alpha^0$ is the standard temperature coefficient, R is the universal gas constant, F is Faraday's constant, and $C_i^S$ is the local surface concentration of species i. |
| Activation overpotential | $\eta_{ACT} = $ $\frac{-2RT}{nF}\sinh^{-1}\left(\frac{\vec{I}\cdot\hat{n}}{2aV_e i_0}\right)$ | $V_e$ is the volume of the porous electrode, a is the electrode specific surface area, and $i_0$ is the local exchange current density. |
| Concentration overpotential | $\eta_{CONC} = $ $\begin{cases} \frac{-2RT}{nF}\ln\left(\frac{C_O^B}{C_O^S}\right) & \vec{I}\cdot\hat{n}>0 \\ \frac{2RT}{nF}\ln\left(\frac{C_R^B}{C_R^S}\right) & \vec{I}\cdot\hat{n}<0 \end{cases}$ | $C_i^B$ is the local bulk concentration of species i. |

TABLE 3.4-continued

Summary of All Heat Generation Terms in Equation 3.17

| Heat Generation Term | Expression | Comments |
|---|---|---|
| Ohmic overpotential | $\eta_{OHM} = \frac{IR_{MEM}}{2}$ | One half of the ohmic overpotential generates Joule heat in the other electrode. |

The overpotential terms are derived from Butler-Volmer kinetics in the linear (activation overpotential) and Tafel (concentration overpotential) regimes for a generic half-cell reaction $O + ne^- \rightarrow R$. Details are provided below.

Derivation of a Low-Order Model for an Adiabatic Plug Flow Reactor

TABLE 3.5

Symbols used in Derivation of Low-Order Model

| Nomenclature | | | |
|---|---|---|---|
| Q | heat transferred into surroundings [J] | $W_S$ | work done by control volume [J] |
| Wμ | viscous work [J] | e | energy per unit mass [J/kg] |
| P | local pressure [Pa] | ρ | electrolyte density [kg/m$^3$] |
| k | thermal conductivity [W/m K] | $\dot{g}$ | local heat generation [W/m$^3$] |
| T | Local temperature [K] | v | fluid velocity (m/s) |
| g | acceleration due to gravity [m/s$^2$] | y | height [m] |
| h | local enthalpy per unit mass [J/kg] | ε | porosity |
| $\vec{I}$ | applied current [A] | $V_e$ | superficial electrode volume [m$^3$] |
| $L_e$ | superficial x-wise electrode length [m] | $W_e$ | superficial y-wise electrode length [m] |
| $H_e$ | superficial z-wise electrode length [m] | $\bar{h}$ | partial molar enthalpy [J/mol] |
| C | bulk concentration [mol/m$^3$] | $C_V$ | volumetric specific heat [J/kg K] |
| D | diffusion coefficient [m$^2$/s] | U | equilibrium voltage [V] |
| s | stoichiometry | n | number of electrons transferred |
| η | overpotential [V] | ΔH | enthalpy change [J/mol] |
| ΔS | entropy change [J/mol] | F | Faraday's constant |
| Pe$_M$ | mass transfer Peclet number | $L_C$ | characteristic length [m] |
| $\hat{n}$ | normal vector pointing in the direction of a cathodic current | | |
| Subscripts | | | |
| eff | effective | s | solid phase |
| I | liquid phase | x | x component |
| i | species i | rxn | property corresponding to the electrochemical reaction |

The Brayton Electrochemical Refrigeration (BECR) cycle is realized using an adiabatic plug flow electrochemical cell. A low order 1D model was developed as follows for one half of the adiabatic plug flow electrochemical cell to project the performance of this technology. As depicted in FIG. 2.11, the domain of interest features a current collector, a porous electrode, and one half of the ion exchange membrane.

The local energy balance in an elemental volume comprising of the porous electrode and electrolyte is given by the following equation.

$$\frac{\delta Q}{dt} - \frac{\delta W_s}{dt} - \frac{\delta W_\mu}{dt} = \iint_{C.S}\left(e + \frac{P}{\rho}\right)\rho(\vec{v}\cdot\hat{n})dA + \frac{\partial}{\partial t}\iiint_{C.V}e\rho dV \quad (3.18)$$

Upon detailing all the terms comprising the right hand side of the above equation, substituting $e=(v^2/2+gy+h)$, employing the equation of continuity in the absence of a fluid source, simplifying for an incompressible fluid, ignoring variation in potential energy, considering flow to be perpendicular to gravity, and neglecting viscous dissipation and viscous work, Equation. 3.18 may be simplified to the following.

$$\frac{\delta Q}{dt} - \frac{\delta W_s}{dt} = \rho\frac{Dh}{Dt} \quad (3.19)$$

The first term in the equation above is the rate of heat addition into the control volume from the surroundings.

$$\frac{\delta Q}{dt} = \nabla\cdot(k)_{eff}\nabla T + \dot{g} \quad (3.20)$$

Employing effective medium theory, the effective thermal conductivity may be written as the porosity weighted sum of the liquid and solid phase thermal conductivities.

$$k_{eff}=\varepsilon k_l+(1-\varepsilon)k_s \quad (3.21)$$

Considering standard values for the terms on the right hand side of the above equation ($\varepsilon$~70%, $k_l$~0.6 W/mK, and $k_s$~0.15 W/mK)$^2$, the approximation $k_{eff}\approx k_l$ is made going forward. Furthermore, $\dot{g}$ in equation 3.17 represents the irreversible heat generation within the control volume resulting from finite electrochemical kinetics. The second term in Equation 3.19 is the reversible work done by the control volume which, in this context, is the reversible coulombic energy associated with the electrochemical reactions at the electrode-electrolyte interface.

At this point, the following simplifying assumptions are made; (i) the applied current is uniformly distributed in the bulk of the porous electrode, and (ii) the state of the electrolyte (temperature and bulk species concentration) only varies in the x direction. It is acknowledged that a uniform current density is antithetic to complete electrochemical conversion of the reactants within the flowing electrolyte. However, it is certainly achievable by potential control of segmented current collectors. In the domain of interest, the outer wall of the current collector and the mid-plane of the ion exchange membrane are adiabatic. The former is enforced via insulative housing and the latter via symmetry. These conditions, along with the uniform rate of reaction enforced by the uniform current density, ensure that the temperature and bulk species concentration only vary in the x-direction. Taking the above into consideration, Equation 3.19 may be written as the following.

$$k_l\frac{d^2T}{dx^2} + \left(\frac{\vec{i}\cdot\hat{n}}{V_e}\right)[-\eta(x) - U(x)] = \rho v_x\frac{dh}{dx} \quad (3.22)$$

In the above equation, the total local enthalpy per unit mass may be written as the summation of the individual components comprising the electrolyte leading to the following.

$$k_l\frac{d^2T}{dx^2} + \left(\frac{\vec{i}\cdot\hat{n}}{V_e}\right)[-\eta(x) - U(x)] = v_x\left[\sum_i C_i\frac{d\overline{h}_i}{dx} + \sum_i \overline{h}_i\frac{dC_i}{dx}\right] \quad (3.23)$$

The first term on the right-hand side may be simplified using a lumped gravimetric specific heat. The second term on the same side may be simplified by employing the Nernst-Planck flux equation and the continuity equation. Ion-migration and thermophoresis are considered negligible due to a supporting electrolyte and a small local thermal gradient, respectively. The non-dimensional Nernst-Planck flux equation then becomes the equation below.

$$-\frac{d^2C_i}{d\tilde{x}^2} + Pe_{M,i}\frac{dC_i}{d\tilde{x}} = \frac{L_C^2}{D_i}\frac{s_i(\vec{i}\cdot\hat{n})}{nFV_e} \quad (3.24)$$

In the equation above, the mass transfer Peclet number $Pe_{M,i}=v_x L_C/D_i$ and the non-dimensional length $\tilde{x}=x/L_C$. In this work, the velocity of the electrolyte is on the order of 1 mm/s. The Peclet number for proton diffusion ($D_{H^+}$~$10^{-9}$ m$^2$/s, $L_C$~1 cm) is much greater than 1. Therefore, the gradient of the bulk species concentration may be approximated by $$dC_i/dx \approx s_i(\vec{i}\cdot\hat{n})/nFV_e v_x.$$

Plugging the above assumptions into Equation 3.22, the following result is obtained.

$$k_l\frac{d^2T}{dx^2} + \left(\frac{\vec{i}\cdot\hat{n}}{V_e}\right)[-\eta(x) - U(x)] = v_x C_V\frac{dT}{dx} + \frac{\vec{i}\cdot\hat{n}}{nFV_e}\sum_i s_i\overline{h}_i(x) \quad (3.25)$$

Once again, it is recognized that $\Sigma s_i\overline{h}_i=\Delta H_{rxn}$ and $-nFU=\Delta G_{rxn}$ from the Nernst equation. With these assumptions, the above equation may be rearranged to the form below.

$$k_l\frac{d^2T}{dx^2} + \left(\frac{\vec{i}\cdot\hat{n}}{V_e}\right)\left[-\eta(x) - \frac{T(x)\Delta S_{rxn}}{nF}\right] = v_x C_V\frac{dT}{dx} \quad (3.26)$$

We note that the coefficient of the term on the left-hand side of the above equation maybe be given by the inverse of the thermal Peclet number $1/Pe_T=k_l/v_x C_V L_C$. Considering values for each parameter representative to this work ($k_l$~0.6 W/mK, $v_x$~1 mm/s, $C_V$~4.18 MJ/m$^3$, $L_C$~5 cm), the thermal Peclet number is much greater than 1. Therefore, the Laplacian of the temperature field is negligible, and the above analysis may be summarized by the equation below after regrouping a couple of terms.

$$\left(\frac{\vec{i}\cdot\hat{n}}{V_e}\right)[-\eta(x) - T(x)\alpha(x)] = \dot{V}C_V\frac{dT}{dx} \quad (3.27)$$

Derivation of Local Activation, Concentration, and Ohmic Overpotentials

TABLE 3.6

Symbols used in Derivation of Local Activation, Concentration, and Ohmic Overpotentials

| Nomenclature | | | |
|---|---|---|---|
| $\vec{I}$ | current vector [A] | $\hat{n}$ | normal vector pointing in the direction of a cathodic current |
| V | volume [m$^3$] | a | specific area [m$^{-1}$] |
| C | local concentration [mol/m$^3$] | n | number of electrons transferred |
| F | Faraday's constant [C/mol] | R | universal gas constant [J/mol K] |
| $\eta$ | overpotential [V] | $k_0$ | standard rate constant [m/s] |
| T | temperature [K] | $\theta$ | transfer coefficient |
| $i_0$ | local exchange current density [A/m$^2$] | $R_{MEM}$ | Membrane resistance [$\Omega$] |
| D | diffusion coefficient [m$^2$/s] | $\vec{j}$ | flux [mol/m$^2$ s] |
| $\vec{v}$ | bulk electrolyte velocity [m/s] | $k_M$ | mass transfer coefficient [m/s] |
| Subscripts | | | |
| e | electrode | O | species O |
| R | species R | ACT | activation |
| CONC | concentration | OHM | ohmic |
| i | species i | IN | inlet |
| Superscripts | | | |
| B | bulk | S | surface |

The modified Butler-Volmer equation for a generic half-cell reaction O+ne$^-$→R with $\theta$=0.5 occurring in a porous electrode is given by the following expression $$\frac{\vec{I} \cdot \hat{n}}{V_e} = anFk_0\sqrt{C_O^B C_R^B}\left[\frac{C_O^S}{C_O^B}\exp\left(\frac{-nF\eta}{2RT}\right) - \frac{C_R^S}{C_R^B}\exp\left(\frac{nF\eta}{2RT}\right)\right] \quad (3.28)$$

At low current density, the surface concentration is equal to the bulk concentration for both species. In this limit, the overpotential is merely the activation overpotential. Under this assumption Equation 3.28 may be written as $$\frac{\vec{I} \cdot \hat{n}}{V_e} = 2anFk_0\sqrt{C_O^B C_R^B}\sinh\left(\frac{-nF\eta_{ACT}}{2RT}\right) \quad (3.29)$$

The above expression may be simplified by recognizing that $nFk_0(T)\sqrt{C_O^B C_R^B}=i_0$. In this work, the local temperature dependent rate constant is solved for using $$k_0(T) = k_0(T_{ref})\exp\left[\frac{E_a}{R}\left(\frac{1}{T} - \frac{1}{T_{ref}}\right)\right],$$

and assuming that $E_a$=50 KJ/mol. Applying this simplification and rearranging the above expression, the local activation overpotential may be expressed as $$\eta_{ACT} = \frac{-2RT}{nF}\sinh^{-1}\left(\frac{\vec{I} \cdot \hat{n}}{2aV_e i_0}\right) \quad (3.30)$$

Now, in order to develop an expression for the concentration overpotential, the Tafel regimes are employed. At high cathodic current densities ($\vec{I} \cdot \hat{n}>0$), the first exponential term in the square bracket is much greater than the second, i.e. exp($-nF\eta$/2RT)>>exp($nF\eta$/2RT). In this regime, the concentration overpotential is much larger than the activation overpotential. Taking these into consideration, Equation 3.28 may be written as the following for high cathodic current density.

$$\frac{\vec{I} \cdot \hat{n}}{V_e} = ai_0\left(\frac{C_O^S}{C_O^B}\right)\exp\left(\frac{-nF\eta_{CONC}}{2RT}\right) \quad (3.31)$$

Rearranging the terms in Equation 3.31 above, the concentration overpotential may be expressed as the following.

$$\eta_{CONC} = \frac{-2RT}{nF}\ln\left(\frac{C_O^B}{C_O^S}\right) \quad (3.32)$$

The same simplification may be done for high anodic current densities ($\vec{I} \cdot \hat{n}<0$), and in this case, the concentration overpotential may be expressed as the following.

$$\eta_{CONC} = \frac{2RT}{nF}\ln\left(\frac{C_R^B}{C_R^S}\right) \quad (3.33)$$

We have ignored the potential drop within the electrolyte and the corresponding ohmic overpotential under the treatment of a supporting electrolyte. The Joule heating due to the ohmic overpotential from the ion-exchange membrane is simply assumed to be split among the electrodes and therefore the ohmic overpotential is expressed as $$\eta_{OHM} = \frac{IR_{MEM}}{2} \quad (3.34)$$

The values for the activation and concentration overpotentials may be solved for by evaluating the local bulk and surface concentrations for both species in the porous electrode. In order to derive the local bulk concentration, the Nernst-Planck flux equation is used to start; this states that the flux of an ionic species is proportional to the gradient of its electrochemical potential. In the limit of no thermophoresis and negligible migration, the flux of an ionic species i may be expressed as $$\vec{j}_i = -D_i\nabla C_i + \vec{v} C_i \quad (3.35)$$

We recall that the continuity equation relates the flux of a species to its local source. Assuming unity Faradaic efficiency, for each redox active species, the local source term is related to the local current density through its stoichiometry. Applying Equation 3.35 to the continuity equation the following expression is obtained.

$$\nabla \cdot \vec{j}_i = -D_i \nabla^2 C_i + \nabla \cdot (\vec{v} C_i) = \frac{I}{V_e} \quad (3.36)$$

Similar to the treatment of Equation 3.24, the change in the bulk concentration is only dependent on the advection term in the limit of high $Pe_{M,i}$. Integrating the resulting equation, the local bulk concentration of a species i may be expressed as the following.

$$C_i^B(x) = C_{i,IN}^B - \frac{\vec{I} \cdot \hat{n}}{nF\dot{V}L_e} x \quad (3.37)$$

The local surface concentration may by now solved for using a more microscopic species balance at the electrode-electrolyte interface. Under this treatment, the surface concentration of species I is given as $$C_i^S(x) = C_i^B(x) - \frac{\vec{I} \cdot \hat{n}}{nFak_M V_e} \quad (3.38)$$

Now, through Equation 3.37 and Equation 3.38, the local bulk and surface concentrations are known. This allows for the calculation of the local activation and concentration overpotentials.

Finally, the temperature coefficient of a half-cell reaction O+ne$^-$→R is given by $\alpha = \partial U/\partial T$, where U is the equilibrium potential of the half-cell reactions with respect to some arbitrary reference. The Nernst equation details the equilibrium (no net current) potential for the half-cell reaction as given below.

$$U = U^0 - \frac{RT}{nF} \ln\left(\frac{C_R^B}{C_O^B}\right) \quad (3.39)$$

In the absence of any currents however, the bulk concentrations and the surface concentrations are equal. Correcting for the presence of concentration gradients, and applying the partial derivative operator, the temperature coefficient may now be expressed as the summation of the standard temperature coefficient and the Nernst entropic terms as given below.

$$\alpha = \alpha^0 - \frac{R}{nF} \ln\left(\frac{C_R^S}{C_O^S}\right) = \alpha^0 - \eta_{NERNST} \quad (3.40)$$

Ideal BECR Cycle Performance

The ideal BECR cycle is internally reversible ($\eta=0$) and has perfect heat exchangers ($\varepsilon_{HX}=1$). Under these assumptions, Equation 3.17 is integrable and the performance of the ideal BECR cycle is governed by the dimensionless figure of merit, $\chi$.

$$\chi = \frac{NI\alpha}{\dot{V}C_V} \quad (3.41)$$

where N is the number of cold and hot electrochemical cells in their respective stacks, and I is the cathodic operating current. As a physical interpretation, X is the ratio of the entropic driving force (NI$\alpha = \chi_E$) and the thermal inertia of the electrolyte ($\dot{V}C_V = \chi_I$). It is also a combination of operating parameters (N, I, and $\dot{V}$) and thermodynamic properties ($\alpha$ and $C_V$). Therefore, a dearth of favorable material properties may be compensated for by the operating parameters to meet the cooling load and COP demands. The COP, $\beta$, and cooling load, $Q_C$, for the ideal BECR cycle are given in Equations 3.42 and 3.43 below, respectively.

$$\beta = \frac{1 - T_R \exp(-\chi)}{\exp(\chi) - 1 + T_R[\exp(-\chi) - 1]} \quad (3.42)$$

$$Q_C = \frac{2NI\alpha T_C}{\chi}[1 - T_R \exp(-\chi)] \quad (3.43)$$

In the above equations, $T_R = T_H/T_C$. The details of the derivation are given below.

FIG. 2.3A shows the variation of $\beta$ relative to the Carnot COP, given by $\beta_{Carnot} = 1/(T_R - 1)$, as a function of $\chi$ for three different temperature ratios. $\beta$ monotonically decreases with increasing $\chi$ because of the nature of the BECR cycle. Increasing values of $\chi$ implies that the heat transfer processes occur less isothermally, and the BECR cycle deviates further from the Carnot cycle leading to lower efficiency. For a given value of $T_R$, $\chi$ must be greater than or equal to $\ln(T_R)$ in order to provide practical cooling. In the limit of the equality, $Q_C = 0$, and (as expected) the Carnot efficiency is recovered. As shown in Equation 3.43, $Q_C$ cannot be parametrized by $\chi$ and $T_R$ alone, and it additionally requires the specification of $T_C$ and $\chi_E$. The cooling load and COP achievable by various values of $\chi_E$ for a modest space cooling application ($T_H = 313$ K, $T_C = 295$ K) is shown in FIG. 2.3B. The cooling load, $Q_C$, first increases rapidly as $\chi$ increases beyond $\chi = \ln(T_R)$ until $\chi = 0.38$ and then starts decreasing relatively gradually. At $\chi > \ln(T_R)$, the temperature of the electrolytes exiting the cold cell are increasingly lower than $T_C$ and subsequently, $Q_C$ first increases. Beyond $\chi = 0.38$, the thermal inertia starts to decrease and although temperature of the electrolytes exiting the cold cell is increasingly lower than $T_C$ as $\chi$ increases; for a fixed value of $\chi_E$, there is not enough electrolyte volume undergoing this drop in temperature. Therefore, $Q_C$ decreases beyond this value. The crossover value of $\chi$ is a transcendental function of $T_R$ and its details are provided below.

One method of relaxing the requirements imposed on $\chi$ by the source and sink temperatures, and the COP and cooling load required by the application, is by employing a regenerator (see below). A high regeneration (internal exchange of heat between states 1 and 4), given by $f_{reg}$, ensures that most of the isentropic reaction occurring in the cold electrochemical cell is used to create useful cooling load, rather than lowering the electrolyte temperature from $T_H$ to $T_C$. Therefore, a higher $f_{reg}$ leads to higher values of $\beta$ and $Q_C$ for a given value of $\chi$ as shown in FIGS. 2.3C-2.3D.

Derivation of Cooling Load and COP Expressions for the Ideal BECR Cycle

TABLE 3.7

Symbols used in Derivation of Cooling Load and COP Expressions

| Nomenclature | | | |
|---|---|---|---|
| $\alpha$ | temperature coefficient [V/K] | $\vec{I}$ | cathodic current vector [A] |
| T | temperature [K] | $C_V$ | volumetric specific heat [J/m$^3$ K] |

TABLE 3.7-continued

Symbols used in Derivation of Cooling Load and COP Expressions

| | | | |
|---|---|---|---|
| $L_e$ | length of electrode in x direction [m] | $\dot{V}$ | volumetric flowrate [m³/s] |
| R | universal gas constant [J/mol K] | F | Faraday's constant [C/mol] |
| $Q_R$ | reaction quotient | $\alpha^0$ | standard temperature coefficient [V/K] |
| N | number of electrochemical cells | $T_R$ | temperature ratio |

Subscripts

| | | | |
|---|---|---|---|
| O | oxidized species | R | reduced species |
| IN | inlet | OUT | outlet |
| C | catholyte | A | anolyte |

The ideal BECR cycle is internally reversible ($\eta=0$) and has 100% efficient heat exchangers ($\varepsilon_{HX}=1$). In the limit of the former, Equation 3.22 takes the following form. The equation would be integrable if it were not for the position dependence of the temperature coefficient.

$$\left(\frac{\vec{i}\cdot\hat{n}}{L_e}\right)[T(x)\alpha(x)] = \dot{V}C_V\frac{dT}{dx} \tag{3.44}$$

In order to simplify the following analysis and to keep the interplay of the main parameters obvious, the domain in which the temperature coefficient remains a constant is explored. It is noted that $\alpha=\Delta S_{rxn}/nF=\partial U/\partial T$. Therefore, for a generic half-cell reaction the temperature coefficient may be expressed as the following using the Nernst equation.

$$\alpha = \alpha^0 - \frac{R}{nF}\ln Q_R \tag{3.45}$$

Therefore, the temperature coefficient is the summation of the standard temperature coefficient, and what will be here on out referred to as the compositional entropy. The former is a measure of the inherent difference in entropy between the product and reactant species in some reference concentration. The latter originates from the concept of fugacity and is therefore a contributing factor in all systems under a chemical equilibrium. Therefore, the half-cell reactions that are of interest in this work are those with redox active species that have a large inherent difference in entropy that originates from their structure and interactions with their immediate environment. In other words, half-cell reactions with a high $\alpha^0$ value. By applying the dilute solution approximation, the reaction quotient may be expressed using the species concentrations. FIG. 2.12 plots the compositional entropy term as a function of the ratio of the surface concentrations of the reduced and oxidized species. This work is only concerned with redox couples with $|\alpha|\geq 0.5$ mV/K and as shown in FIG. 2.12, it requires high degrees of electrochemical conversion for the compositional entropy to approach that value. Therefore, to analyze the ideal BECR cycle performance as analytically as possible, the compositional entropy term is neglected and treat it as a constant value throughout the reaction coordinate ($\alpha\approx\alpha^0$). Equation 3.44 now may be integrated across the length of the electrode shown in FIG. 2.11 to the following form.

$$T_{IN} = T_{OUT}\exp\left(\frac{-(\vec{i}\cdot\hat{n})\alpha}{\dot{V}C_V}\right) \tag{3.46}$$

The argument of the exponent in Equation 3.46 is dimensionless and is the figure of merit $\chi=I\alpha/\dot{V}C_V$ where a cathodic current is chosen to be positive as a reference. For the ideal BECR cycle, since the heat exchangers are 100% efficient, the inlet temperatures of the electrolytes in the cold cell are equal to that of heat sink $T_H$. Similarly, the inlet temperatures of the electrolytes in the hot cell are equal to that of the cold source $T_C$. The exit temperatures of both electrolyte ($T_2$) may be given as follows.

$$T_{2,A} = T_H\exp\left(\frac{-(\vec{i}\cdot\hat{n})\alpha_A}{\dot{V}_A C_{V,A}}\right) \tag{3.47}$$

$$T_{2,C} = T_H\exp\left(\frac{-(\vec{i}\cdot\hat{n})\alpha_C}{\dot{V}_C C_{V,C}}\right)$$

Furthermore, to simplify the analysis of the ideal BECR cycle and maintain the optics of the interplay between the governing parameters clear, it is assumed that $|\alpha_A|=|\alpha_C|$, $\dot{V}_A=\dot{V}_C$ and $C_{V,A}=C_{V,C}$. The same treatment can be applied to the electrolyte exit temperatures in the hot cell. It is also recognized that a high degree of chemical conversion may be achieved with the same amount of current by stacking electrochemical cells in series electrically and in parallel hydraulically. This is shown in FIGS. 2.4A-2.4B. By splitting an electrolyte flow among N electrochemical cells and connecting the cells in electrical series, the thermal inertia is decreased by a factor of N for each cell. This kind of architecture is useful for a fully functioning refrigerator that wants to achieve a high degree of electrochemical conversion at high flowrates, but is current limited by a fuse. In this case, the exit temperatures in Equation 3.37 are modified by simply considering $\chi=NI\alpha/\dot{V}C_V$. Under these assumptions, the expressions for the cooling load and rejected heat are given by the following equations respectively.

$$Q_C = 2\dot{V}C_V(T_C - T_2) = 2\dot{V}C_V(T_C - T_H\exp(-\chi)) \tag{3.48}$$

$$Q_H = 2\dot{V}C_V(T_4 - T_H) = 2\dot{V}C_V(T_C\exp(\chi) - T_H) \tag{3.49}$$

Rearranging some terms and using $T_R = T_H/T_C$, the above equations respectively become the following.

$$Q_C = \frac{2NI\alpha T_C}{\chi}[1 - T_R\exp(-\chi)] \tag{3.50}$$

$$Q_H = \frac{2NI\alpha T_C}{\chi}[\exp(\chi) - T_R] \tag{3.51}$$

The COP of the ideal BECR cycle is given by the following expression.

$$\beta = \frac{Q_C}{W_{IN}} = \frac{Q_C}{Q_H - Q_C} \tag{3.52}$$

$$= \frac{1 - T_R\exp(-\chi)}{[\exp(\chi) - T_R] - [1 - T_R\exp(-\chi)]}$$

Ideal BECR Cycle with Regeneration

TABLE 3.8

Symbols Used for Ideal BCER Cycle with Regeneration
Nomenclature

| | | | |
|---|---|---|---|
| $\dot{V}$ | volumetric flowrate [m³/s] | $C_V$ | volumetric specific heat [J/m³ K] |
| $f_{reg}$ | regeneration | $T_R$ | temperature ratio |

The temperature constraints that the source and sink impose on the ideal BECR cycle may be mitigated by the inclusion of a regenerator. The regenerator is a heat exchanger that allows the electrolytes exiting the cold side and hot side heat exchangers to undergo an iso-molar heat transfer process between themselves. The result is that the inlet temperature of the cold EC cell electrolytes are lower than $T_H$, and that of the hot EC cell electrolytes are higher than $T_C$. Therefore, the inclusion of refrigeration allows for lower values of $T_{2i}$ for a given value of $\chi$. In this work, regeneration is quantified using the metric given below.

$$f_{reg} = \frac{Q_{reg}}{Q_{reg,complete}} = \frac{\dot{V}C_V(T_{5i} - T_{1i})}{\dot{V}C_V(T_{5i} - Y_{6i})} = \frac{T_H - T_{1i}}{T_H - T_C} \quad (3.53)$$

A similar energy balance may be done to express $T_{3i}$ as a function of $f_{reg}$, $T_H$ and $T_C$. Since, all the states are known for, the cooling load and COP may now be written as given below.

$$Q_C = \frac{2\chi_E T_C}{\chi}\{1 - [T_R - f_{reg}(T_R - 1)]\exp(-\chi)\} \quad (3.54)$$

$$\beta = \frac{1}{\left\{\frac{[1 + f_{reg}(T_R - 1)]\exp(\chi) - T_R}{1 - [T_R - f_{reg}(T_R - 1)]\exp(-\chi X)}\right\} - 1} \quad (3.55)$$

The minimum value of $\chi$ for which the ideal BECR cycle generates a useful cooling load is given by, $$\chi \geq \ln[T_R - f_{reg}(T_R - 1)] \quad (3.56)$$

$\chi$ Corresponding to Maximum Cooling Load for a Given Value of $T_R$ and $f_{reg}$ For a given value of $T_R$ and $f_{reg}$, the maximum COP is given by setting $\partial\beta/\partial\chi=0$. The resulting quadratic equation is solved and the root outside of the domain given in Equation 3.49 is discarded. The value of $\chi$ that generates the maximum cooling ($\chi_{max,\beta}$) load is given by the equation below.

$$\chi_{max,\beta} = \ln\left[T_R - f_{reg}(T_R - 1) + \sqrt{\frac{[T_R - f_{reg}(T_R - 1)][f_{reg}(T_R - 1)](1 - f_{reg})(T_R - 1)}{1 + f_{reg}(T_R - 1)}}\right] \quad (3.57)$$

For a given value of $T_C$, $T_H$, and $\chi_E$, the maximum cooling load is evaluated by setting $\partial Q_C/\partial\chi=0$. The value of $\chi$ that generates the maximum cooling ($\chi_{max,Q_C}$) load is given by the solution to the transcendental equation given below.

$$\frac{\exp(\chi)}{1 + \chi} = T_R - f_{reg}(T_R - 1) \quad (3.58)$$

The equation given above will inform the operating and thermodynamic parameter requirements of a scaled up BECR cycle that is looking to generate high cooling loads. Both the values in Equation 3.57 and Equation 3.58 are plotted in FIGS. 2.15A-2.15B.

Practical Material Considerations

Before analyzing the non-ideal BECR cycle with realistic parameters, it is important to consider practical material constraints. Two constraints on $\chi$ are recognized, arising from (i) the freezing or evaporation of the solvent, and (ii) insufficient solubility. It is again noted that the continuous nature of the BECR cycle is made possible by all-soluble redox active half-cell reactions that are dissolved in a solvent. These solvents are most susceptible to freezing and evaporation at states 2 and 4, respectively. In order to operate the BECR cycle continuously, $T_2$ must be greater than the freezing point of the electrolytes, and the solvent's saturation pressure at $T_4$ must be lower than the maximum pressure that the system can withstand. FIG. 2.4A shows the maximum possible $\chi$, denoted by $\chi_{PHASE}$, that limits the BECR cycle performance via freezing or pressurization for five common solvents. The vapor pressure and freezing points of the pure solvents are used and therefore, the reported data is conservative. The freezing point and Antoine equation coefficients were obtained from the NIST database. Water and benzene are freezing point limited due to hydrogen bonding and larger molecular weight, respectively. The alcohols and pentane are relatively more volatile and are vapor pressure limited. The pressure limit is taken to be 10 atm for the present considerations (consistent with limits on conventional refrigerators appliances), but higher pressures are possible. This material constraint may be mitigated by using solvent blends, which have depressed freezing points and lower vapor pressures, or through employing room temperature ionic liquids as solvents, which inherently possess low vapor pressures. Details on the derivation of $\chi_{PHASE}$ are provided below. It is emphasized herein that $\chi_{PHASE}$ is just one way of screening solvents based on the source and sink temperatures. Solvents must also be rationally screened to facilitate reversible electrochemical reactions (i.e., they must not participate in side half-cell reactions, they must be stable in the pH required for the chosen half-cell reactions, etc.), and they must not degrade the chosen ion exchange membrane.

In the electrochemical cells, the molar influx of the reactant species must be able to support the rate of the reaction dictated by the operating current. As per Faraday's law of electrolysis for an open system, there is a maximum possible operating current for a given volumetric flowrate determined by the solubility limit of the reactant species. FIG. 2.4B shows the maximum possible $\chi$, denoted by $\chi_{SOLUBILITY}$, that limits the BECR cycle performance because of insufficient reactant solubility as a function of the solubility limit, and parametrized by the solvent specific heat and temperature coefficient. As a point of reference, the standard for high temperature coefficient half-cell reactions is the ferricyanide/ferrocyanide redox couple ($\alpha$=-1.4 mV/K). However, the solubility limit of potassium ferrocyanide is ~0.6 M at room temperature. As shown in FIG. 2.4B, for use in a space cooling application, a half-cell reaction with $\alpha$=1 mV/K must have a minimum solubility of ~3 M in water. This material constraint may be mitigated in general with the discovery of new half-cell reactions with high temperature coefficients, low specific heats, and high half-cell species solubility. For instance, Kim et al. reported over a factor of 2 increase in the temperature coefficient of the ferricyanide/ferrocyanide redox couple in 20% v/v aqueous solution of methanol. This result is even more relevant to this work, because the specific heat of aqueous methanol solution is lower than that of water. Additionally, a solubility 1.5 M has recently been achieved for the ferricyanide/ferrocyanide redox couple using hydrophilicity of ammonium counter-ions. Details on the derivation of $\chi_{SOLUBILITY}$ are provided below $\chi$ is Limited by Solvent Freezing and Vapor Pressure At state 2 the electrolytes are at the lowest temperature. Since this works considers liquid states electrolytes that is movable using a pump, the electrolytes can potentially freeze or vaporize beyond a critical value. Therefore, for an ideal BECR cycle with regeneration, the following inequality must hold.

$$T_2 = T_1 \exp(-\chi) \geq T_{f,p} \quad (3.59)$$

$T_{f,p}$ is the freezing point of the electrolyte. Using the treatment in S6, $T_1$ may be solved for, and the following is subsequently derived.

$$\chi \leq \ln\left[\frac{T_H - f_{reg}(T_H - T_C)}{T_{f,p}}\right] \quad (3.60)$$

Similarly, at state 4, the electrolytes are at the highest temperature and the solvent partial pressure must not exceed a critical value that the system is capable of handling.

$$T_4 = T_3 \exp(\chi) \leq T_{sat} \quad (3.61)$$

$T_{v,p}$ is the saturation temperature of the electrolyte at the critical pressure of the system. Replacing $T_3$ in the equation below the following is obtained.

$$\chi \leq \ln\left[\frac{T_{sat}}{T_C + f_{reg}(T_H - T_C)}\right] \quad (3.62)$$

Since the BECR cycle must satisfy both constraints in Equation 3.60 and Equation 3.62, the maximum possible value of $\chi$ is the lesser of the two right hand sides. This value is given as $$\chi_{PHASE} = \min\left\{\ln\left[\frac{T_H - f_{reg}(T_H - T_C)}{T_{f,p}}\right], \ln\left[\frac{T_{sat}}{T_C + f_{reg}(T_H - T_C)}\right]\right\} \quad (3.63)$$

$\chi$ is Limited by Insufficient Reactant Solubility

TABLE 3.9

Symbols Used for Insufficient Reactant Solubility Calculations

| Nomenclature | | | |
|---|---|---|---|
| $\dot{V}$ | volumetric flowrate [m³/s] | C | concentration [mol/m³] |
| I | operating current [A] | F | Faraday's constant [C/mol] |
| n | number of electrons transferred | $C_{SOL}$ | solubility limit [mol/m³] |
| α | temperature coefficient [mV/K] | $C_V$ | volumetric specific heat [J/m³ K] |
| Subscripts | | | |
| IN | inlet | OUT | outlet |

The electrochemical reactions occurring within the EC cells are sustained by the concentration of the reactant species in the corresponding electrodes. Therefore, the limiting solubility of the reactants dictates the rate of electrochemical conversion (determined by the operating current) relative to the rate of species influx (determined by the volumetric flowrate). A simple balance is employed that is centered on Faraday's law of electrolysis to reflect this conservation. For the electrolyte contains the solubility limited reactant, the following equality can be written.

$$\dot{V}(C_{OUT} - C_{IN}) = \frac{I}{nF} \quad (3.64)$$

The greatest possible value of the inlet concentration is the solubility limit and in the limit of maximum possible conversion, the outlet concentration is zero. Remembering that for the BECR cycles the electrolyte flow rate is split between N EC cells, the following equality holds in the limit of maximum possible reactant conversion.

$$nFC_{SOL} = \frac{NI}{\dot{V}} \quad (3.65)$$

The value of $\chi$ in the above scenario then becomes $$\chi_{SOLUBILITY} = \frac{\alpha}{C_V} nFC_{SOL} \quad (3.66)$$

Non-Ideal BECR Cycle Performance

The previous analysis informs the asymptotic performance of the BECR cycle with idealized components. However, Joule heating and incomplete heat exchange are unavoidable, and they must be considered to predict the performance of a real world BECR cycle. The local overpotential terms detailed in Table 3.4 are substituted into Equation 3.17 and solved to evaluate the electrochemical cell exit temperature of the electrolytes as a function of the inlet temperatures, $\chi$, and electrochemically relevant parameters such as the standard rate constant, mass transfer coefficient, reactant solubility limit, and membrane resistance. The heat exchanger exit temperature of the electrolytes are related to the corresponding inlet temperature through the heat exchanger efficiency, $\varepsilon_{HX}$. These relations are used in an iterative procedure to evaluate the non-ideal BECR cycle states, and therefore, its performance. First, the effect of increasing operating current on BECR cycle operating in a space cooling application with N=1 is illustrated. Electrochemical cells are chosen that are 8 cm×8 cm×5 mm. The catholyte and anolyte are hypothetical redox couples with standard temperature coefficients of 2 mV/K and −2 mV/K, respectively. The limiting solubility of the in both electrolytes is 3 M. The solvent is chosen to be water and the specific heat is that of 3 M brine solution (3.56 MJ/m³ K). For both half-cell reactions the standard rate constant $k^0 = 10^{-7}$ m/s, mass transfer coefficient $k_M = 10^{-5}$ m/s, and area specific resistance of the IEM ASR=1 $\Omega$cm². Keeping in mind the material constraints in FIGS. 2.4A-2.4B, $\chi$=0.12 and $\varepsilon_{HX}$=0.8 were fixed, and an iterative solution procedure was executed to evaluate how varying current densities, and, therefore, overpotential, affect the non-ideal BECR cycle performance. FIG. 2.5A shows the non-ideal BECR cycles for three different current values (1 A, 8 A, 10 A). At 1 A, the overpotentials are low enough such that the electrochemical reaction processes ($1_{nA}$ to $2_{nA}$ and $3_{nA}$ to $4_{nA}$) are nearly isentropic shown by the nearly vertical transitions. Conversely, at 10 A, the excessive overpotential leads to large entropy generation from Joule heating in the electrochemical reaction processes ($1_{nC}$ to $2_{nC}$ and $3_{nC}$ to $4_{nC}$). The non-ideal cooling loads and COPs are shown alongside their corresponding ideal cycle trends for comparison in FIG. 2.5B. The cooling load first increases with the operating current due to a larger rate of reaction but starts to decrease at ~5 A due to the overpotentials that scale rapidly with current density. At ~11 A, the cooling load is 0 W because the Joule heating is high enough such that the exit temperatures of the electrolytes are nearly equal to $T_C$. The COP monotonically decreases with increasing operating current due to the entropy generation from Joule heating. The operating current dependent contributions of the terms in Table 3.4 corresponding to the cold cell and hot cell are detailed in FIGS. 2.5C-2.5D, respectively. Although the total heat generation in the cold cell is endothermic across all current values, the electrolyte drop in temperature is insufficient to generate cooling in the cold side heat exchanger at $T_C$. In both the cells, ohmic overpotential is the dominant source of Joule heating and it can be reduced by using electrodes with larger cross-sectional areas or improved membranes with lower area specific resistance.

A more general analysis was then performed of the non-ideal BECR cycle by varying the operating current density $\chi_E$ and operating current density simultaneously (FIG. 2.6), keeping all other parameters the same as in the results of FIGS. 2.5A-2.5D. As expected, the highest cooling is achieved at high values of $\chi_E$ (as shown in FIG. 2.3B) and low values of current density. Increasing the entropic driving force $\chi_E$ by increasing the number of cell stacks N, operating current I, or electrolyte temperature coefficient α, increases the degree of entropic heat generation and, therefore, increases the amount of useful cooling. Increasing the operating current density for a fixed electrochemical cell, however, generates an increasing amount of electrochemical overpotential and, therefore, decreases the amount of useful cooling. At ~0.3 A/cm², the Joule heating is high enough such that the temperature of the electrolytes exiting the cold EC cell is nearly equal to $T_C$. No practical cooling is achievable past this value of current density. This cutoff point can be increased by lowering the overpotentials: (i) choosing half-cell reactions with higher rate constants, (ii) increasing solubility of the limiting reagent species, (iii) improving electrodes and flow fields to generate higher mass transfer coefficients, (iv) and developing ion exchange membranes with low area specific resistance. Finally, to quantify the terms in Table 3.4 relative to the standard temperature coefficient, three dimensionless parameters, X, A, and M were derived.

$$X = \frac{C_{IN} - C_{OUT}}{C_{SOL}} \quad (3.67)$$

Parameter X represents the degree of bulk conversion of the limiting reagent species with a solubility limit $C_{SOL}$. The difference between the inlet concentration $C_{IN}$ and outlet concentration $C_{OUT}$ is derived using Faraday's law within an open electrochemical system, making X a proxy for the ratio of the operating current and electrolyte flowrate.

$$A = \frac{I}{V_e a n F k^0 C_{SOL}} \quad (3.68)$$

Parameter A represents the deviation of the operating current from the local exchange current density, which is governed by the standard rate constant of the half-cell reaction, $k^0$, in addition to the other terms.

$$M = \frac{I}{V_e a n F k_M C_{SOL}} \quad (3.69)$$

Parameter M represents the proximity of the operating current to the local limiting current density, which is governed by the mass transfer coefficient $k_M$, in addition to the other terms. It can be extrapolated from the above formulations that parameter A influences the activation overpotential that depends on the local bulk concentrations and rate constant, and parameter M (for mass) governs the concentration overpotential and the Nernst entropic terms that depend on the local surface concentrations. Since parameter X dictates the local bulk conversion, it affects the activation (FIG. 2.7A) and concentration (FIG. 2.7C) overpotentials, as well as the Nernst entropic terms (FIG. 2.7D). The ohmic overpotential is only dependent on the area specific resistance of the membrane and current density and it is shown for completion in FIG. 2.7B. The activation and concentration overpotentials, and the Nernst entropic terms can naturally be normalized by temperature as per the terms in Table 3.4 and the ohmic overpotential is normalized by $T_{amb}=298$ K to facilitate comparison with the standard temperature coefficient of the half-cell reaction of interest. The activation overpotential increases with increasing X due to lower bulk concentrations, and with increasing A due to a greater ratio of the operating current density and exchange current density. The concentration overpotential and the Nernst entropic terms both increase with increasing X due to lower bulk concentrations, and with increasing M as the concentration boundary layer thickens. In both the above terms, there is a maximum possible M for a given X, at which the surface concentration of the limiting reagent species reaches zero. Beyond this point, the concentration overpotential increases precipitously generating large amounts of Joule heat. It is believed that dimensionless parameters X, A, and M, along with the operating parameter χ can help screen half-cell reactions, estimate the operating parameters of the BECR cycle, and project its performance.

In summary, the Brayton Electrochemical Refrigerator (BECR) cycle has been introduced; this can generate continuous refrigeration by using all-soluble redox active species and open flow cell architectures. The electrochemical cells must be adiabatic and support electrolyte plug flow that mitigates internal electrolyte mixing and heat transfer. A low order one dimensional model was developed for such electrochemical cells to predict the performance of this technology. The model considers all sources of heat generation (i.e., entropic heat, activation, ohmic, and concentration) in an electrochemical system with liquid electrolytes. It makes assumptions of high thermal and mass transfer Peclet numbers and uniform current density throughout the porous electrode. The assumptions simplify the analysis of the BECR cycle and predict the BECR performance to the first order. In the asymptotic limit of internal reversibility and complete heat exchange, the analysis recovers the figure-of-merit χ. Low χ values afford high COP and the cooling load scales with the entropic driving force, $\chi_E$. The inclusion of regeneration will allow for a higher COP and cooling load for a given $\chi$. Two material constraints have been identified that restrict the values available for $\chi$. In general, the BECR cycle benefits from low electrolyte freezing point, low electrolyte vapor pressure, high temperature coefficient, low electrolyte specific heat, and high reactant solubility. The performance of the non-ideal BECR cycle was reported using realistic values for thermodynamic and kinetic parameters. Finally, dimensionless parameters X, A, and M were introduced; these will quantify detrimental heat generation. In conjunction with $\chi$, these parameters will help screen half-cell reactions, and estimate the performance of a real BECR cycle. In two other works, it has been demonstrated the BECR proof-of-concept and identified four material level challenges that must be solved to help increase this technology's market readiness.

Dimensionless Parameters X, A, and M

TABLE 3.10

Symbols Used to Calculate Dimensionless Parameters

Nomenclature

| | | | |
|---|---|---|---|
| $\dot{V}$ | volumetric flowrate [m³/s] | C | concentration [mol/m³] |
| I | operating current [A] | F | Faraday's constant [C/mol] |
| n | number of electrons transferred | $C_{SOL}$ | solubility limit [mol/m³] |
| $\alpha$ | temperature coefficient [mV/K] | $C_V$ | volumetric specific heat [J/m³ K] |
| $L_e$ | electrode length in the x axis [m] | $\hat{i}$ | unit vector in direction of current |
| $k^0$ | standard rate constant [m/s] | $k_M$ | mass transfer coefficient [m/s] |

Subscripts

| | | | |
|---|---|---|---|
| IN | inlet | OUT | outlet |
| i | species i | O | oxidized species |
| R | reduced species | | |

Superscripts

| | | | |
|---|---|---|---|
| B | bulk | S | surface |

The expressions for the activation overpotential, concentration overpotential, and Nernst entropic terms are given in Equation 3.30, Equation 3.32, and Equation 3.40, respectively. These terms are dependent on the bulk and/or surface concentration of the participating species given in Equation 3.37 and Equation 3.38. First, the concentration terms are modified to be constrained by Faraday's law of electrolysis. For an open electrochemical electrode, Faraday's law affords the following balance for the limiting reagent species.

$$C_{IN} - C_{OUT} = \frac{I}{\dot{V}nF} \tag{3.70}$$

The limiting case for the above species balance is when the species enters at the solubility limit and is absent in the effluent stream. In this case, the ratio of the right-hand side of Equation 3.70 takes on the maximum possible value as shown below.

$$C_{SOL} = \left(\frac{I}{\dot{V}nF}\right)_{MAX} \tag{3.71}$$

We now define the dimensionless parameter X to be the ratio between the left-hand sides of Equation 3.70 and Equation 3.72.

$$X = \frac{C_{IN} - C_{OUT}}{C_{SOL}} = \frac{(I/\dot{V})}{(I/\dot{V})_{MAX}} \tag{3.72}$$

Equation 3.37 for the bulk concentration may then be written as the following.

$$C_i^B(x) = C_{i,IN}^B - X(\hat{i} \cdot \hat{n})\frac{x}{L_e} \tag{3.73}$$

Additionally, 100% faradaic efficiency ensures that the summation of the local concentrations of the participating species is equal to the solubility limit. Employing this with the Equation 3.73, the following expression may be written.

$$C_i^B(x) = \frac{C_{SOL}}{2}\left[1 + X(\hat{i} \cdot \hat{n})\left(1 - \frac{2x}{L_e}\right)\right] \tag{3.74}$$

Equation 3.74 may be used in conjunction with Equation 3.38 to describe the surface concentration using parameter X.

$$C_i^S(x) = \frac{C_{SOL}}{2}\left[1 + X(\hat{i} \cdot \hat{n})\left(1 - \frac{2x}{L_e}\right)\right] - \frac{\vec{I} \cdot \hat{n}}{anFk_MV_e} \tag{3.75}$$

We use Equation 3.74 in the expression for the activation overpotential in Equation 3.30 to generate the following equation.

$$\eta_{ACT} = \frac{-2RT}{nF}\sinh^{-1}\left[\frac{\vec{I} \cdot \hat{n}}{anFV_e k^0 C_{SOL}\sqrt{1 - X^2(1 - 2x/L_e)^2}}\right] \tag{3.76}$$

We now can define the dimensionless parameter A as given in Equation 3.77.

$$A = \frac{I}{anFV_e k^0 C_{SOL}} \tag{3.77}$$

Finally, to compare the activation overpotential with the standard temperature coefficient which has units of V/K, the length averaged and temperature normalized activation overpotential as given below is reported.

$$\frac{\overline{\eta}_{ACT}}{T} = \frac{-2R}{nF}\int_0^1 d\left(\frac{x}{L_e}\right)\sinh^{-1}\left[\frac{A}{\sqrt{1 - X^2(1 - 2x/L_e)^2}}\right] \tag{3.78}$$

For the concentration overpotential and Nernst entropic terms, the parameter M is defined as given below.

$$M = \frac{I}{anFV_e k_M C_{SOL}} \quad (3.79)$$

The volume averaged and temperature normalized concentration overpotential and Nernst entropic terms are then derived from Equation 3.32 and Equation 3.40 to generate the equations below.

$$\frac{\bar{\eta}_{CONC}}{T} = \frac{2R}{nF}\int_0^1 d\left(\frac{x}{L_e}\right)\ln\left(1 - \frac{2M}{1+X(1-2x/L_e)}\right) \quad (3.80)$$

$$\frac{\bar{\eta}_{NERNST}}{T} = \frac{-2R}{nF}\int_0^1 d\left(\frac{x}{L_e}\right)\ln\left[\frac{\frac{1-X(1-2x/L_e)}{2}+M}{\frac{1-X(1-2x/L_e)}{2}-M}\right] \quad (3.81)$$

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES

1. Abraham, T. J. et al. (2013) High Seebeck coefficient redox ionic liquid electrolytes for thermal energy harvesting. Energy Environ. Sci. 6, 2639-2645
2. Ambrose, D., et al. (1975). Thermodynamic properties of organic oxygen compounds XXXVII. Vapour pressures of methanol, ethanol, pentan-1-ol, and octan-1-ol from the normal boiling temperature to the critical temperature. The Journal of Chemical Thermodynamics 7, 185-190. 10.1016/0021-9614(75)90267-0.
3. Aschenbrenner, O., et al. (2009). Measurement of vapour pressures of ionic liquids and other low vapour pressure solvents. Green Chem. 11, 1217-1221. 10.1039/B904407H.
4. Bard, A. J. (2001) *Electrochemical methods: fundamentals and applications* ($2^{nd}$ ed). Wiley
5. Bernardi, D. (1985). A General Energy Balance for Battery Systems. Journal of The Electrochemical Society 132, 5. 10.1149/1.2113792.
6. Bonetti, M. et al. (2011) Huge Seebeck coefficients in nonaqueous electrolytes. J. Chem. Phys. 134, 114513
7. Bridgeman, O. C., et al. (1964). Vapor Pressure Tables for Water. Journal of Heat Transfer 86, 279-286. 10.1115/1.3687121.
8. çengel, Y. A. (2011). Heat and mass transfer: fundamentals & applications/Yunus A. çengel, Afshin J. Ghajar. 4th ed. (New York: McGraw-Hill).
9. Chum, H. et al. Review of Thermally Regenerative Electrochemical Systems. (1981).
10. Davis, R. The Heat of Adsorption of Hydrogen Gas on Lanthanum Pentanickel.
11. Dittman, G. L. (1977). Calculation of brine properties. http://www.osti.gov/servlets/purl/7111583/.
12. Dittmar, L., et al New Concept of an Electrochemical Heat Pump System: Theoretical Consideration and Experimental Results. in Electrochemical Engineering and Energy (eds. Lapicque, F., et al.) 57-65 (Springer US, 1995). doi:10.1007/978-1-4615-2514-1_6.
13. Duan, J. et al. Aqueous thermogalvanic cells with a high Seebeck coefficient for low-grade heat harvest. Nat. Commun. 9, 5146 (2018).
14. Duan, Z. N., et al. Thermodynamic and electrochemical performance analysis for an electrochemical refrigeration system based on iron/vanadium redox couples. Electrochimica Acta 389, 138675 (2021).
15. Efficient and Climate-Friendly Cooling (2020). (United Nations Environment Programme). https://wedocs.unep-.org/bitstream/handle/20.500.11822/31587/ECFC.pdf?sequence=1&isAllowed=y.
16. Fogler, H. Essentials of Chemical Reaction Engineering, 2nd Edition. (Pearson, 2017).
17. Gerlach, D. W. et al. Basic modelling of direct electrochemical cooling. Int. J. Energy Res. 31, 439-454 (2007).
18. Hammond, R. H. et al. An electrochemical heat engine for direct solar energy conversion. Sol. Energy 23, 443-449 (1979).
19. Hansen, J. et al. Global temperature change. Proc. Natl. Acad. Sci. 103, 14288 (2006).
20. Henry, A. A New Take on Electrochemical Heat Engines. Joule 2, 1660-1661 (2018).
21. Hu, R. et al. (2010) Harvesting waste thermal energy using a carbon-nanotube-based thermo-electrochemical cell. Nano Lett. 10, 838-846
22. Hupp, J. T. et al. (1984) Solvent, Ligand, and Ionic Charge Effects on Reaction Entropies for Simple Transition-Metal Redox Couples. Inorg. Chem. 28, 3639-3644
23. Jacobs, S. et al. The performance of a large-scale rotary magnetic refrigerator. New Dev. Magn. Refrig. 37, 84-91 (2014).
24. Jiang, B., et al. (2016). A comparative study of Nafion series membranes for vanadium redox flow batteries. Journal of Membrane Science 510, 18-26. 10.1016/j.memsci.2016.03.007.
25. Kim, J. H. et al. Iron (II/III) perchlorate electrolytes for electrochemically harvesting low-grade thermal energy. Sci. Rep. 9, 8706 (2019).
26. Kim, T., et al. (2017). High thermopower of ferri/ferrocyanide redox couple in organic-water solutions. Nano Energy 31, 160-167. 10.1016/j.nanoen.2016.11.014.
27. Kreysa, G. et al. Theoretical consideration of electrochemical heat pump systems. Electrochimica Acta 35, 1283-1289 (1990).
28. Lee, S. W. et al. An electrochemical system for efficiently harvesting low-grade heat energy. Nat. Commun. 5, 3942-3942 (2014).
29. Li, B., et al. (2016). Performance analysis of a thermally regenerative electrochemical refrigerator. Energy 112, 43-51. 10.1016/j.energy.2016.06.045.
30. Luo, J., et al. (2019). Unprecedented Capacity and Stability of Ammonium Ferrocyanide Catholyte in PH Neutral Aqueous Redox Flow Batteries. Joule 3, 149-163. 10.1016/j.joule.2018.10.010.
31. Makarov, D. M. et al. Density and volumetric properties of the aqueous solutions of urea at temperatures from T=(278 to 333) K and pressures up to 100 MPa. J. Chem. Thermodyn. 120, 164-173 (2018).
32. Marcus, R. A. et al. Solvent dynamics and vibrational effects in electron transfer reactions. J. Electroanal. Chem. Interfacial Electrochem. 204, 59-67 (1986).
33. Marcus, Y. et al. (2006) Ion Pairing. Chem. Rev. 106, 4585-4621

34. Mckay, I. S. et al. (2019) Electrochemical Redox Refrigeration. Sci. Rep. 9, 13945
35. Metz, B., et al. Safeguarding the Ozone Layer and the Global Climate System (IPCC/TEAP). https://www.ipcc.ch/report/safeguarding-the-ozone-layer-and-the-global-climate-system/.
36. Newell, Ty. A. Thermodynamic analysis of an electrochemical refrigeration cycle. Int. J. Energy Res. 24, 443-453 (2000).
37. Newman, J., et al. (1975). Porous-electrode theory with battery applications. AIChE Journal 21, 25-41. 10.1002/aic.690210103.
38. Oh, K., et al. (2015). Three-dimensional, transient, nonisothermal model of all-vanadium redox flow batteries. Energy 81, 3-14. 10.1016/j.energy.2014.05.020.
39. Osborn, A. G., et al. (1974). Vapor-pressure relations for 15 hydrocarbons. J. Chem. Eng. Data 19, 114-117. 10.1021/je60061a022.
40. Pecharsky, V. K. et al. Giant Magnetocaloric Effect in $Gd_5(Si_2Ge_2)$. Phys Rev Lett 78, 4494-4497 (1997).
41. Poletayev, A. D. et al. (2018) Continuous electrochemical heat engines. Energy Environ. Sci. 11, 2964-2971
42. Pollard, R., et al. (1981). Mathematical Modeling of the Lithium-Aluminum, Iron Sulfide Battery: I. Galvanostatic Discharge Behavior. Journal of The Electrochemical Society 128, 491-502. 10.1149/1.2127445.
43. Rajan, A., et al. Electrolyte engineering can improve electrochemical heat engine and refrigeration efficiency. Trends in Chemistry. 10.1016/j.trechm.2021.12.006.
44. Ritchie, H. et al. Urbanization. https://ourworldindata.org/urbanization (2018).
45. Schafner, K., et al. (2019). Membrane resistance of different separator materials in a vanadium redox flow battery. Journal of Membrane Science 586, 106-114. 10.1016/j.memsci.2019.05.054.
46. Sherfey, J. M., et al. (1958). Electrochemical Calorimetry. Journal of The Electrochemical Society 105, 665. 10.1149/1.2428687.
47. The Core Writing Team, R. K. Pachauri, and L. A. Meyers (2014). Climate Change 2014: Synthesis Report. Contribution of Working Groups I, II and III to the Fifth Assessment Report of the Intergovernmental Panel on Climate Change (IPCC).
48. The Future of Cooling (2018). (International Energy Agency). https://www.iea.org/futureofcooling/.
49. Thermodynamic Properties of DuPont Suva 410A Refrigerant. <https://www.cantas.com/urunpdf/20.09.008_h64423_Suva410A_thermo_prop_si.pdf> accessed Mar. 16, 2022.
50. Thermodynamics Research Center (2021) Thermodynamics Source Database in NIST Chemistry WebBook, NIST Standard Reference Database Number 69, DOI: 10.18434/T4D303
51. Velders, G. J. M. et al. Preserving Montreal Protocol Climate Benefits by Limiting HFCs. Science 335, 922-923 (2012).
52. Velders, G. J. M., et al. The large contribution of projected HFC emissions to future climate forcing. Proc. Natl. Acad. Sci. 106, 10949-10954 (2009).
53. Willingham, C. B., et al. (1945). Vapor pressures and boiling points of some paraffin, alkylcyclopentane, alkylcyclohexane, and alkylbenzene hydrocarbons. Journal of Research of the National Bureau of Standards 35, 219. 10.6028/jres.035.009.
54. Worswick, R. D., et al. The enthalpy of solution of ammonia in water and in aqueous solutions of ammonium chloride and ammonium bromide. J. Chem. Thermodyn. 6, 565-570 (1974).
55. Wu, M. S., et al. (1998). Thermal behaviour of nickel/metal hydride batteries during charge and discharge. Journal of Power Sources 74, 202-210. 10.1016/S0378-7753(98)00064-0.
56. Yamato, Y. et. al. (2013) Effects of the Interaction between Ionic Liquids and Redox Couples on Their Reaction Entropies. J. Electrochem. Soc. 160, H309-H314
57. Yang, H., et al. (2004). Determination of the Reversible and Irreversible Heats of a $LiNi_{0.8}Co_{0.15}Al_{0.05}O_2$/Natural Graphite Cell Using Electrochemical-Calorimetric Technique. Journal of The Electrochemical Society 151, A1222. 10.1149/1.1765771.
58. Yang, Y. et al. Charging-free electrochemical system for harvesting low-grade thermal energy. Proc. Natl. Acad. Sci. 111, 17011-17016 (2014).
59. Zhou, H., et al. Supramolecular Thermo-Electrochemical Cells: Enhanced Thermoelectric Performance by Host-Guest Complexation and Salt-Induced Crystallization. J. Am. Chem. Soc. 138, 10502-10507 (2016).

What is claimed is:

1. A system for electrochemical cooling, the system comprising:
a cold electrochemical cell comprising a first ion exchange membrane, wherein a first ion flux between a first working fluid and a second working fluid across the first ion exchange membrane absorbs heat from the first working fluid and the second working fluid while the entropies and pressures of the first working fluid and the second working fluid remain approximately constant, lowering a temperature of the first working fluid and the second working fluid exiting the cold electrochemical cell;
a heat source;
a cold side heat exchanger, wherein the cold side heat exchanger absorbs heat from the heat source to increase the temperature of the first working fluid and the second working fluid flowing through the cold side heat exchanger;
a hot electrochemical cell comprising a second ion exchange membrane, wherein a second ion flux between the first working fluid and the second working fluid across the second ion exchange membrane releases heat into the first working fluid and the second working fluid while the entropies and pressures of the first working fluid and the second working fluid remain approximately constant, raising the temperature of the first working fluid and the second working fluid exiting the hot electrochemical cell;
a heat sink; and
a hot side heat exchanger, wherein the hot side heat exchanger rejects absorbed heat into the heat sink to decrease the temperature of the first working fluid and the second working fluid; and
wherein
the first working fluid and the second working fluid circulate continuously through a first fluid path and a second fluid path that are independent of one another without physically mixing together.

2. The system of claim 1, wherein the cold electrochemical cell, the hot electrochemical cell, or both further comprise a housing comprising a chamber separated into a first side and a second side by the first ion exchange membrane or second ion exchange membrane, respectively, and wherein the first side and the second side independently comprise one or more of a porous electrode, a flow channel plate, or a combination thereof.

3. The system of claim 2, wherein the porous electrode comprises carbon felt, a metal foam, conducting polymer foam, conducting ceramic foam, or a combination thereof.

4. The system of claim 1, wherein the system comprises adiabatic walls, wherein the adiabatic walls are configured to be removable to allow the system to absorb heat from an environment surrounding the system, wherein heat absorption results in a temperature drop in the surrounding environment.

5. The system of claim 1, further comprising a first circulation pump for circulating the first working fluid and a second circulation pump for circulating the second working fluid, wherein the first circulation pump and the second circulation pump are configured to flow the first working fluid and the second working fluid, respectively:
   directly from the cold side heat exchanger to the hot electrochemical cell,
   directly from the hot electrochemical cell to the hot side heat exchanger,
   directly from the hot side heat exchanger to the cold electrochemical cell, and
   directly from the cold electrochemical cell to the cold side heat exchanger.

6. The system of claim 1, wherein the first working fluid and the second working fluid do not circulate through the heat source, the heat sink, or both the heat source and the heat sink.

7. The system of claim 1, wherein the first ion exchange membrane is a first cation exchange membrane, wherein the second ion exchange membrane is a second cation exchange membrane, and the ion flux is an anionic flux.

8. The system of claim 7, wherein the first cation exchange membrane and the second cation exchange membrane are independently selected from a hydrocarbon membrane, a perfluorinated sulfonic acid membranes, or a solid ion-conducting electrolyte.

9. The system of claim 1, wherein the first ion exchange membrane is a first anion exchange membrane, wherein the second ion exchange membrane is a second anion exchange membrane, and the ion flux is a cationic flux.

10. The system of claim 9, wherein the first anion exchange membrane and the second anion exchange membrane are independently selected from an ionomer membrane or a solid-ion conducting electrolyte membrane.

11. The system of claim 1, wherein the first working fluid is a first redox active electrolyte and the second working fluid is a second redox active electrolyte.

12. The system of claim 1, further comprising an external power supply that drives current through the cold electrochemical cell and the hot electrochemical cell.

13. The system of claim 1, wherein the system produces a temperature drop of from about 0.05K to about 50K.

14. An apparatus comprising one or more systems according to claim 1.

15. The apparatus of claim 14, wherein the apparatus comprises a refrigerator, an air conditioner, or a heat pump.

16. A method for electrochemical cooling, the method comprising:
   circulating a first working fluid in a first closed circuit comprising a first half of a cold electrochemical cell, a first portion passing through a cold side heat exchanger, a first half of a hot electrochemical cell, and a first portion passing through a hot side heat exchanger;
   circulating a second working fluid in a second closed circuit comprising a second half of a cold electrochemical cell, a second portion passing through a cold side heat exchanger, a second half of a hot electrochemical cell, and a second portion passing through hot side heat exchanger;
      wherein the pressures of both the first working fluid and the second working fluid remain approximately constant as the fluids pass through the hot electrochemical cell and as the fluids pass through the cool electrochemical cell;
      wherein the entropies of both the first working fluid and the second working fluid remain approximately constant as the fluids pass through the hot electrochemical cell and as the fluids pass through the cool electrochemical cell;
      wherein the first half of the cold electrochemical cell is separated from the second half of the cold electrochemical cell by a first ion exchange membrane;
      wherein the first half of the hot electrochemical cell is separated from the second half of the hot electrochemical cell by a second ion exchange membrane; and
   driving current from an external power supply through the cold electrochemical cell and the hot electrochemical cell, wherein the current drives a first redox reaction in the cold electrochemical cell, where the first redox reaction has an entropy change greater than 0, and wherein the current drives a second redox reaction in the hot cell, where the second redox reaction is a reverse of the first redox reaction, and wherein the second redox reaction has an entropy change less than 0;
   wherein the system produces a temperature drop.

17. The method of claim 16, wherein the temperature drop is about 0.05K to about 50K.

18. The method of claim 16, further comprising a first circulation pump for circulating the first working fluid and a second circulation pump for circulating the second working fluid, wherein the first circulation pump and the second circulation pump flow the first working fluid and the second working fluid, respectively:
   directly from the cold side heat exchanger to the hot electrochemical cell,
   directly from the hot electrochemical cell to the hot side heat exchanger,
   directly from the hot side heat exchanger to the cold electrochemical cell, and
   directly from the cold electrochemical cell to the cold side heat exchanger
and the method further comprising removing an adiabatic barrier surrounding the first and second closed circuits and allowing the first working fluid, the second working fluid, or both to absorb environmental heat.

19. The method of claim 16, wherein the first working fluid and second working fluid do not circulate through a heat source, a heat sink, or both the heat source and the heat sink and wherein the current from the external power supply applied to the cold electrochemical cell and the hot electrochemical cell have the same numerical potential with the opposite charge.

20. The method of claim 16, wherein the first ion exchange membrane is a first cation exchange membrane and the second ion exchange membrane is a second cation exchange membrane and wherein the first cation exchange membrane and the second cation exchange membrane are independently selected from a hydrocarbon membrane, a per-fluorinated sulfonic acid membranes, or a solid ion-conducting electrolyte; or wherein the first ion exchange membrane is a first anion exchange membrane and wherein the second ion exchange membrane is a second anion exchange membrane, wherein the first anion exchange membrane and the second anion exchange membrane are independently selected from an ionomer membranes or a solid-ion conducting electrolyte membrane.

\* \* \* \* \*